(12) United States Patent
Meiri et al.

(10) Patent No.: US 8,677,087 B2
(45) Date of Patent: *Mar. 18, 2014

(54) CONTINUOUS BACKUP OF A STORAGE DEVICE

(75) Inventors: David Meiri, Cambridge, MA (US); Magnus Bjornsson, West Newton, MA (US)

(73) Assignee: EMC Corporation, Hopkinton, MA (US)

( * ) Notice: Subject to any disclaimer, the term of this patent is extended or adjusted under 35 U.S.C. 154(b) by 1276 days.

This patent is subject to a terminal disclaimer.

(21) Appl. No.: 11/325,078

(22) Filed: Jan. 3, 2006

(65) Prior Publication Data

US 2007/0168403 A1    Jul. 19, 2007

(51) Int. Cl.
*G06F 12/00* (2006.01)

(52) U.S. Cl.
USPC .................................. 711/162; 711/E12.103

(58) Field of Classification Search
None
See application file for complete search history.

(56) References Cited

U.S. PATENT DOCUMENTS

| | | | |
|---|---|---|---|
| 5,206,939 A | 4/1993 | Yanai et al. | |
| 5,537,568 A | 7/1996 | Yanai et al. | |
| 5,778,394 A | 7/1998 | Galtzur et al. | |
| 5,778,430 A | 7/1998 | Ish et al. | |
| 5,845,147 A | 12/1998 | Vishlitzky et al. | |
| 5,857,208 A | 1/1999 | Ofek | |
| 6,199,178 B1 | 3/2001 | Schneider et al. | |
| 6,324,654 B1 | 11/2001 | Wahl et al. | |
| 7,113,945 B1 | 9/2006 | Moreshet et al. | |
| 7,165,154 B2 * | 1/2007 | Coombs et al. | 711/162 |
| 2003/0195887 A1 * | 10/2003 | Vishlitzky et al. | 707/10 |
| 2005/0108302 A1 | 5/2005 | Rand et al. | |

FOREIGN PATENT DOCUMENTS

| | | |
|---|---|---|
| EP | 0 645 709 B1 | 3/1995 |
| WO | WO 2005/114420 A2 | 12/2005 |

OTHER PUBLICATIONS

U.S. Appl. No. 10/120,016, filed Oct. 16, 2003, Vishlitzky, et al.
U.S. Appl. No. 10/306,187, filed Nov. 16, 2003, Pocock, et al.
U.S. Appl. No. 10/306,268, filed Oct. 16, 2003, Vishlitzky, et al.
U.S. Appl. No. 10/306,378, filed Nov. 6, 2003, Vishlitzky, et al.
U.S. Appl. No. 10/306,706, filed Oct. 16, 2003, Vishlitzky, et al.
U.S. Appl. No. 10/306,659, filed Oct. 16, 2003, Vishlitzky, et al.
U.S. Appl. No. 11/502,844, filed Dec. 7, 2006, Moreshet, et al.
U.S. Appl. No. 10/720,969, filed May 26, 2005, Kopylovitz.
U.S. Appl. No. 10/802,489, filed Mar. 16, 2004.
U.S. Appl. No. 10/808,781, filed Mar. 25, 2004.

* cited by examiner

*Primary Examiner* — Larry Mackall
(74) *Attorney, Agent, or Firm* — Muirhead and Saturnelli, LLC

(57) ABSTRACT

Continuous backup from a local storage device to a remote storage device includes subdividing the local storage device into subsections, providing a time indicator that is modified periodically, and, in response to a request to write new data to a particular subsection of the local storage device at a particular time, maintaining at the remote storage device data being overwritten by the new data according to the particular subsection and according to a value of the indicator at the particular time. Providing continuous backup from a local storage device to a remote storage device may also include restoring the local storage device to a state thereof at a particular point in time by writing the maintained data to the remote storage device and transferring the data from the remote storage device to the local storage device.

22 Claims, 42 Drawing Sheets

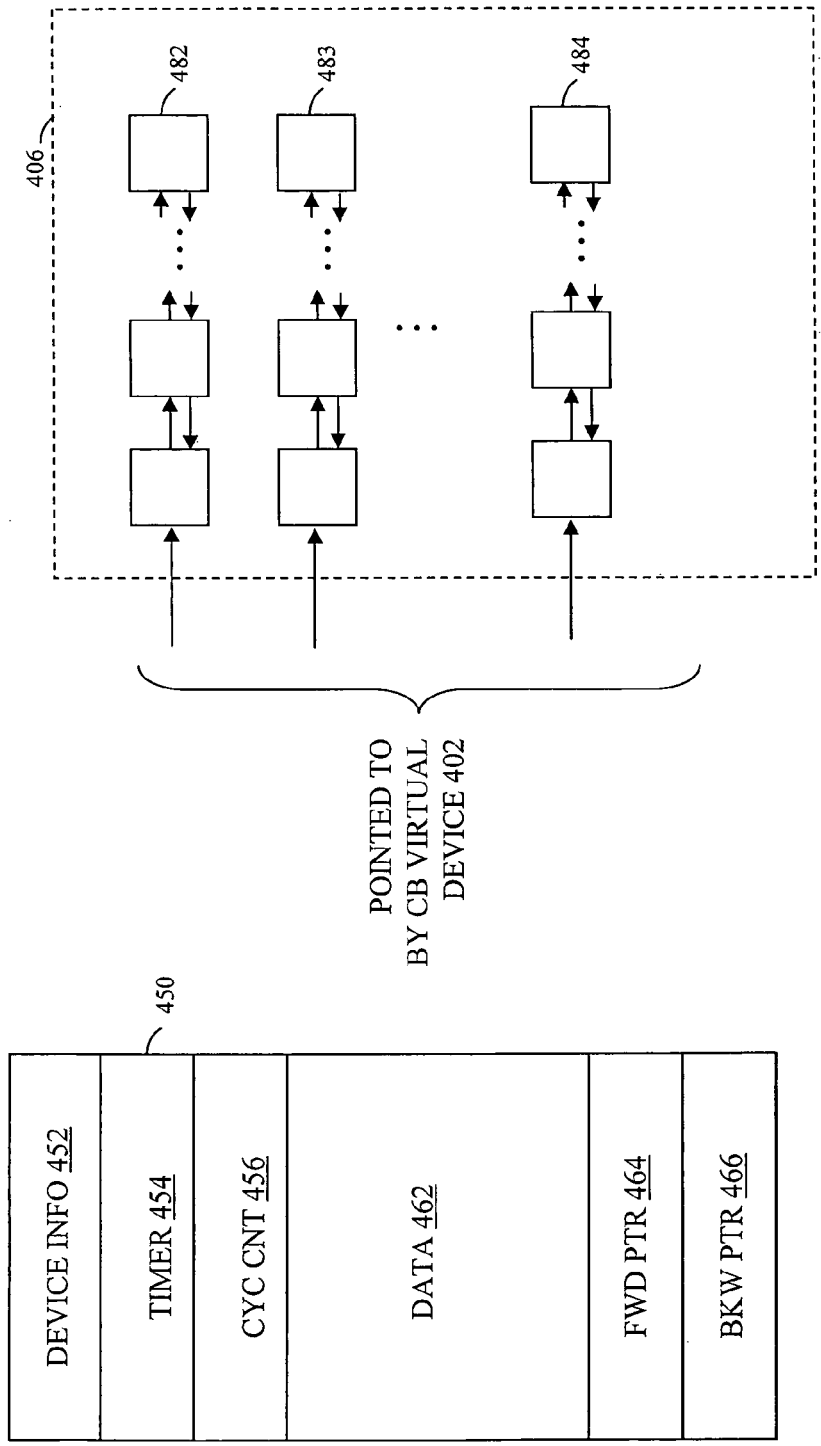

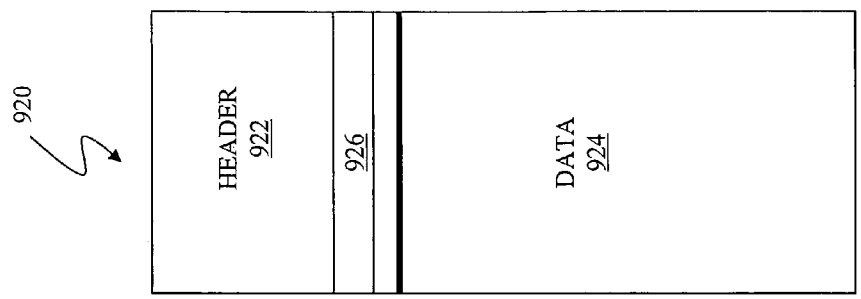
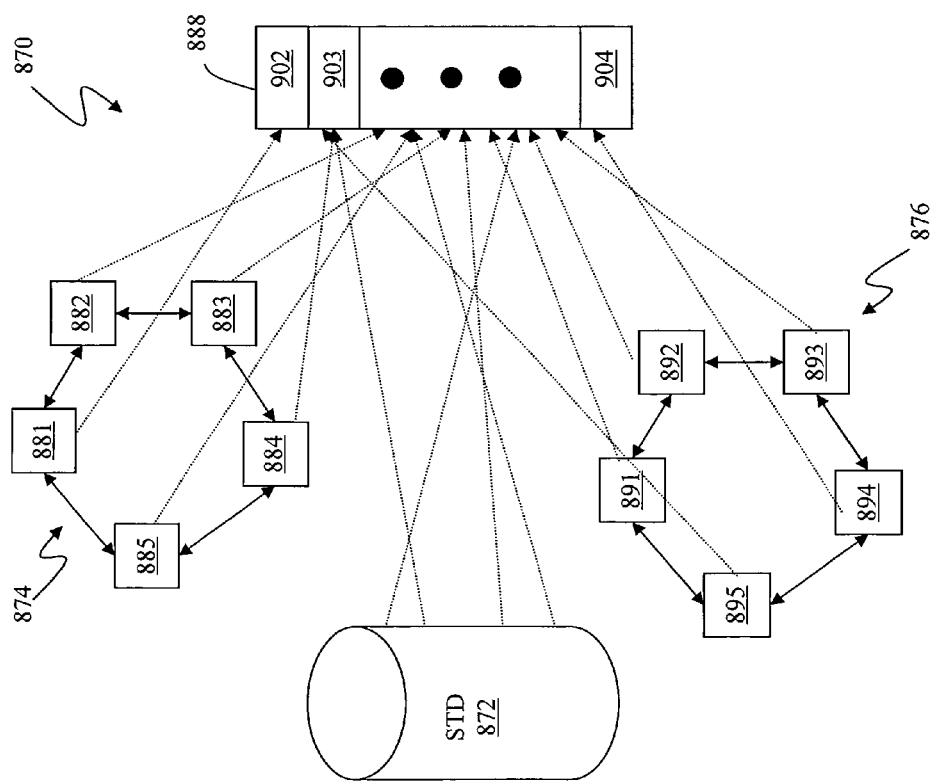

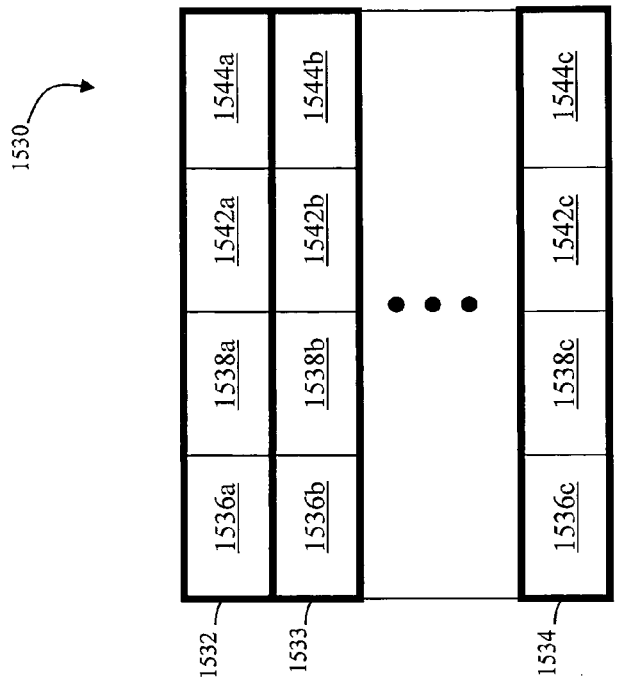
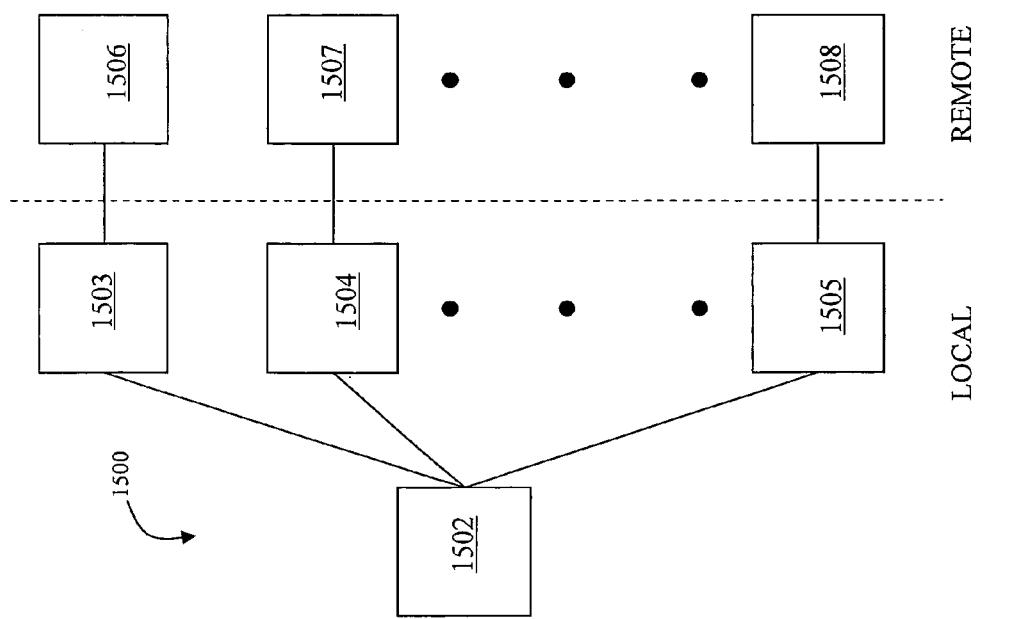
FIGURE 38
FIGURE 37

CONTINUOUS BACKUP OF A STORAGE DEVICE

BACKGROUND OF THE INVENTION

1. Technical Field

This application relates to computer storage devices, and more particularly to the field of selectively maintaining and modifying portions of data stored on a computer storage device and corresponding to particular points in time.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. The logical volumes may or may nor correspond to the actual disk drives.

Data backup services may be used to protect against data loss. Such services may be performed periodically (e.g., once or twice a day). When data on the main system is lost, it may be recovered from the backup media.

There are a number of drawbacks to such data backup services, including the fact that it is only possible to recover data that corresponds to data that was saved at a periodic backup. For example, if data is backed up at 9:00 a.m. and 3:00 p.m. daily, then a user is not able to recover data from, say, 11:00 a.m. If a user desires the 11:00 a.m. version of the data, the best he or she can do is obtain a copy of the backed up 9:00 a.m. version of the data and then perform steps to construct the 11:00 a.m. version of the data (e.g., by manually reconstructing the data).

One solution to this problem is to perform backups more frequently. However, increasing the frequency of backups increases the storage requirements for backup data and increases the overhead and complexity of the backup data. Ideally, it is desirable to allow obtaining data from any previous time by having a system with continuous or near continuous backups that does not have the increased storage requirements or complexity associated with increasing the frequency of backups.

SUMMARY OF THE INVENTION

According to the present invention, providing continuous backup of a storage device, includes subdividing the storage device into subsections, providing a time indicator that is modified periodically, and, in response to a request to write new data to a particular subsection of the storage device at a particular time, maintaining data being overwritten by the new data according to the particular subsection and according to a value of the indicator at the particular time. The subsections may be tracks. Maintaining the data being overwritten may include constructing a linked list of portions of data for each of the subsections. The portions of data may have variable sizes. In response to two data write operations to a particular subsection at a particular value of the indicator, data being written for each of the two data write operations may be combined if data for the second data write operation is a subset of data for the first data write operation. Providing continuous backup of a storage device may also include restoring the storage device to a state thereof at a particular point in time by writing the maintained data to the storage device. Writing the maintained data to the storage device may include constructing subsections of the data by combining separate portions thereof corresponding to the same subsection. Providing continuous backup of a storage device may also include inserting data for a particular subsection at a particular point in time by traversing data corresponding to the particular subsection to obtain an appropriate insertion point. Providing continuous backup of a storage device may also include reading data for a particular subsection at a particular point in time by traversing data corresponding to the particular subsection and reading from the group consisting of: data from the storage device, maintained data, and a combination of maintained data and data from the storage device. Providing continuous backup of a storage device may also include compressing data by combining consecutive portions for a subsection.

According further to the present invention, computer software, in a storage medium, that provides continuous backup of a storage device, includes executable code that obtains a value of a time indicator that is modified periodically and executable code that, in response to a request to write new data to a particular subsection of the storage device at a particular time, maintains data being overwritten by the new data according to the particular subsection and according to a value of the indicator at the particular time. The subsections may be tracks. Executable code that maintains the data being overwritten may construct a linked list of portions of data for each of the subsections. The portions of data may have variable sizes. In response to two data write operations to a particular subsection at a particular value of the indicator, data being written for each of the two data write operations may be combined if data for the second data write operation is a subset of data for the first data write operation. The computer software may also include executable code that restores the storage device to a state thereof at a particular point in time by writing the maintained data to the storage device. Executable code that writes the maintained data to the storage device may construct subsections of the data by combining separate portions thereof corresponding to the same subsection. The computer software may also include executable code that inserts data for a particular subsection at a particular point in time by traversing data corresponding to the particular subsection to obtain an appropriate insertion point. The computer software may also include executable code that reads data for a particular subsection at a particular point in time by traversing data corresponding to the particular subsection and reading from the group consisting of: data from the storage device, maintained data, and a combination of maintained data and data from the storage device. The computer software may also include executable code that compresses data by combining consecutive portions for a subsection.

According further to the present invention, providing continuous backup of a storage device includes subdividing the storage device into subsections, providing a mirror device of the storage device that contains a copy of data that is on the storage device when the continuous backup is initiated, providing a time indicator that is modified periodically, and, in response to a request to write new data to a particular subsection of the storage device at a particular time, maintaining data being overwritten by the new data according to the particular subsection and according to a value of the indicator at the particular time, where, for a first write after the continuous backup is initiated, data from the mirror device is used to maintain data being overwritten. The subsections may be tracks. Maintaining the data being overwritten may include constructing a linked list of portions of data for each of the subsections. The portions of data may have variable sizes. In response to two data write operations to a particular subsection at a particular value of the indicator, data being written for each of the two data write operations may be combined if data for the second data write operation is a subset of data for the first data write operation. Providing continuous backup of a storage device may also include restoring the storage device to a state thereof at a particular point in time by writing the maintained data to the storage device. Writing the maintained data to the storage device may include constructing subsections of the data by combining separate portions thereof corresponding to the same subsection. Providing continuous backup of a storage device may also include inserting data for a particular subsection at a particular point in time by traversing data corresponding to the particular subsection to obtain an appropriate insertion point. Providing continuous backup of a storage device may also include reading data for a particular subsection at a particular point in time by traversing data corresponding to the particular subsection and reading from the group consisting of: data from the storage device, maintained data, and a combination of maintained data and data from the storage device. Providing continuous backup of a storage device may also include compressing data by combining consecutive portions for a subsection.

According further to the present invention, computer software, in a storage medium, that provides continuous backup of a storage device, includes executable code that obtains a value of a time indicator that is modified periodically and executable code that, in response to a request to write new data to a particular subsection of the storage device at a particular time, maintains data being overwritten by the new data according to the particular subsection and according to a value of the indicator at the particular time where, for a first write after the continuous backup is initiated, data used to maintain data being overwritten is from a mirror device of the storage device, the mirror device containing a copy of data that is on the storage device when the continuous backup is initiated. The subsections may be tracks. Executable code that maintains the data being overwritten may construct a linked list of portions of data for each of the subsections. The portions of data may have variable sizes. In response to two data write operations to a particular subsection at a particular value of the indicator, data being written for each of the two data write operations may be combined if data for the second data write operation is a subset of data for the first data write operation. The computer software may also include executable code that restores the storage device to a state thereof at a particular point in time by writing the maintained data to the storage device. Executable code that writes the maintained data to the storage device may construct subsections of the data by combining separate portions thereof corresponding to the same subsection. The computer software may also include executable code that inserts data for a particular subsection at a particular point in time by traversing data corresponding to the particular subsection to obtain an appropriate insertion point. The computer software may also include executable code that reads data for a particular subsection at a particular point in time by traversing data corresponding to the particular subsection and reading from the group consisting of: data from the storage device, maintained data, and a combination of maintained data and data from the storage device. The computer software may also include executable code that compresses data by combining consecutive portions for a subsection.

According further to the present invention providing continuous backup from a local storage device to a remote storage device includes subdividing the local storage device into subsections, providing a time indicator that is modified periodically, and, in response to a request to write new data to a particular subsection of the local storage device at a particular time, maintaining at the remote storage device data being overwritten by the new data according to the particular subsection and according to a value of the indicator at the particular time. The subsections may be tracks. Maintaining the data being overwritten may include constructing a linked list of portions of data for each of the subsections. The portions of data may have variable sizes. In response to two data write operations to a particular subsection at a particular value of the indicator, data being written for each of the two data write operations may be combined if data for the second data write operation is a subset of data for the first data write operation. Providing continuous backup from a local storage device to a remote storage device may also include restoring the local storage device to a state thereof at a particular point in time by writing the maintained data to the remote storage device and transferring the data from the remote storage device to the local storage device. Writing the maintained data to the storage device may include constructing subsections of the data by combining separate portions thereof corresponding to the same subsection. Providing continuous backup from a local storage device to a remote storage device may also include inserting data for a particular subsection at a particular point in time by traversing data corresponding to the particular subsection to obtain an appropriate insertion point. Providing continuous backup from a local storage device to a remote storage device may also include providing a virtual storage device at the local storage device, where the virtual storage device provides access to data maintained at the remote storage device, and reading data for a particular subsection at a particular point in time by traversing data at the remote storage device corresponding to the particular subsection and reading from data from the local storage device, maintained data, and a combination of maintained data and data from the local storage device, where the maintained data is accessed through the virtual storage device. Providing continuous backup from a local storage device to a remote storage device may also include compressing data by combining consecutive portions for a subsection.

According further to the present invention, computer software, in a storage medium, that provides continuous backup from a local storage device to a remote storage device, includes executable code that obtains a value of a time indicator that is modified periodically and executable code that, in response to a request to write new data to a particular subsection of the local storage device at a particular time, maintains at the remote storage device data being overwritten by the new data according to the particular subsection and according to a value of the indicator at the particular time. The subsections may be tracks. Executable code that maintains the data being overwritten may construct a linked list of portions of data for each of the subsections. The portions of data may have variable sizes. In response to two data write operations to a particular subsection at a particular value of the indicator, data being written for each of the two data write operations may be combined if data for the second data write operation is a subset of data for the first data write operation. The computer software may also include executable code that restores the storage device to a state thereof at a particular point in time by writing the maintained data to the remote storage device and transferring the data from the remote storage device to the local storage device. Executable code that writes the maintained data to the storage device may construct subsections of the data by combining separate portions thereof corresponding to the same subsection. The computer software may also include executable code that inserts data for a particular subsection at a particular point in time by traversing data corresponding to the particular subsection to obtain an appropriate insertion point. The computer software may also include executable code that reads data for a particular subsection at a particular point in time by traversing data at the remote storage device corresponding to the particular subsection and reading from the local storage device, maintained data, or a combination of maintained data and data from the local storage device, where the maintained data is accessed through a virtual storage device provided at the local storage device to access to data maintained at the remote storage device. The computer software may also include executable code that compresses data by combining consecutive portions for a subsection.

BRIEF DESCRIPTION OF DRAWINGS

FIG. 17 is a diagram illustrating a data structure used in connection with a continuous backup virtual device according to the system described herein.

FIG. 18 is a diagram illustrating linked lists used in connection with a continuous backup virtual device according to the system described herein.

FIG. 29 is a schematic diagram illustrating items for constructing and manipulating chunks of data on a local storage device according to the system described herein.

FIG. 30 is a diagram illustrating a data structure for a slot on a local storage device used in connection with the system described herein.

FIG. 37 is a schematic diagram illustrating a plurality of local and remote storage devices with a host according to the system described herein.

FIG. 38 is a diagram showing a multi-box mode table used in connection with the system described herein.

DETAILED DESCRIPTION OF VARIOUS EMBODIMENTS

Figure 1:
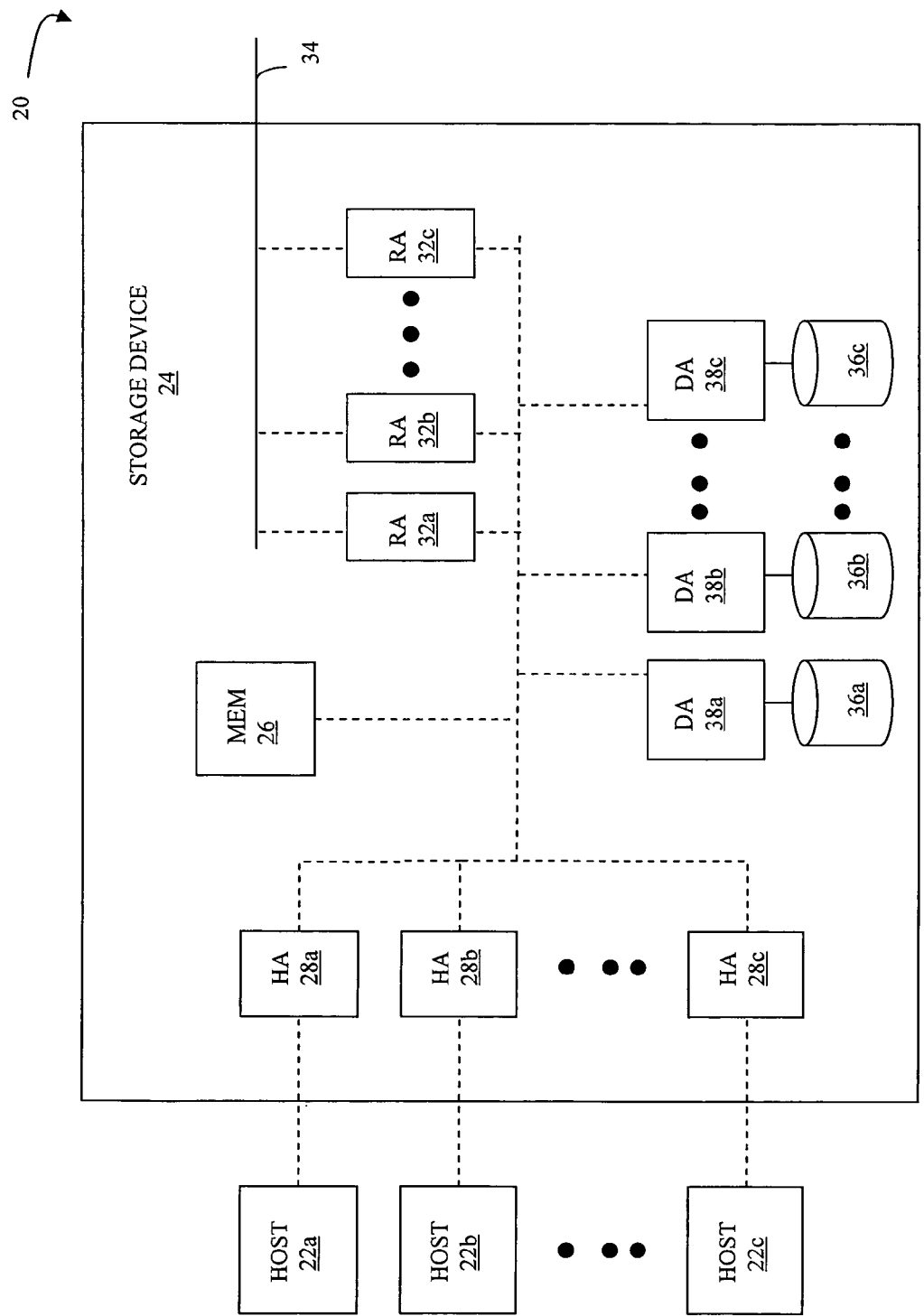
FIG. 1 is a schematic diagram showing a plurality of hosts and a data storage device used in connection with the system described herein.

Referring to FIG. 1, a diagram 20 shows a plurality of hosts 22a-22c coupled to a data storage device 24. The data storage device 24 includes an internal memory 26 that facilitates operation of the storage device 24 as described elsewhere herein. The data storage device also includes a plurality of host adaptors (HA's) 28a-28c that handle reading and writing of data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts.

The storage device 24 may include one or more RDF adapter units (RA's) 32a-32c. The RA's 32a-32c are coupled to an RDF link 34 and are similar to the HA's 28a-28c, but are used to transfer data between the storage device 24 and other storage devices (not shown) that are also coupled to the RDF link 34. The storage device 24 may be coupled to addition RDF links (not shown) in addition to the RDF link 34.

The storage device 24 may also include one or more disks 36a-36c, each containing a different portion of data stored on the storage device 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. Note that, in some embodiments, it is possible for more than one disk to be serviced by a DA and that it is possible for more than one DA to service a disk.

The logical storage space in the storage device 24 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c.

One or more internal logical data path(s) exist between the DA's 38a-38c, the HA's 28a-28c, the RA's 32a-32c, and the memory 26. In some embodiments, one or more internal busses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c, and a cache for data fetched from one or more of the disks 36a-36c. Use of the memory 26 is described in more detail hereinafter.

The storage device 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device may be coupled to a SAN fabric and/or be part of a SAN fabric. The system described herein may be implemented using software, hardware, and/or a combination of software and hardware where software may be stored in an appropriate storage medium and executed by one or more processors.

Figure 2:
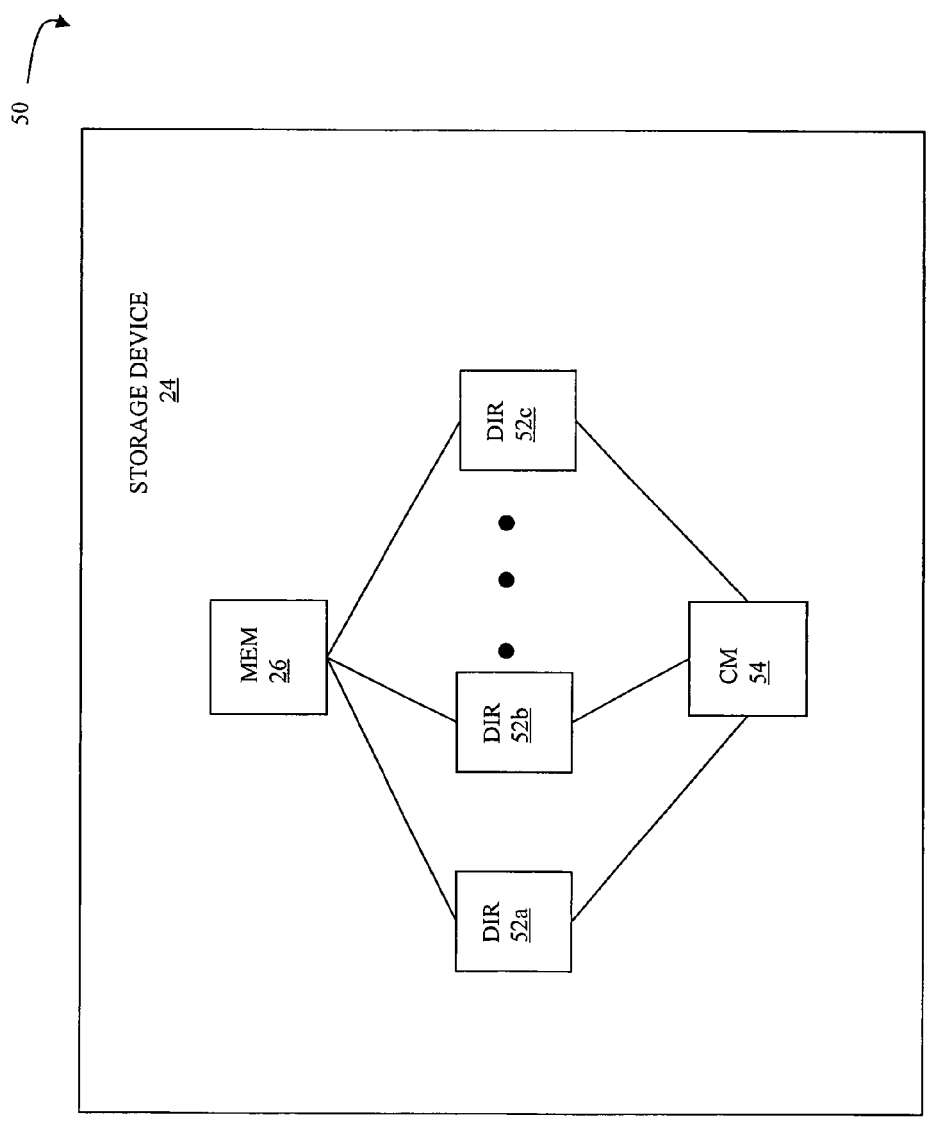
FIG. 2 is a schematic diagram showing a storage device, memory, a plurality of directors, and a communication module according to the system described herein.

Referring to FIG. 2, a diagram 50 illustrates an embodiment of the storage device 24 where each of a plurality of directors 52a-52c are coupled to the memory 26. Each of the directors 52a-52c represents one of the HA's 28a-28c, RA's 32a-32c, or DA's 38a-38c. In an embodiment disclosed herein, there may be up to sixtyfour directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

Figure 3:
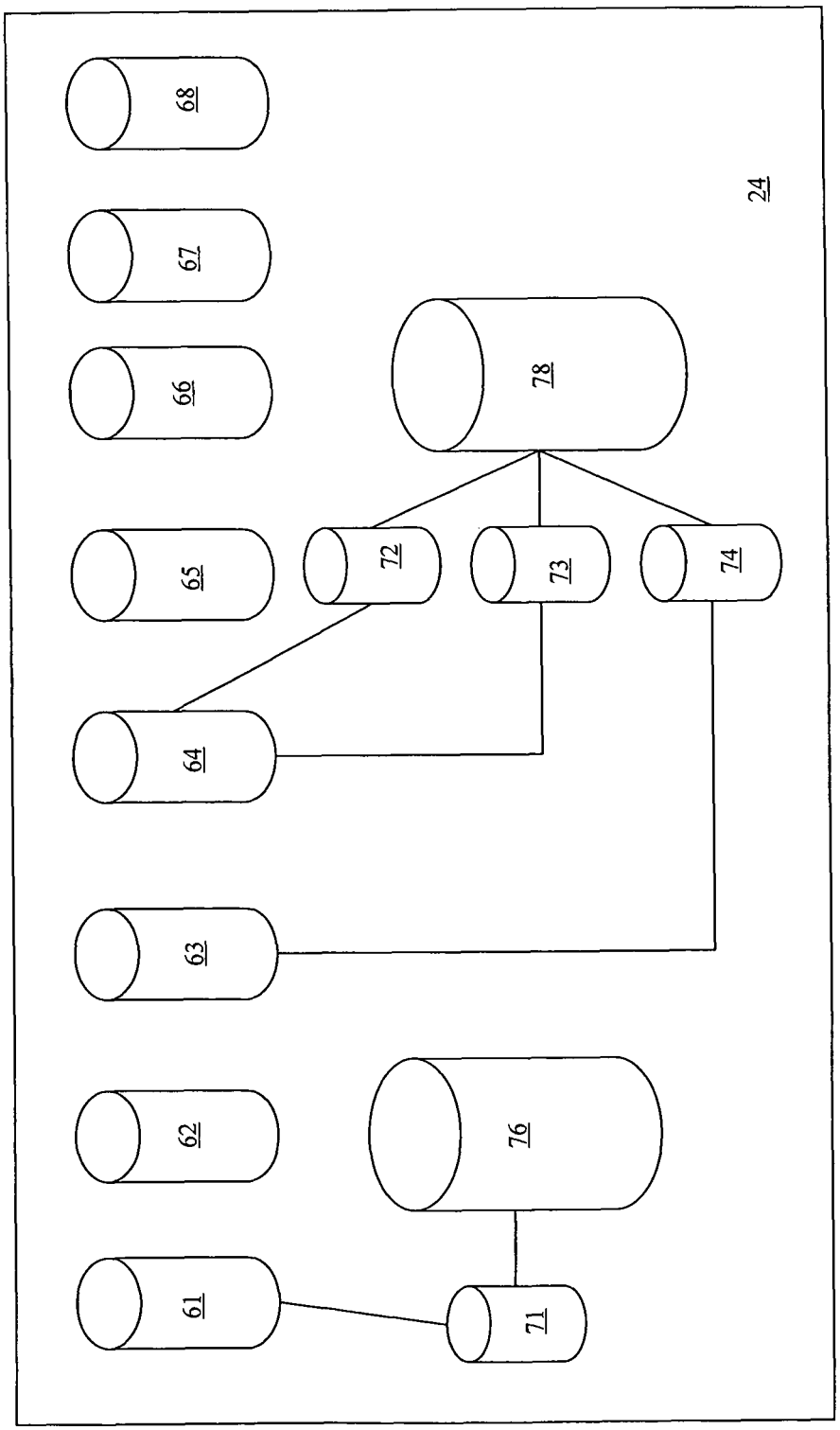
FIG. 3 is a diagram of a storage that shows various logical volumes that are used in connection with the system described herein.

Referring to FIG. 3, the storage device 24 is shown as including a plurality of standard logical devices 61-68. Each of the standard logical devices 61-68 may correspond to a volume that is accessible to one or more hosts coupled to the storage device 24. Each of the standard logical devices 61-68 may or may not correspond to one of the disk drives 36a-36c. Thus, for example, the standard logical device 61 may correspond to the disk drive 36a, may correspond to a portion of the disk drive 36a, or may correspond to a portion of the disk drive 36a and a portion of the disk drive 36b. Each of the standard logical devices 61-68 appears to the host as a contiguous block of disk storage, even though each of the standard logical devices 61-68 may or may not correspond to actual contiguous physical storage of the disk drives 36a-36c.

The storage device 24 may also includes a plurality of virtual devices 71-74. The virtual devices 71-74 appear to a host coupled to the storage device 24 as volumes containing a contiguous block of data storage. Each of the virtual devices 71-74 may represent a point in time copy of an entire one of the standard logical devices 61-68, a portion of one of the standard logical devices 61-68, or a combination of portions or entire ones of the standard logical devices 61-68. However, as described in more detail elsewhere herein, the virtual devices 71-74 do not contain the track data from the standard logical devices 61-68. Instead, each of the virtual devices 71-74 is coupled to a log device 76 or a log device 78 that stores some or all the track data, as described in more detail elsewhere herein. The virtual devices 71-74 contain tables that point to tracks of data on either on the standard logical devices 61-68 or the log devices 76, 78. In some instances, a single virtual device may store data on more than one log device.

The virtual device 71 may represent a point in time copy of the standard logical device 61. As described in more detail elsewhere herein, the virtual device 71 is coupled to the log device 76 that contains track data to facilitate the virtual device 71 appearing to a host to be a point in time copy of the standard logical device 61. It is possible for more than one virtual device to use a single log device. Thus, the virtual devices 72-74 are shown being coupled to the log device 78. Similarly, it is possible for more than one virtual device to represent point in time copies of a single standard logical device. Thus, the virtual devices 72,73 are shown as being point in time copies of the standard logical device 64. The virtual devices 72,73 may represent the same point in time copy of the standard logical device 64 or, alternatively, may represent point in time copies of the standard logical device 64 taken at different times. Note that only some of the standard logical devices 61-68 are shown as being associated with a corresponding one of the virtual devices 71-74 while others of the standard logical devices 61-68 are not.

In some embodiments, it may be possible to implement the system described herein using storage areas, instead of storage devices. Thus, for example, the virtual devices 71-74 may be virtual storage areas, the standard logical devices 61-68 may be standard logical areas, and the log devices 76,78 may be log areas. In some instances, such an implementation may allow for hybrid logical/virtual devices where a single logical device has portions that behave as a standard logical device, portions that behave as a virtual device, and/or portions that behave as log device. Accordingly, it should be understood that, in appropriate instances, references to devices in the discussion herein may also apply to storage areas that may or may not correspond directly with a storage device.

Figure 4:
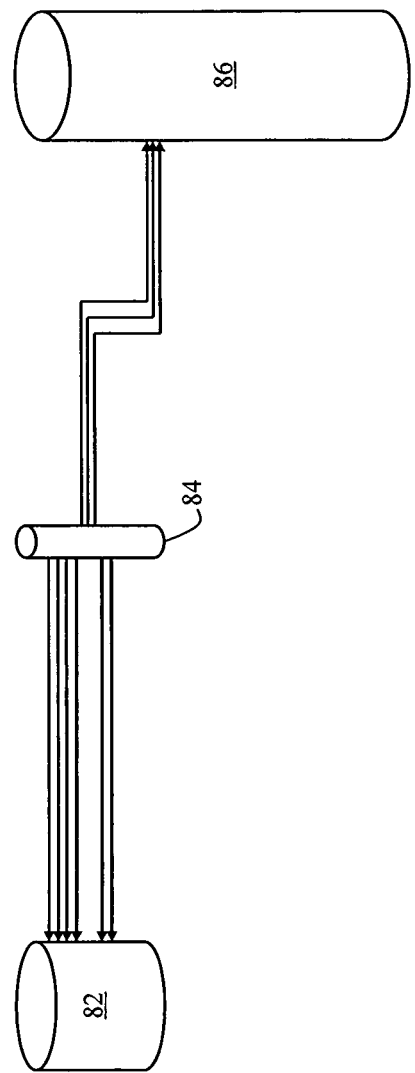
FIG. 4 is a diagram showing use of a virtual device according to the system described herein.

Referring to FIG. 4, a diagram shows a standard logical device 82, a virtual device 84, and a log device 86. As discussed above, the virtual device 84 may represent a point in time copy of all or a portion of the standard logical device 82. A host coupled to a storage device that accesses the virtual device 84 may access the virtual device 84 in the same way that the host would access the standard logical device 82. However, the virtual device 84 does not contain any track data from the standard logical device 82. Instead, the virtual device 84 includes a plurality of table entries that point to tracks on either the standard logical device 82 or the log device 86.

When the virtual device is established 84 (e.g., when a point in time copy is made of the standard logical device 82), the virtual device 84 is created and provided with appropriate table entries that, at the time of establishment, point to tracks of the standard logical device 82. A host accessing the virtual device 84 to read a track would read the appropriate track from the standard logical device 82 based on the table entry of the virtual device 84 pointing to the track of the standard logical device 82.

After the virtual device 84 has been established, it is possible for a host to write data to the standard logical device 82. In that case, the previous data that was stored on the standard logical device 82 is copied to the log device 86 and the table entries of the virtual device 84 that previously pointed to tracks of the standard logical device 82 would be modified to point to the new tracks of the log device 86 to which the data had been copied. Thus, a host accessing the virtual device 84 would read either tracks from the standard logical device 82 that have not changed since the virtual device 84 was established or, alternatively, would read corresponding tracks from the log device 86 that contain data copied from the standard logical device 82 after the virtual device 84 was established. Adjusting data and pointers in connection with reads and writes to and from the standard logical device 82 and virtual device 84 is discussed in more detail elsewhere herein.

In an embodiment described herein, hosts would not have direct access to the log device 86. That is, the log device 86 would be used exclusively in connection with the virtual device 84 (and possibly other virtual devices as described in more detail elsewhere herein). In addition, for an embodiment described herein, the standard logical device 82, the virtual device 84, and the log device 86 may be provided on the single storage device 24. However, it is possible to provide the different logical devices and the log device on separate storage devices interconnected using, for example, the RDF protocol or other remote communication protocols. In addition, it may be possible to have portions of one or more of the standard logical device 82, the virtual device 84, and/or the log device 86 provided on separate storage devices that are appropriately interconnected.

Figure 5:
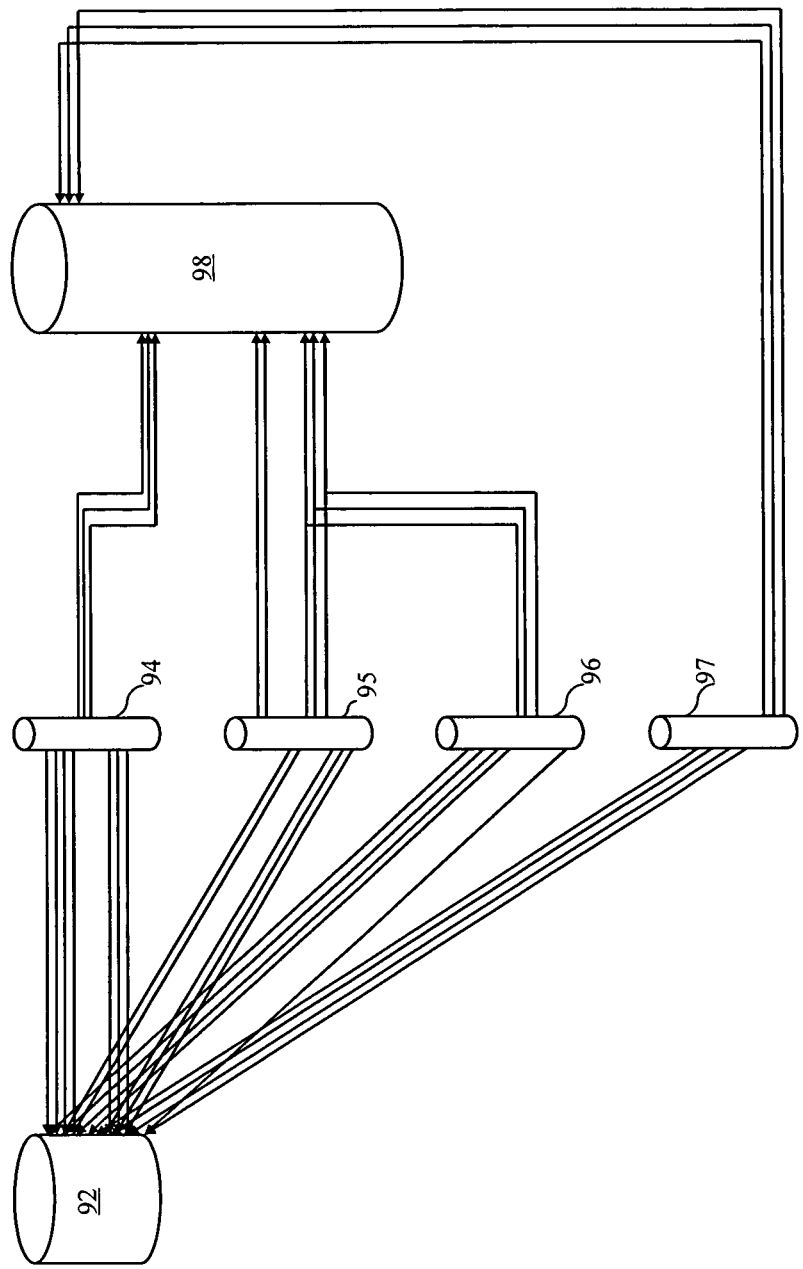
FIG. 5 is a diagram showing use of a plurality of virtual devices according to the system described herein.

Referring to FIG. 5, another example of the use of virtual devices shows a standard logical device 92, a plurality of virtual devices 94-97 and a log device 98. In the example of FIG. 5, the virtual device 94 represents a point in time copy of the standard logical device 92 taken at ten a.m. Similarly, the virtual device 95 represents a copy of the standard logical device 92 taken at twelve noon, the virtual device 96 represents a copy of the standard logical device 92 taken at two p.m., and the virtual device 97 represents a copy of the standard logical device 92 taken at four p.m. Note that all of the virtual devices 94-97 may share the log device 98. In addition, it is possible for table entries of more than one of the virtual devices 94-97, or, a subset of the table entries of the virtual devices 94-97, to point to the same tracks of the log device 98. For example, the virtual device 95 and the virtual device 96 are shown as having table entries that point to the same tracks of the log device 98.

In an embodiment discussed herein, the log device 98 and other log devices discussed herein are provided by a pool of log devices that is managed by the storage device 24. In that case, as a virtual device requires additional tracks of a log device, the virtual device would cause more log device storage to be created (in the form of more tracks for an existing log device or a new log device) using the log device pool mechanism. Pooling storage device resources in this manner is known in the art. Other techniques that do not use pooling may be used to provide log device storage.

Figure 6:
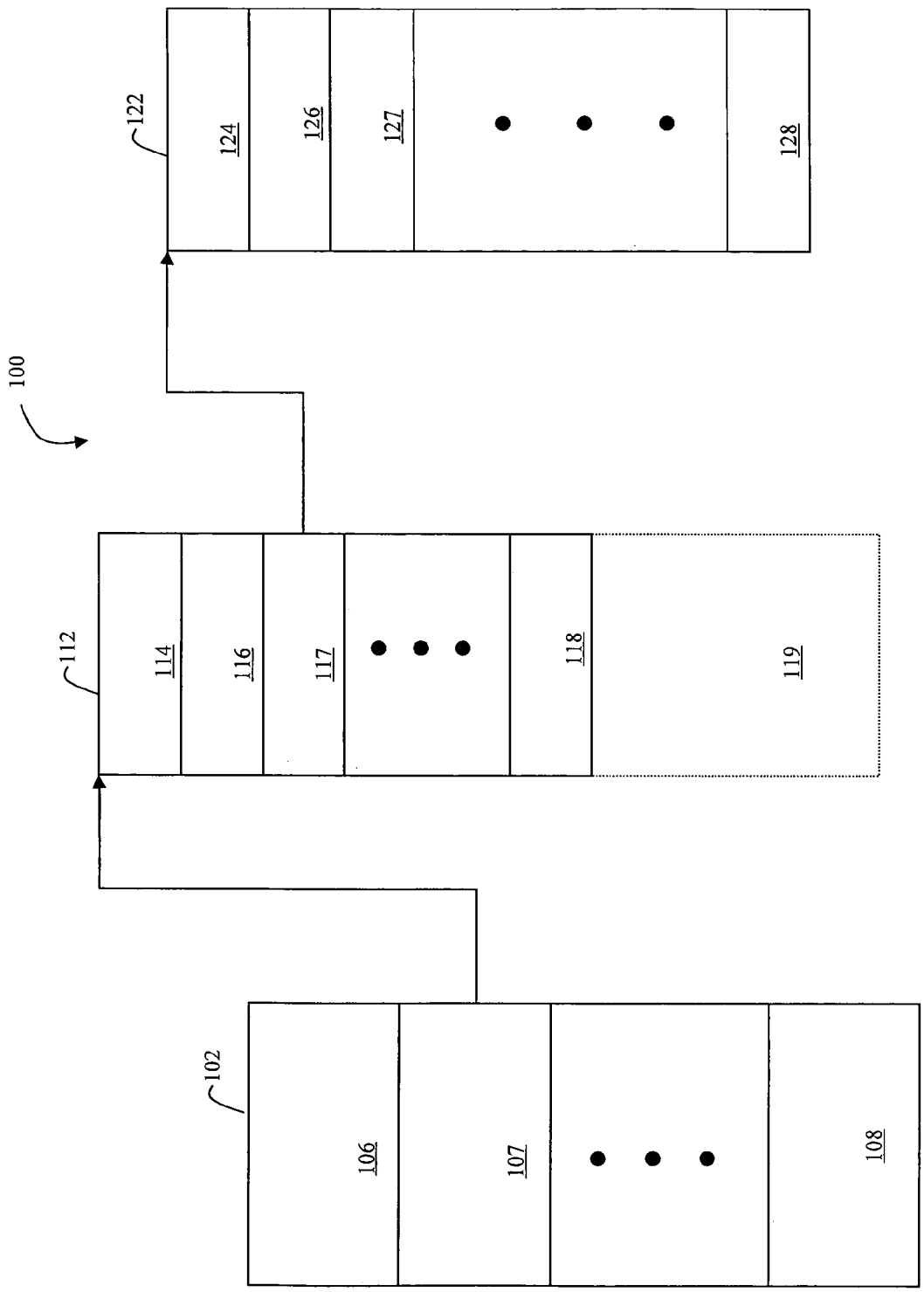
FIG. 6 is a diagram showing device tables used in connection with the system described herein.

Referring to FIG. 6, a diagram 100 illustrates tables that are used to keep track of device information. A first table 102 corresponds to all of the devices used by a storage device or by an element of a storage device, such as an HA and/or a DA.

The table 102 includes a plurality of logical device entries 106-108 that correspond to all the logical devices used by the storage device (or portion of the storage device). The entries in the table 102 include descriptions for standard logical devices, virtual devices, log devices, and other types of logical devices.

Each of the entries 106-108 of the table 102 correspond to another table that contains information for each of the logical devices. For example, the entry 107 may correspond to a table 112. The table 112 includes a header that contains overhead information. The table 112 also includes entries 116-118 for each of the cylinders of the logical device. In an embodiment disclosed herein, a logical device may contain any number of cylinders depending upon how the logical device is initialized. However, in other embodiments, a logical device may contain a fixed number of cylinders.

The table 112 is shown as including a section for extra track bytes 119. The extra track bytes 119 are used in connection with the log devices in a manner that is discussed elsewhere herein. In an embodiment disclosed herein, there are eight extra track bytes for each track of a log device. For devices that are not log devices, the extra track bytes 119 may not be used.

Each of the cylinder entries 116-118 corresponds to a track table. For example, the entry 117 may correspond to a track table 122 that includes a header 124 having overhead information. The track table 122 also includes entries 126-128 for each of the tracks. In an embodiment disclosed herein, there are fifteen tracks for every cylinder. However, for other embodiments, it may be possible to have different numbers of tracks for each of the cylinders or even a variable number of tracks for each cylinder. For standard logical devices and log devices, the information in each of the entries 126-128 includes a pointer (either direct or indirect) to the physical address on one of the disk drives 42-44 of the storage device 24 (or a remote storage device if the system is so configured). Thus, the track table 122 may be used to map logical addresses of the logical device corresponding to the tables 102, 112, 122 to physical addresses on the disk drives 42-44 of the storage device 24. For virtual devices, each of the entries 126-128 of the table 122 points to a track of a corresponding standard logical device or corresponding log device. For other embodiments, however, it may be possible to use a different mechanism where the tables 102, 122, 122 are used only for standard logical devices that contain tracks of data while another type of table, such as a simple array of tracks, is used by virtual devices to map tracks of the virtual devices to tracks of corresponding standard logical devices or log devices.

Each track of a log device is either free, meaning that it is not being used by a virtual device, or is assigned, meaning that the track is pointed to by a table entry in one or more of the virtual devices. In an embodiment disclosed herein, the tracks of a log device are managed by first creating a doubly linked list of all of the free tracks of the log device. The pointers for the doubly linked list are provided by the extra track bytes 119 of the table 112 so that the extra track bytes 119 for a log device contains eight bytes for every track of the log device. For every track of the log device that is free, the extra eight bytes include a forward pointer pointing to the next free track of the log device and a backward pointer pointing to the previous free track of the log device. Using a doubly linked list in this manner facilitates accessing free tracks of the log device.

In addition, if a track of a log device is assigned (i.e., is used by one or more virtual devices), the corresponding extra track bytes 119 for the track may be used to point back to the corresponding track of the standard logical device. Thus, when a write is performed to the standard logical device after the virtual device has been established, the data from the standard logical device is copied to a new track of the log device and the extra track bytes corresponding to the new track of the log device are made to point back to the track of the standard logical device from which the data came. Having each track of the log device point back to the corresponding track of the standard logical device is useful in, for example, data recovery situations.

In addition, for an embodiment disclosed herein, the pointers for the extra eight bytes per track for an assigned track are stored with the data also. That is, when a particular track of a log device is assigned, the pointer back to the corresponding track of a standard logical device is stored with the extra track bytes 119 and, in addition, the pointer is stored with the track data itself on the track of the log device. For CKD formatted tracks, the extra eight bytes may be stored in block zero. For FBA formatted tracks, the extra eight bytes may be stored in an additional block appended on the end of the track. In an embodiment disclosed herein, a block is five hundred and twelve bytes and an FBA track contains forty blocks, which is increased to forty one when an additional block is appended. Different track formats are disclosed, for example, in U.S. Pat. No. 5,206,939 to Yanai, et al., which is incorporated herein by reference.

The tables 102, 112, 122 of FIG. 6 may be stored in the global memory 46 of the storage device 24. In addition, the tables corresponding to devices accessed by a particular host may be stored in local memory of the corresponding one of the HA's 32-36. In addition, the RA 48 and/or the DA's 36-38 may also use and locally store portions of the tables 102, 112, 122.

Figure 7:
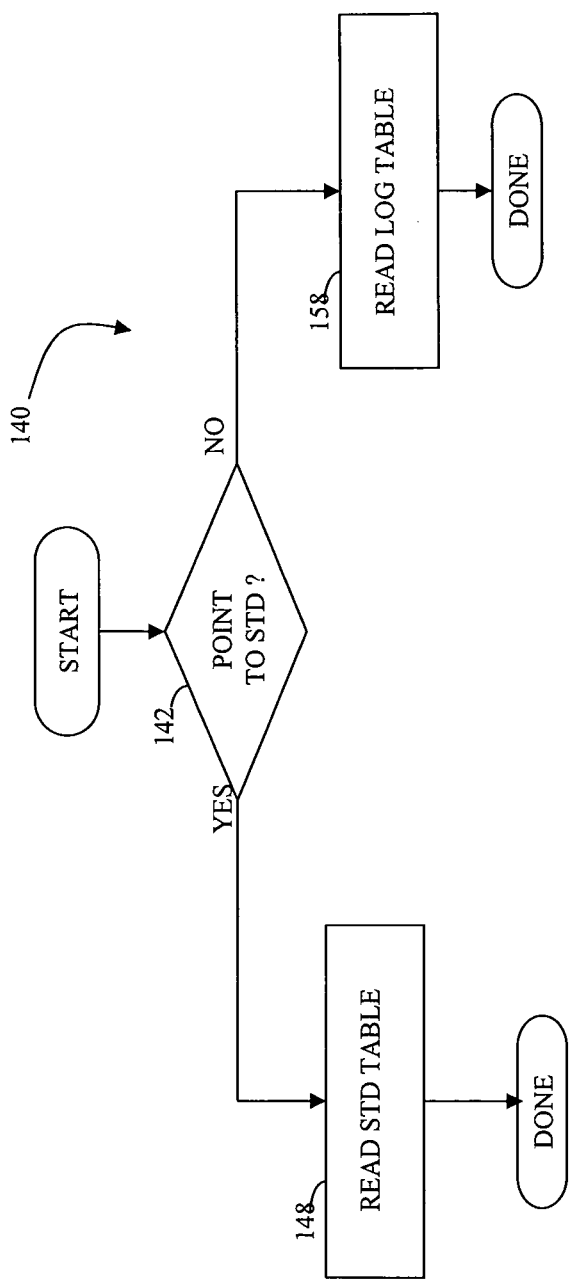
FIG. 7 is a flow chart illustrating reading a table used in connection with a virtual device according to the system described herein.

Referring to FIG. 7, a flow chart 140 illustrates steps performed when a host reads data from a device table corresponding to a track that is accessible through a virtual device. That is, the flow chart 140 illustrates obtaining information about a track that is pointed to by a table entry for a virtual device.

Processing begins at a test step 142 where it is determined if the track of interest (i.e., the track corresponding to the table entry being read) is on the standard logical device or the log device. This is determined by accessing the device table entry for the virtual device and determining whether the table entry for the track of interest points to either the standard logical device or the log device. If it is determined at the test step 142 that the pointer in the table for the virtual device points to the standard logical device, then control passes from the step 142 to a step 148 where the table entry of interest is read. Following the step 148, processing is complete.

If it is determined that the test step 142 that the pointer in the device table for the virtual device for the track of interest points to the log device, then control transfers from the step 142 to a step 158 where the log table entry of interest is read. Following the step 158, processing is complete.

Note that, in some instances, access to data may be controlled by a flag or lock that prohibits multiple processes having access to the data simultaneously. This is especially useful in instances where a device table is being read or modified. The system disclosed herein contemplates any one of a variety of mechanisms for controlling access to data by multiple processes, including conventional combinations of software and/or hardware locks, also known as "flags" or "semaphores". In some instances, a process accessing data may need to wait until another process releases the data. In one embodiment, a hardware lock controls access to a software lock (flag) so that a process first obtains control of the hardware lock, tests the software lock, and then, if the software lock is clear, the process sets the software lock and then releases the hardware lock. If the process gets the hardware lock and determines that the software lock is not clear, then the process releases the hardware lock so that another process that has set the software lock can clear the software lock at a later time. Further note that, in some instances, it is useful to first read a table entry corresponding to a particular track, read the track into a cache slot (if the track is not already in cache), lock the cache slot, and then reread the corresponding table entry.

Figure 8:
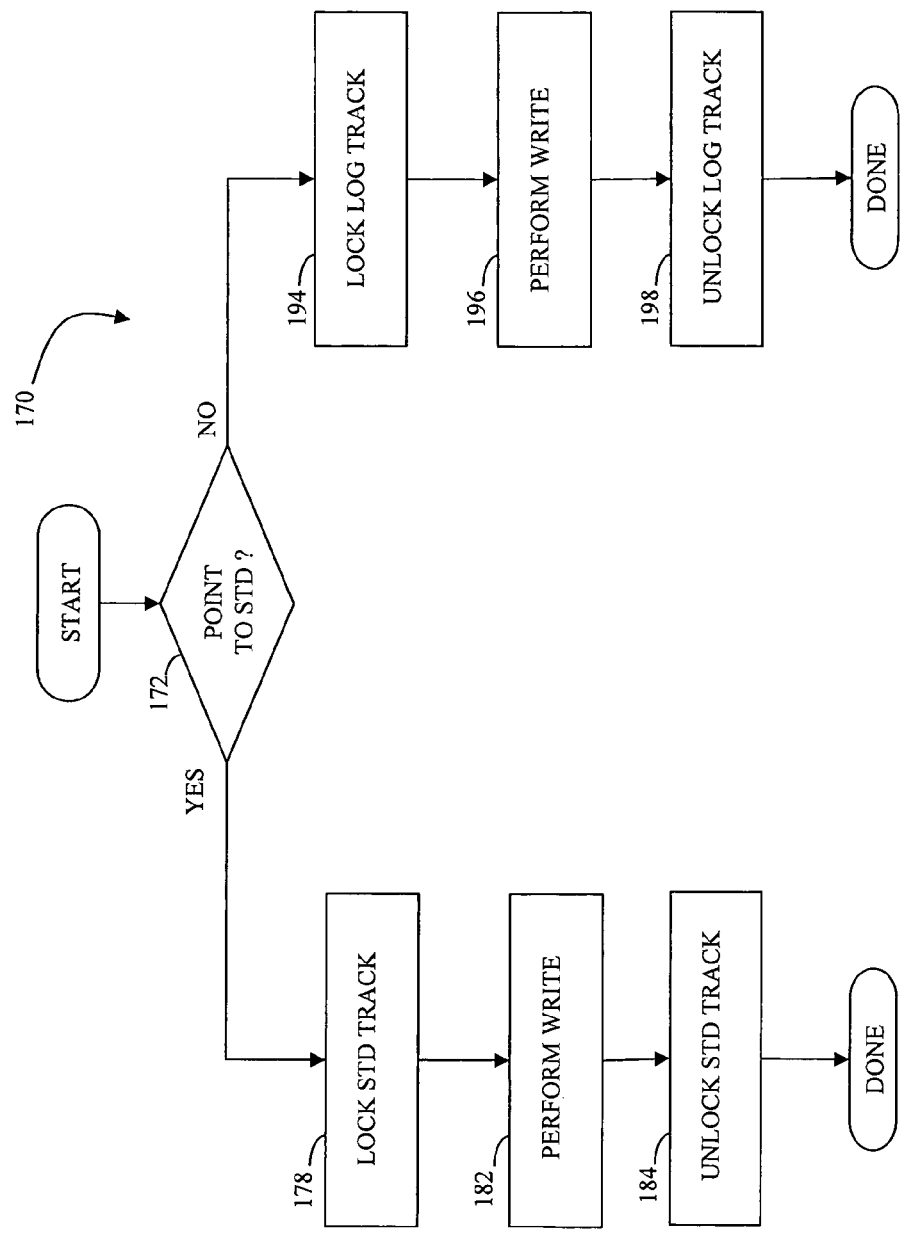
FIG. 8 is a flow chart illustrating writing to a table used in connection with a virtual device according to the system described herein.

Referring to FIG. 8, a flow chart 170 illustrates steps performed in connection with writing information to a device table for a virtual device corresponding to a standard logical device or a log device. Processing begins at a first step 172 where it is determined if the particular track corresponding to the device table entry being written is on the standard logical device or the log device. If it is determined the particular track of interest is on the standard logical device, control passes from the step 172 to a step 178 where the track corresponding to the device table entry being written is locked. Locking the track at the step 178 prevents other processes from getting access to the track, and from modifying the corresponding table entry, while the current process is modifying the device table entry corresponding to the track. Following the step 178 is a step 182 where the write operation is performed. Following the step 182 is a step 184 where the track is unlocked. Following the step 184, processing is complete.

If it is determined that the test step 172 that the track corresponding to the table entry for the virtual device that is being modified points to the log device, then control passes from the test step 172 to a step 194 where the track of the log device corresponding to the entry of the device table that is being written is locked. Following the step 194 is a step 196 where the write operation is performed. Following the step 196 is a step 198 where the track is unlocked. Following the step 198, processing is complete.

Figure 9:
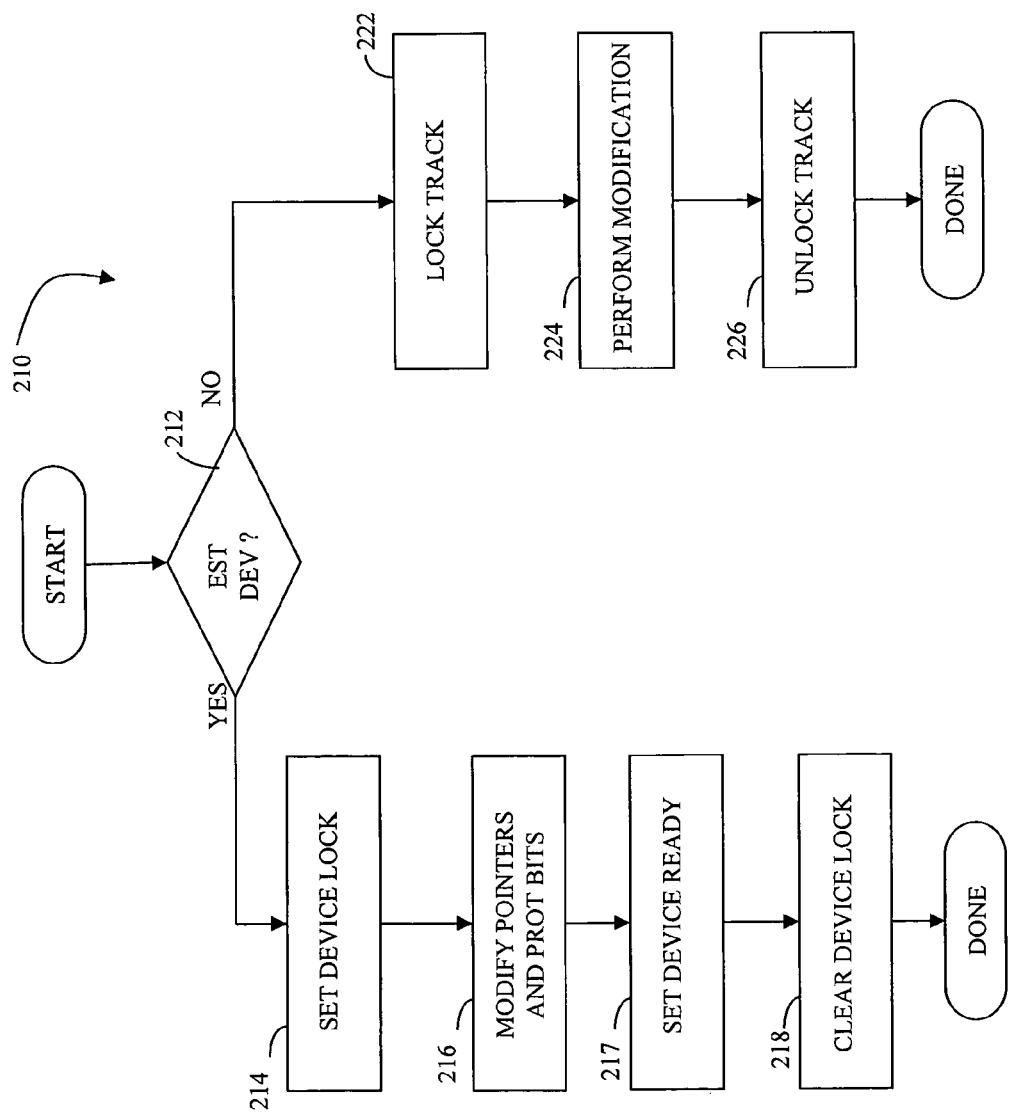
FIG. 9 is a flow chart illustrating modification of a virtual device table and establishing a virtual device according to the system described herein.

Referring to FIG. 9, a flow chart 210 illustrates steps performed in connection with modifying a device table corresponding to a virtual device. This may be contrasted with the flow chart 170 of FIG. 8 that illustrates modifying the device table for the standard logical device or the log device pointed to by an entry for a track of the device table for a virtual device. In flow chart 210, the device table for the virtual device is modified, as opposed to the device table for the standard logical device or the device table for the log device.

Processing begins at a first step 212 where it is determined if the modifications to the table relate to establishing the virtual device. As discussed elsewhere herein, establishing a virtual device includes making the virtual device available for access by a host after the virtual device is created. Establishing a virtual device causes the virtual device to be associated with a standard logical device (and thus, represent a point in time copy of the standard logical device at the time of establishment). Prior to being associated with a standard logical device, a virtual device is not established and is not accessible by a host. After being established, a virtual device is accessible by a host.

If it is determined at the step 212 that the modifications to the table relate to establishing the virtual device, then control passes from the step 212 to a step 214 where a device lock for the virtual device is set to prohibit access to the table by other processes. The device lock is comparable to the cache slot lock, discussed elsewhere herein.

Following the step 214 is a step 216 where the pointers of the virtual device table are made to point to tracks of the standard logical device and where a protection bit is set for each of the tracks of the standard logical device that corresponds to the virtual device being established. In an embodiment disclosed herein, each of the tracks of the standard logical device has sixteen bits which may be set as protection bits, one for each virtual device established to the standard logical device. In some embodiments, the protection bits may have uses that are unrelated to virtual devices. A new virtual device being established may be assigned a new bit position in the sixteen bit field while the bit for each track of the standard logical device may be set. As discussed in more detail elsewhere herein, the protection bit being set followed by a subsequent write to the standard logical device indicates that special processing needs to take place to accommodate the virtual device established to the standard logical device. The special processing is described in more detail elsewhere herein. Also at the step 216, the track entries for the device table for the virtual device are all modified to point to the corresponding tracks of the standard logical device. Thus, when the virtual device is first established, all of the pointers of the device table of the virtual device point to the tracks of the standard logical device.

Following the step 216 is a step 217 the virtual device is set to the ready state, thus making the virtual device accessible to hosts. Following the step 217 is a step 218 where the virtual device is unlocked, thus allowing access by other processes. Following the step 218, processing is complete.

If it is determined that the test step 212 that the virtual device is not being established (i.e., some other operation is being performed), then control passes from the test step 212 to a step 222 to lock a track corresponding to the entry of the device table for the virtual device that is being modified. Note that the track that is locked at the step 222 may either be a track on the standard logical device (if the entry of interest in the device table of the virtual device points to the standard logical device) or a track of the log device (if the entry of interest points to the log device). Following the step 222 is a step 224 where the modification to the device table for the virtual device is performed. Following the step 224 is a step 226 where the track is unlocked. Following the step 226, processing is complete.

Figure 10:
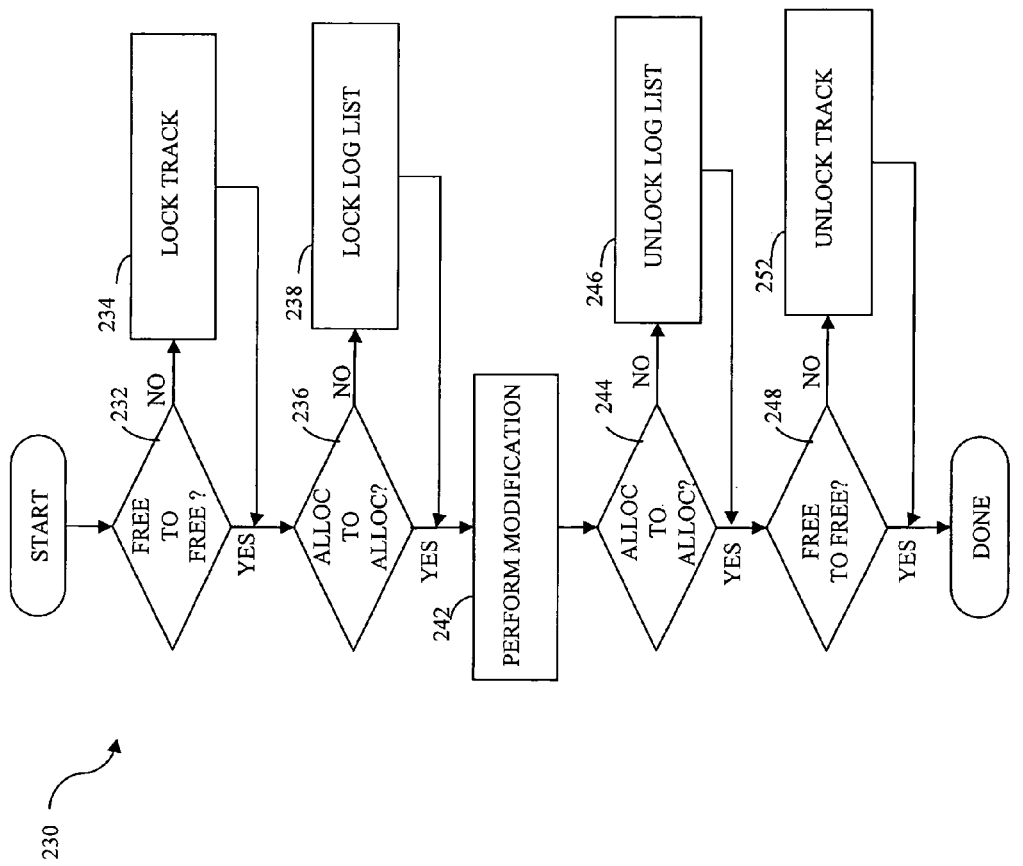
FIG. 10 is a flow chart illustrating modification of data structures used to handle tracks of a log device according to the system described herein.

Referring to FIG. 10, a flow chart 230 illustrates steps performed in connection with manipulating tracks of a log device. As discussed above, the tracks of a log device are maintained by creating a doubly linked list of tracks of the log device that are free (i.e. tracks that are available for accepting new data). Thus, if one or more tracks are needed for use in connection with a corresponding virtual device, the free tracks are obtained from the doubly linked list, which is modified in a conventional manner to indicate that the tracks provided for use by the virtual device are no longer free. Conversely, if one or more tracks that are used by one or more virtual devices are no longer needed, the tracks are returned to the doubly linked list, in a conventional manner, in order to indicate that the tracks are free. The flow chart 230 of FIG. 10 illustrates the steps performed in connection with controlling access to the tracks (and track pointers) by multiple processes which manipulate the tracks.

Processing begins at a test step 232 where it is determined if the operation being performed is modifying only tracks that are on the free list. Note that modifying tracks only on the free lists by, for example, transferring a free track from one part of the list to another part or from one free lists to another free list (in the case of multiple free lists), does not involve modifications for tracks corresponding to any data. If it is determined at the test step 232 that the modification being performed does not involve only tracks on the free list, then control transfers from the step 232 to a step 234 where the track is locked to prevent access by other processes.

Following the step 234 or the step 232 if the step 234 is not reached is a test step 236 where it is determined if the manipulation involves only allocated tracks. For any operation involving only allocated tracks, it is not necessary to lock the log device list of free tracks. If it determined at the step 236 that the operation being performed is not manipulating only allocated tracks, then control transfers from the step 236 to the step 238 where the log device list of free tracks is locked to prevent access by other processes. Following the step 238, or following the step 236 if the step 238 is not executed, is a step 242 where the modification is performed.

Following the step 242 is a test step 244 where it is determined if the manipulation involves only allocated tracks. If it is determined at the test step 244 that the modification being performed does not involve only allocated tracks, then control transfers from the step 244 to a step 246 where the log device free list is unlocked. Following the step 246 or the step 244 if the step 246 is not reached is a test step 248 where it is determined if the operation being performed is modifying only tracks that are on the free list. If it determined at the step 248 that the operation being performed is modifying only tracks that are on the free list, then control transfers from the step 248 to the step 252 where the track or tracks locked at the step 234 are unlocked. Following the step 252, or following the step 248 if the step 252 is not executed, processing is complete.

Figure 11:
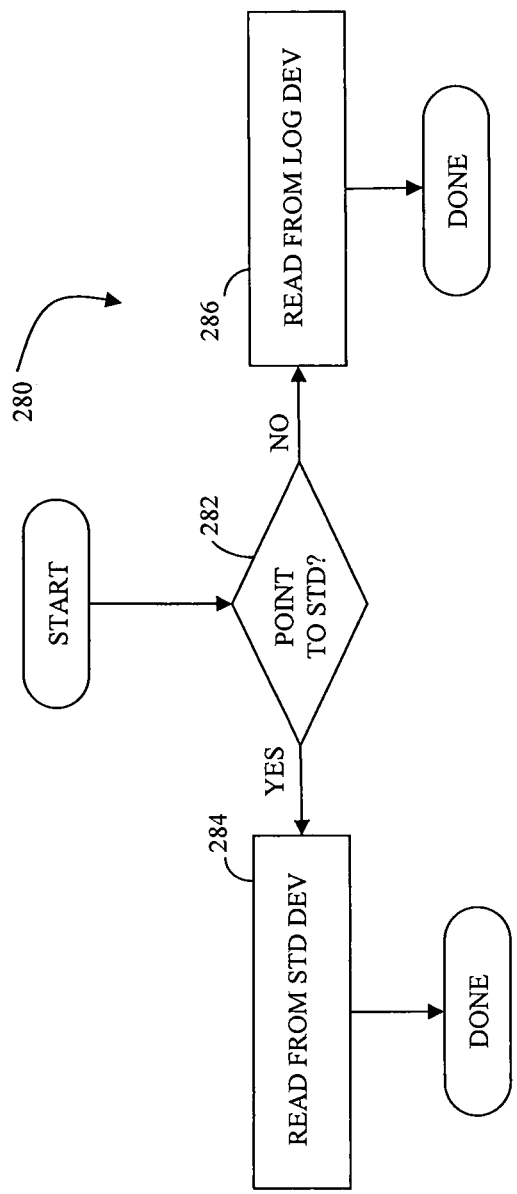
FIG. 11 is a flow chart illustrating steps performed in connection with reading a virtual device according to the system described herein.

Referring to FIG. 11, a flow chart 280 illustrates steps performed in connection with reading data from a virtual device. Processing begins at a test step 282, where it is determined if the device table entry for the track of interest of the virtual device points to the standard logical device or points to the log device. If it is determined at the test step 282 that the table points to the standard logical device, then control passes from the step 282 to a step 284, where the track is read from the standard logical device. Following the step 284, processing is complete. Alternatively, if it determined at the test step 282 that the device table of the virtual device points to the log device, then control passes from the step 282 to a step 286, where the track of interest is read from the log device. Following the step 286, processing is complete.

Note that in some instances, it may be possible that prior to the test step 282, it is determined that the track of interest being read is already in the cache memory (global memory). In that case, the track may be obtained from the cache memory without executing any of the steps 282, 284, 286.

Figure 12:
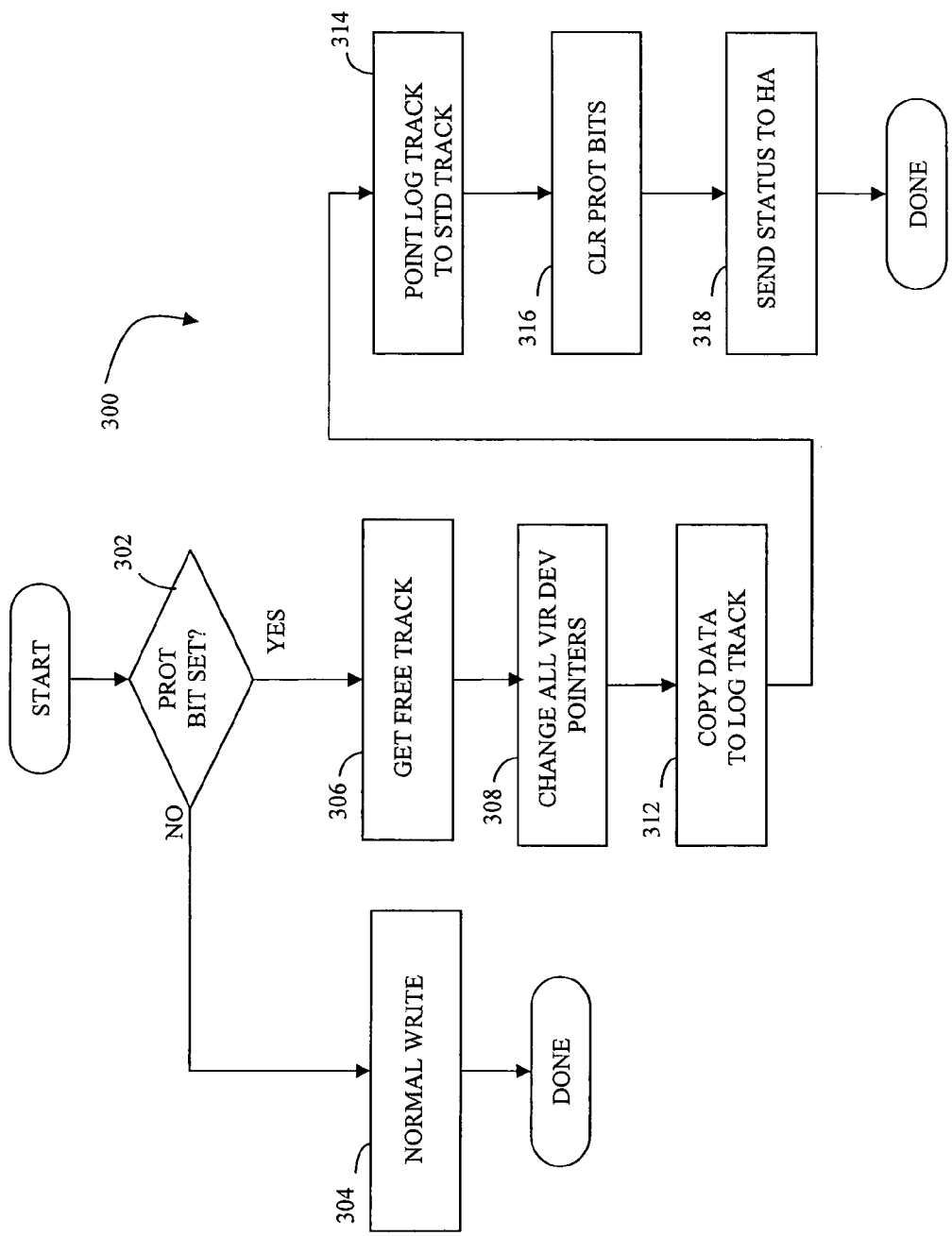
FIG. 12 is a flow chart illustrating steps performed by a disk adapter in connection with writing to a standard logical device to which a virtual device has been established according to the system described herein.

Referring to FIG. 12, a flow chart 300 illustrates steps performed by a DA in connection with writing to a track of a standard logical device to which a virtual device has been previously established. Processing begins at a first step 302 where it is determined if any protection bits for the track being written on the standard logical device have been set. If it determined at the test step 302 that the protection bits are not set, then control transfers from the step 302 to a step 304, where a normal write operation is performed. That is, at the step 304, data is written to the standard logical device in a conventional fashion without regard to the existence of a virtual device that had been previously established to the standard logical device. Following the step 304, processing is complete.

If it is determined at the test step 302 that one or more protection bits have been set on the track of the standard logical device that is being written, control passes from the step 302 to a step 306, where a free track of the log device is obtained. The free track of the log device is needed to copy data from the track of the standard logical device. Also, as described in more detail elsewhere herein, free tracks of the log device may be managed using a doubly-linked list of the free tracks. Thus, at the step 306, it may be possible to obtain a free track by traversing the list of free tracks of the log device and modifying the pointers appropriately to remove one of the free tracks for use.

Following the step 306 is a step 308, where, for each virtual device that corresponds to a protection bit that was determined to be set at the test step 302, the pointers of the virtual devices, which initially pointed to the track being written on the standard logical device, are modified at the step 308 to point to the free track of the log device obtained at the step 306. As discussed above, it is possible to have more than one virtual device established to a standard logical device. For each virtual device that has been established to a particular standard logical device, a specific protection bit will be set for each of the tracks of the standard logical device. Thus, at the step 308, the track pointers are changed for all the virtual devices corresponding to a set protection bit detected at the step 302. The track pointers in the device tables of virtual devices are modified to point to the new track that was obtained at the step 306.

Following the step 308 is a step 312, where the data is caused to be copied from the standard logical device to the new track on the log device that was obtained at the step 306. In an embodiment disclosed herein, the data may be copied by moving the data from disk storage to the global memory of the storage device (e.g., into a cache slot), and then setting a write pending indicator to cause the data to be copied to the track of the log device obtained at the step 306. The step 312 represents copying the data from the track of the standard logical device that is being written to the new track of the log device obtained at the step 306. Since all the pointers are modified at the step 308, any virtual device that has been established to the standard logical device prior to the track being written now points to the old data (i.e., the data as it existed on the track of the standard device when the virtual devices were established). Note also that, in connection with copying the track, the protection bits of the standard logical device track are copied to virtual device map bits for the track on the log device, which is explained in more detail elsewhere herein.

Following the step 312 is a step 314, where the track of the log device obtained at the step 306 is modified so that the extra bytes in the table (discussed elsewhere herein) are made to point back to the track of the standard logical device that is being written. Having the track of the log device point to the corresponding track of the standard logical device from which the data was provided is useful in many instances. For example, it may be useful in connection with data recovery. Following the step 314 is a step 316, where the protection bits of the tracks of the standard logical device being written are cleared. Following the step 316 is a step 318, where status is sent to the HA. Following the step 318, processing is complete.

Note that once the HA receives status, the HA may perform a normal write operation and, in that case, at the test step 302, the protection bits will not be set, since the bits are cleared at the step 316. The HA that is performing the write operation sees the protection bits that are set at the step 302 and sends a protection request to the appropriate DA. The HA then may disconnect from the DA and wait for status to arrive from the DA indicating that a normal write may be performed. While the HA is disconnected and waiting for status from the DA, the DA may perform the steps disclosed in the flow chart 300. This is described in more detail below.

Figure 13:
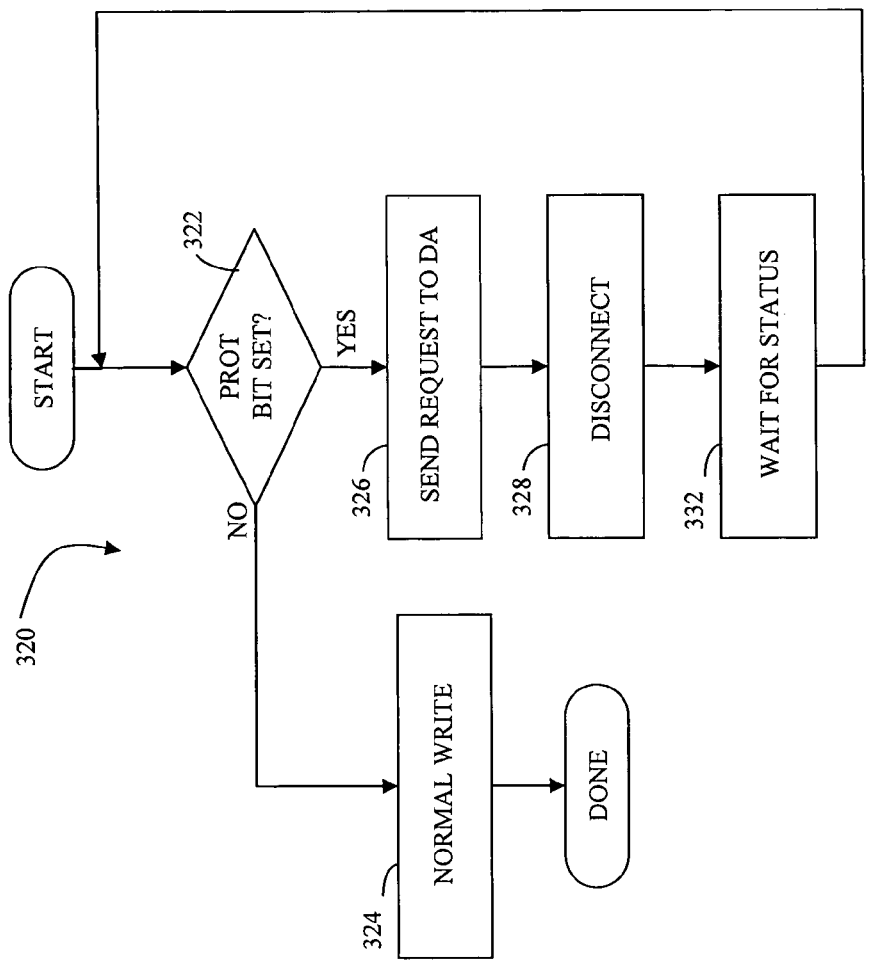
FIG. 13 is a flow chart illustrating steps performed by a host adapter in connection with writing to a standard logical device to which a virtual device has been established according to the system described herein.

Referring to FIG. 13, a flow chart 320 illustrates steps performed by an HA in connection with a write to a standard logical device to which one or more virtual devices have been established. Processing begins at a first test step 322, where it is determined if any protection bits are set for the tracks of the standard logical device that are being written. If it is determined at the test step 322 that no protection bits are set, then control passes from the step 322 to a step 324, where a normal write is performed. Following the step 324, processing is complete.

If it is determined at the test step 322 that one or more protection bits are set for the tracks of the standard logical device that are being written, control passes from the step 322 to a step 326, where the HA sends a request to the DA indicating that protection bits are set for the tracks. When the DA receives the request that is sent at the step 326, the DA performs the operations set forth in the flow chart 300 of FIG. 12, discussed above. Following the step 326 is a step 328, where the HA disconnects from the DA in order to allow (possibly unrelated) operations to be performed with the DA by other processes and/or other HA's.

Following the step 328 is a step 332, where the HA waits for the DA to perform the operations set forth in the flow chart 300 of FIG. 12 and to send status to the HA indicating that the appropriate steps have been performed to handle the set protection bits. Following the step 332, processing transfers back to the step 322, where the protection bits for the track of the standard logical device are again tested. Note that on a second iteration, it is expected that the protection bits of the track of the standard logical device that are being written would be clear at the step 322, since the DA would have cleared the protection bits in connection with performing the steps of the flow chart 300. Of course, it is always possible that a new virtual device will be established to the standard logical device in between the DA clearing the protection bits and the step 322 being executed again. However, it is usually expected that the second iteration of the step 322 for a particular track of the standard logical device will determine that all the protection bits are clear, and control will transfer from the step 322 to the step 324 to perform a normal write.

Figure 14:
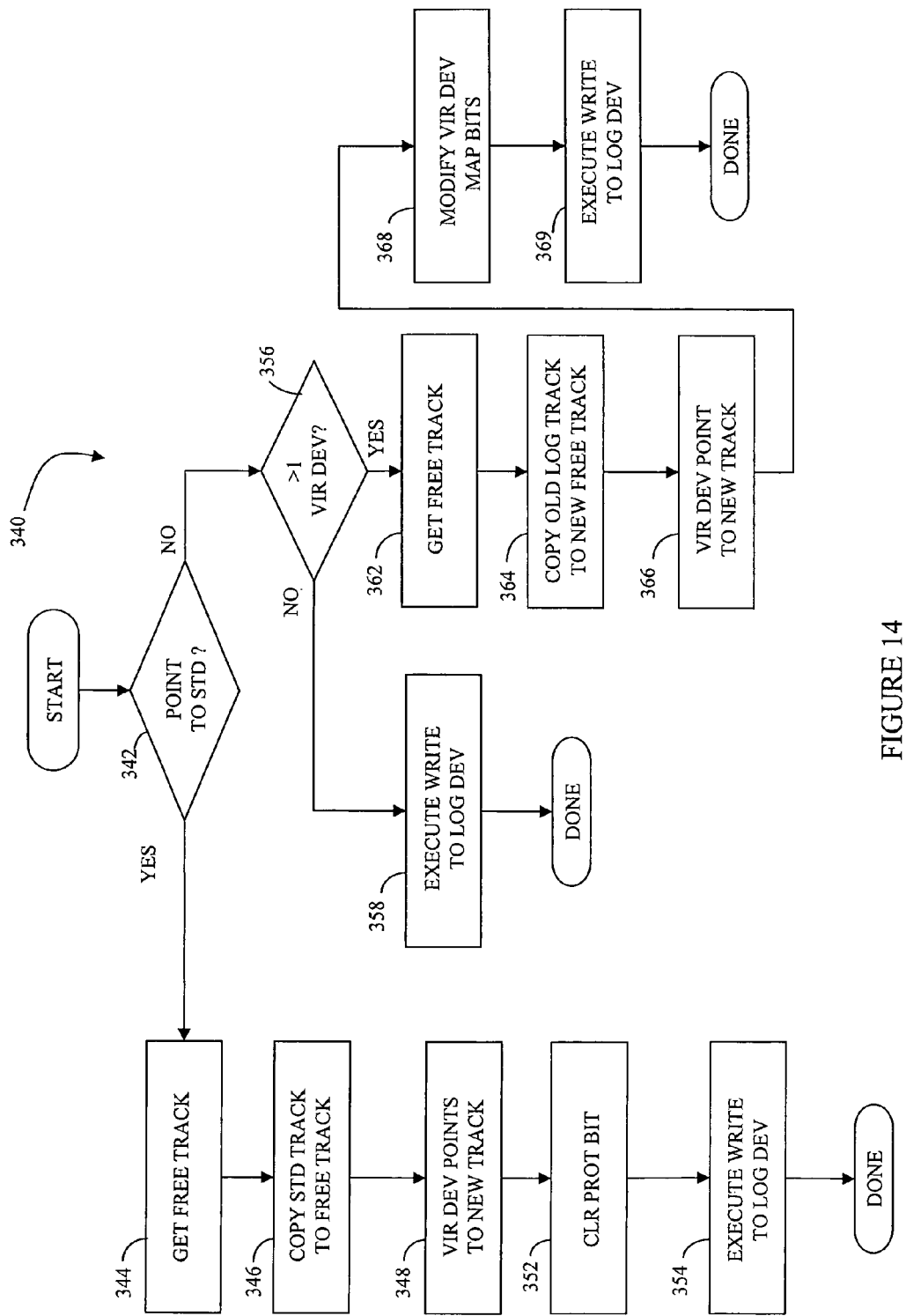
FIG. 14 is a flow chart illustrating steps performed in connection with writing to a virtual device according to the system described herein.

Referring to FIG. 14, a flow chart 340 illustrates steps performed in connection with writing to a virtual device. The flow chart 340 represents steps performed by both the HA and the DA and thus could have been provided as two flow charts, similar to the flow chart 300 of FIG. 12 and the flow chart 320 of FIG. 13. However, it will be understood by those of ordinary skill in the art that the flow chart 340 may represent a division of steps similar to those set forth in the flow charts 300, 320 and described in the corresponding portions of the text of the specification.

Processing begins at a first step 342, where it is determined if the virtual device points to the standard logical device. If so, then control transfers from the test step 342 to a step 344, where a free track of the log device is obtained. Following the step 344 is a step 346, where data from the standard logical device corresponding to the track being written is caused to be copied from the standard logical device to the track of the log device obtained at the step 344. Following the step 346 is a step 348, where the virtual device pointer for the track is adjusted to point to the track obtained at the step 344. Following the step 348 is a step 352, where a protection bit corresponding to the virtual device is cleared in the track data of the standard logical device, thus indicating that no special processing on behalf of the virtual device is required when writing to the track of the standard device. Following the step 352 is a step 354, where the write is executed. At the step 354, the data to be written may be a track or a portion of a track that is written to the track obtained at the step 344. Following the step 354, processing is complete. If the data corresponds to an entire track, then it may be possible to eliminate the step 346, which copies data from the track of the standard logical device to the new track of the log device, since writing an entire track's worth of data at the step 354 would overwrite all of the data copied at the step 346.

If it is determined at the test step 342 that the pointer for the track of the virtual devices being written does not point to the standard logical device, then control transfers from the step 342 to a test step 356, where it is determined if more than one virtual devices have been established to the standard logical device. If not, then control transfers from the step 356 to a step 358, where a normal write operation to the track of the log device is performed. If it is determined at the test step 356 that there is more than one virtual device established to the standard logical device, then control transfers from the step 356 to a step 362, where a free track from the log device is obtained.

Following the step 362 is a step 364, where the data of the track corresponding to the virtual device being written is copied to the track obtained at the step 362. Following the step 364 is a step 366, where the virtual device pointers are adjusted to point to the new track. In one embodiment, the pointer for the virtual device that is being written is made to point to the new track. Alternatively, it is possible to not change the pointer for the virtual device that is being written and, instead, adjust all the pointers for all of the other virtual devices that point to the track at the step 366.

Following the step 366 is a step 368 where the virtual device map bits for the tracks of the log device are modified. For the log device tracks, the virtual device map bits may be used to indicate which virtual devices point to each track, where, in one embodiment, there are sixteen virtual device map bits and each bit corresponds to a particular virtual device. Thus, the test at the step 356 may examine the virtual device map bits for the track.

Following the step 368 is a step 369, where the write is executed. Note that whether the write is executed to the track obtained at the step 362 or to the track that is initially pointed to by the virtual device being written depends upon how the pointers are adjusted at the step 366. In all cases, however, data is written to the track pointed to by the virtual device to which the data is being written. Following the step 369, processing is complete.

Figure 15:
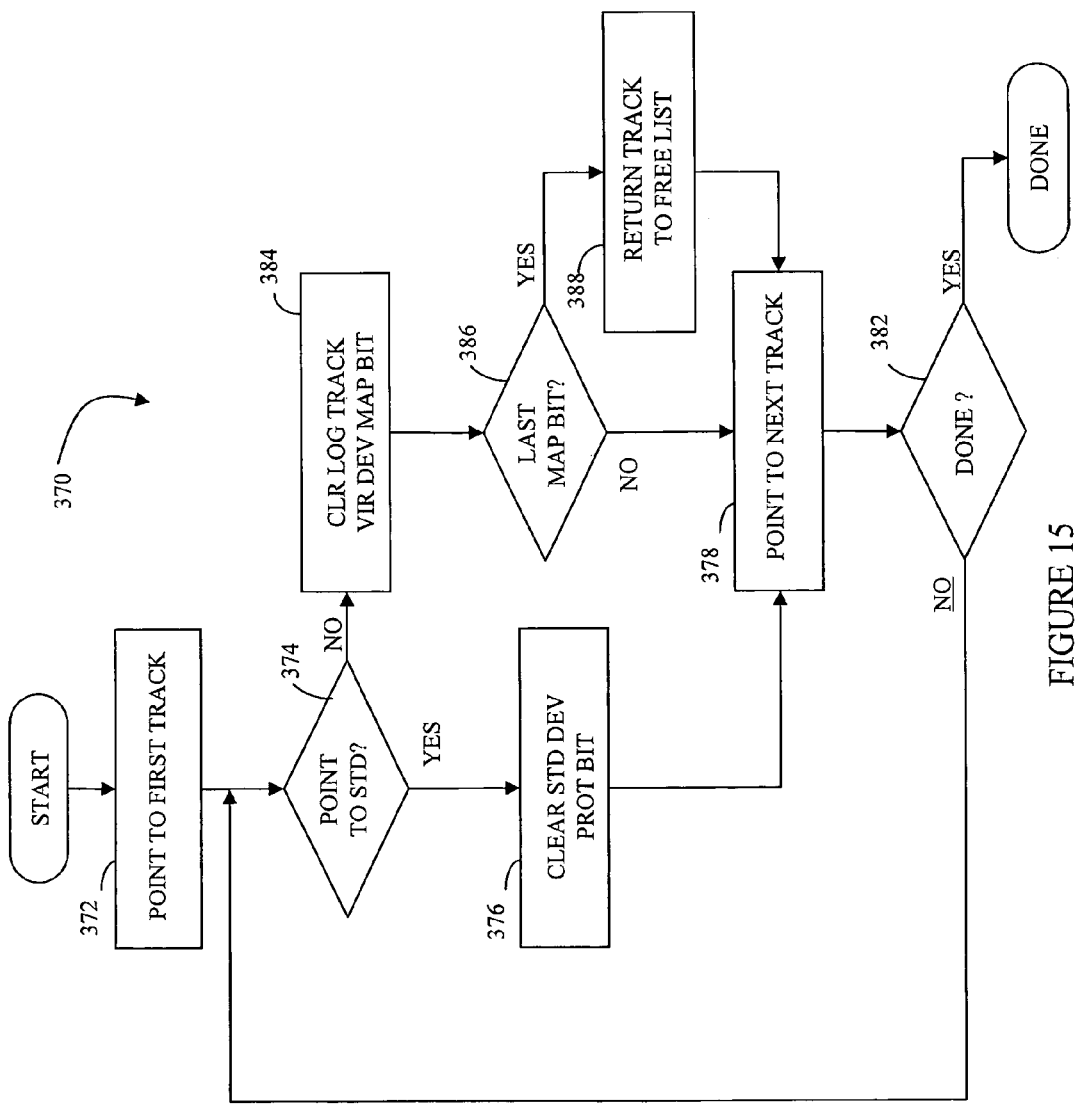
FIG. 15 is a flow chart illustrating steps performed in connection with removing a virtual device according to the system described herein.

Referring to FIG. 15, a flow chart 370 illustrates steps performed in connection with removing (i.e., eliminating) a virtual device. Once a virtual device has been established and used for its intended purpose, it may be desirable to remove the virtual device. Processing begins at a first step 372, where a pointer is set to point to the first track of the virtual device. The virtual device is removed by examining each track corresponding to the virtual device.

Following the step 372 is a step 374, where it is determined if the track of the virtual device that is being examined points to the standard logical device. If so, then control transfers from the step 374 to a step 376 to clear the protection bit on the track of the standard logical device corresponding to the virtual device being removed. Following the step 376 is a step 378, where a pointer points to the next track of the virtual device in order to continue processing by examining the next track. Following the step 378 is a step 382, where it is determined if processing complete (i.e., all the tracks of the virtual device have been processed). If not, then control transfers from the step 382 back to the test step 374, discussed above.

If it is determined at the test step 374 that the track of the virtual device being examined does not point to the standard logical device, then control transfers from the step 374 to a step 384, where a virtual device map bit on the track of the log device that corresponds to the virtual device being removed is cleared. Each track of the log device may have a set of virtual device map bits indicating which virtual devices use the track of the log device. Thus, at the step 384, the virtual device map bit corresponding to the virtual device being removed is cleared.

Following the step 384 is a test step 386, where it is determined if the bit that was cleared at the step 384 was the last virtual device map bit that was set for the track. In other words, the test step 386 determines if there are other virtual devices that are using the track on the log device. If it is determined at the test step 386 that the last virtual device map bit was cleared at the step 384 (and thus, no other virtual devices use the track), then control transfers from the step 386 to a step 388, where the track of the log device is returned to the free list of tracks of the log device, discussed elsewhere herein. Following the step 388, or following the step 386 if it is determined that the bit cleared at the step 384 is not the last virtual device map bit of the track of the log device, is the step 378, discussed above, where the next track of the virtual device is pointed to for subsequent examination. Once all of the tracks corresponding to the virtual device have been processed, the tables and other data structures associated with the virtual device may also be removed although, in some embodiments, the tables and other data structures from the virtual device may be maintained, so long as the virtual device is not made available for use by hosts after the virtual device is deestablished.

In some instances, it may be desirable to provide a mechanism for continuous or near continuous backup of data. Of course, the system described above may provide this functionality by simply creating a new virtual device at each time increment, T, where T is a relatively short amount of time. Similarly, it may be possible to create a new virtual device upon each write of data. However, creating a significant number of new virtual devices would expend a significant amount of overhead and storage space in a way that may be undesirable.

Figure 16:
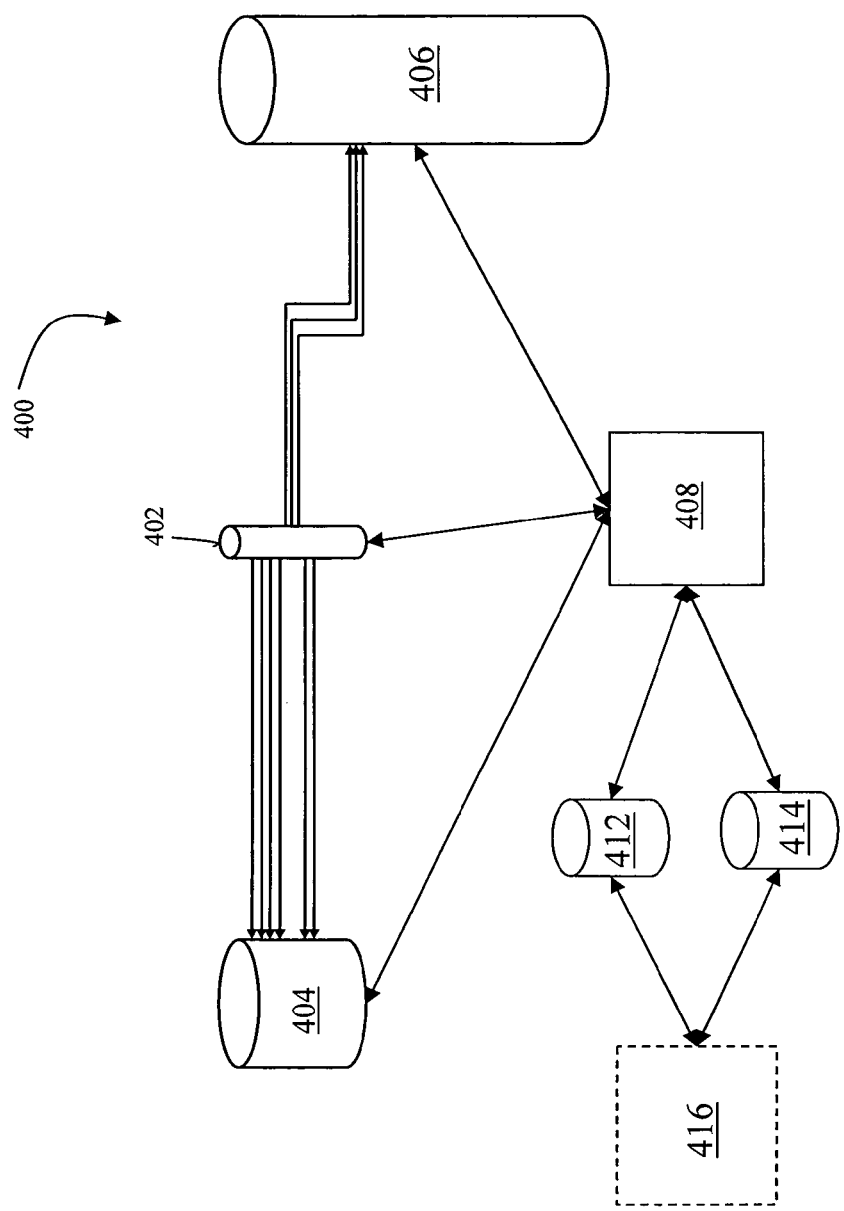
FIG. 16 is a diagram illustrating a continuous backup virtual device according to the system described herein.

Referring to FIG. 16, a diagram 400 illustrates a continuous backup (CB) virtual device 402 that is like the virtual device discussed above with respect to FIGS. 1-15, but is different in a number of ways (discussed below) that facilitate continuous or near continuous backup of data. The CB virtual device 402 contains pointers to a standard logical device 404 for a plurality of tracks such that, for any particular track, if the CB virtual device 402 points to a corresponding track of the standard logical device 404, then the corresponding track has not changed since creation of the CB virtual device 402. In this respect, the CB virtual device 402 is like the virtual device discussed above with respect to FIGS. 1-15. Note that any subsections, besides track, may be used to implement the system described herein. Accordingly, it should be understood in connection with the discussion that follows that although tracks are mentioned, other units of data having another size, including variable sizes, may be used.

The CB virtual device 402 also contains pointers to a log device 406 for a plurality of corresponding tracks. The log device 406 contains data for tracks that have changed since creation of the CB virtual device 402. However, the contents and data structures used in connection with the log device 406 are different from those discussed above in connection with FIGS. 1-15. The log device 406 is discussed in more detail below.

The diagram 400 also shows an I/O module 408 that handles input and output processing to and from other modules, such as input and output requests made by the DA's 38a-38c and HA's 28a-28c shown in FIG. 1. Operation of the I/O module 408 is described in more detail hereinafter.

The I/O module 408 is provided with data from a cycle counter 412 and/or a timer 414. Use of the cycle counter 412 and/or the timer 414 are discussed in more detail hereinafter. Optionally, the cycle counter 412 and/or the timer 414 may be controlled by an external process 416 that may be used to synchronize storage for a plurality of storage devices (i.e., a consistency group). This is also discussed in more detail hereinafter.

Referring to FIG. 17, a data structure 450 that may be used to store data in the log device 406 is illustrated. The data structure 450 includes a device info field 452. The device info field includes device information such as a device identifier, cylinder, head, and length identifiers, and a track ID table. Of course, for different embodiments, different device information may be provided in the device info field 452.

The data structure 450 may also include a timer field 454 and/or a cycle counter field 456. The timer field 454 may correspond to the timer data element 414 discussed above in connection with the diagram 400 of FIG. 16. Similarly, the cycle counter field 456 may correspond to the cycle counter data element 412 of the diagram 400 of FIG. 16. The values provided in the fields 454, 456 are the values of the corresponding data elements 412, 414 at the time each instance of data corresponding to the data structure 450 is created. This is, in effect, a time stamp.

The data field 462 corresponds to the particular data being stored on the log device 406 (data being written by a user). In an embodiment herein, the data field 462 may have a variable size so that the amount of data provided with each element varies. In an embodiment herein, the data provided in the data field 462 does not span multiple tracks and thus is no larger than a single track. The data structure 450 also includes a forward pointer field 464 and a backward pointer field 466 for creating a doubly linked list of data elements, as described elsewhere herein.

Referring to FIG. 18, the log device 406 is shown as including a plurality of doubly linked lists 482-484. Each of the linked lists 482-484 contains one or more data elements each having a structure like that illustrated in FIG. 17 and discussed above. In an embodiment herein, each of the linked lists 482-484 corresponds to a particular track of the standard logical device 404 (and thus to a particular track of the CB virtual device 402). Of course, other data structures may be used, such as singly linked lists. In instances where no data has been written to a particular track since creation of the CB virtual device 402, there would be no corresponding linked list stored in the log device 406. Otherwise, the appropriate track entry in the CB virtual device 402 points to the first element of each of the linked lists 482-484. In an embodiment herein, the first element of each of the linked lists 482-484 is the most recently written element, the next element is the next most recently written element, and so on. Of course, any appropriate arrangement of the elements may be used. As mentioned elsewhere herein, each of the elements of each of the linked lists 482-484 may contain a partial track's worth of data. Thus, it is possible that one or more of the linked lists 482-484 does not contain an entire track's worth of data.

Figure 19:
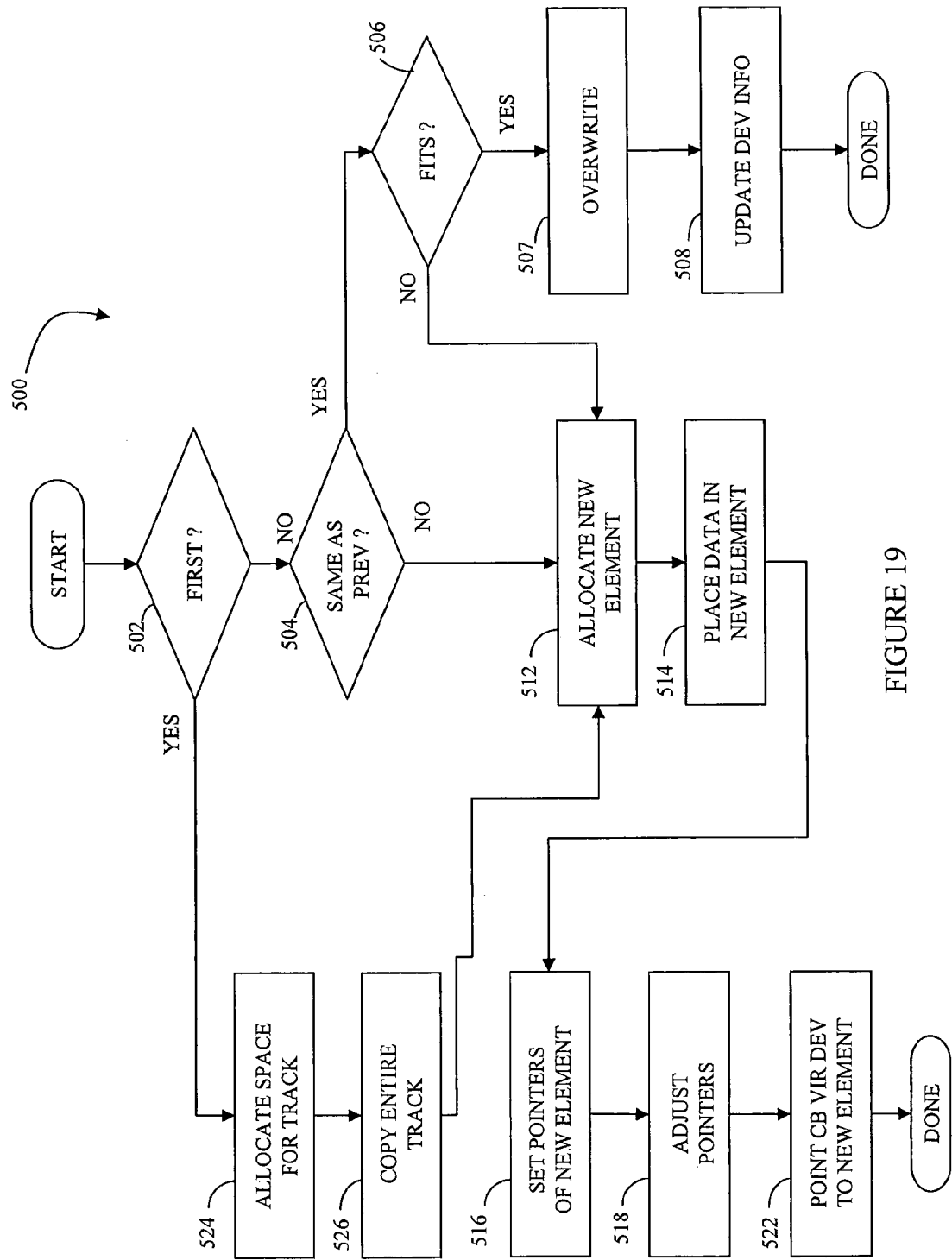
FIG. 19 is a flow chart illustrating handling a data write operation according to the system described herein.

Referring to FIG. 19, a flow chart 500 illustrates steps performed in connection with a data write operation according to the system described herein. Processing begins at a first test step 502 where it is determined if the data being written is the first data for a particular track (i.e., no previous writes were performed since beginning the continuous backup). If the data being written is not the first write, then control transfers from the step 502 to a step 504 where it is determined if the current value of the cycle counter 412 equals the value of the cycle counter for the most recent data element of the linked list to which data is being added. In an embodiment herein, the most recent element is pointed to by the CB virtual device 402. Thus, for a write to a particular track, the first element in the corresponding one of the linked lists 482-484 in the log device 406 is examined to see if the cycle counter field 456 contains a value that equals the value stored in the cycle counter data element 412. In an embodiment herein, write operations that occur during the same cycle counter value are deemed to have occurred at the same time. Therefore, the granularity of the continuous backup is the time between updates of the cycle counter. Updating the cycle counter is discussed in more detail hereinafter.

If it is determined at the test step 504 that the current value of the cycle counter equals the value of the cycle counter stored with the most recent data element of the one of the linked lists 482-484 to which data is being written, then control transfers from the step 504 to a test step 506 which determines if the current write being performed contains data that will fit within the data field 462 of the most recent data element (i.e., if data from the second write operation is a subset of data from the first data write operation). As discussed elsewhere herein, the data field 462 is variable length and may or may not be only a portion of a track. Thus, at the test at the step 506 it is determined if the data currently being written could overwrite the data field 462 of the most recent data element. If so, then control transfers from the test step 506 to a step 507 where the data is overwritten. Following the step 507 is a step 508 where a device info field is updated (e.g., the track id table is updated) to reflect the overwrite at the step 507. Following the step 508, processing is complete.

If it is determined at the test step 506 that the data currently being written does not fit within the data field 462 of the most recent data element for the track, or if it is determined at the test step 504 that the current value of the cycle counter does not equal the value in the cycle counter field 456 of the most recent data element, then control transfers to a step 512 where a new data element is allocated. Allocating a new data element at the step 512 involves obtaining enough space for the data structure 450. Note that the size of the data structure 450 may be a function of the amount of data being written in the data field 462. In an embodiment herein, this may be unlike the allocation scheme of FIG. 10, which may assume fixed sizes for data. On the other hand, the scheme of FIG. 10 may be adapted to accommodate the variable data sizes used in connection with the step 512 but then, in some cases, it may be useful to allocate a new track on the log device to store data when the previous allocation for the same track is not large enough.

Following the step 512 is a step 514 where newly allocated data element is populated by having the data written to the field 462 as well as providing information for the device info field 452, the timer field 454, and the cycle count field 456. Following the step 514 is a step 516 where the foreword pointer field 464 is set to the point to the first data element of one of the lists 482-484 (or null if the list is empty) and the backward pointer field 466 is set equal to null. Following the step 516 is a step 518 where the other pointers are adjusted as appropriate (e.g. the backward pointer field 466 of the first data element of the list is set to point to the newly allocated data element). Following the step 518 is a step 522 where the appropriate table from the CB virtual device 402 is set to point to the newly allocated data element. Following the step 522, processing is complete.

If it is determined at the test step 502 that the data being written is the first data written since beginning continuous backup, then control transfers from the step 502 to a step 524 where space for an entire track's worth of data is allocated. In an embodiment herein, the first write to the standard logical device 404 causes an entire track's worth of data to be copied rather than just the amount of data corresponding to the write, as is done, for example, at the steps 512, 514. In other embodiments, a different amount of data may be copied from the standard logical device 404, even on the first write to a particular track. Following the step 524 is a step 526 where the entire track's worth of data is copied. Note that the data that is copied at the step 526 is the data from the standard logical device 404 prior to any modifications thereto. Following the step 526 is the step 512, discussed above.

It is worth noting that the processing illustrated in the flow chart 500 of FIG. 19 may be performed after a write has been accepted and acknowledged to the host. Doing this allows the processing to be performed at a more convenient time (e.g., when the storage device is less busy) and avoids any appreciable response time penalty by allowing for the host write to be immediately acknowledged.

Figure 20:
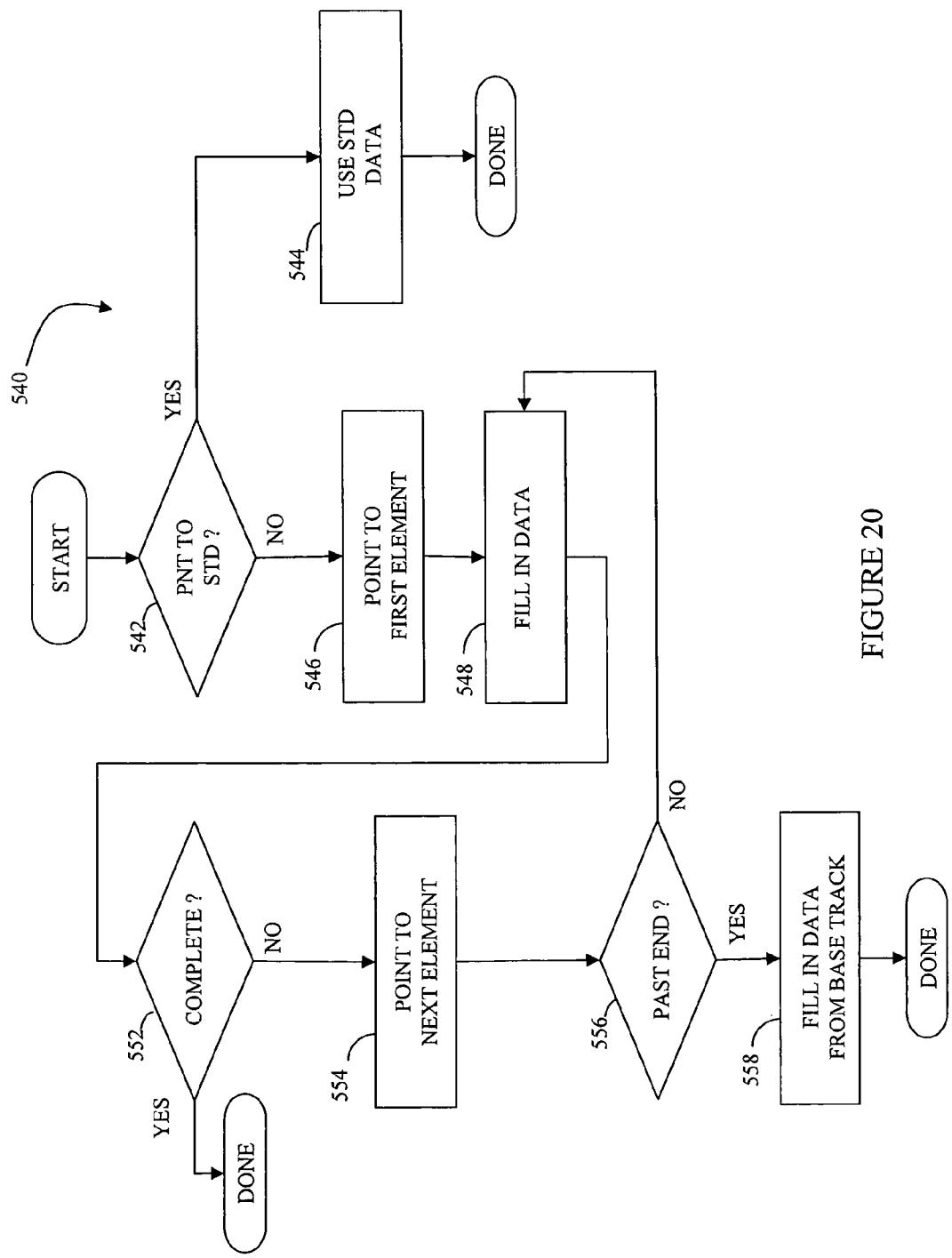
FIG. 20 is a flow chart illustrating handling a data read operation according to the system described herein.

Referring to FIG. 20, a flow chart 540 illustrates steps performed in connection with a read operation to read the present data (i.e., to read the data in the present state of the storage device). Processing begins at a first step 542 where it is determined if the CB virtual device 402 points to the standard logical device 404. If so, then control transfers from the test step 542 to a step 544 where the standard logical device is used to retrieve the data being read. Following the step 544, processing is complete.

If it is determined at the test step 542 that the CB virtual device 402 does not point to the standard logical device 404, then control transfers from the test step 542 to a step 546 where a pointer used for iterating through the linked lists of the log device 406 (an iterating pointer) is set to point to the first element of the list being processed (i.e., the list corresponding to the track from which the data is being read). Following the step 546 is a step 548 where data from the element being pointed to by the iterating pointer is used to fill in a variable or data space used to accept the data being read. Note that, to read data, it is necessary to process the data elements in inverse chronological order, giving precedence to more recent data. Since the elements of the linked lists 482-484 do not each necessarily contained an entire track of data, it may be necessary to traverse through multiple data elements to construct the data being requested in connection with the read operation.

Following the step 548 is a test step 552 where is determined if all of the requested data has been retrieved. If so, then processing is complete. Otherwise, control transfers from the test step 552 to a step 554 where the pointer used to iterate through elements of the list is made to point to the next element (i.e., using the foreword pointer field 464). Following the step 554 is a test step 556 where it is determined if the pointer used to iterate through elements of the list has passed the end of the lists (i.e., equals null). If not, then control transfers from the test step 556 back to the step 548 to fill in additional data, as discussed above. Otherwise, control transfers from the test step 556 to a step 558 to fill in the remaining (missing) data with data from the base track created on the first write to the standard logical device 404 after the CB virtual device 402 was created. Using data at the step 558 means that no corresponding data was written after the CB virtual device 402 was created. Following the step 558, processing is complete.

Figure 21:
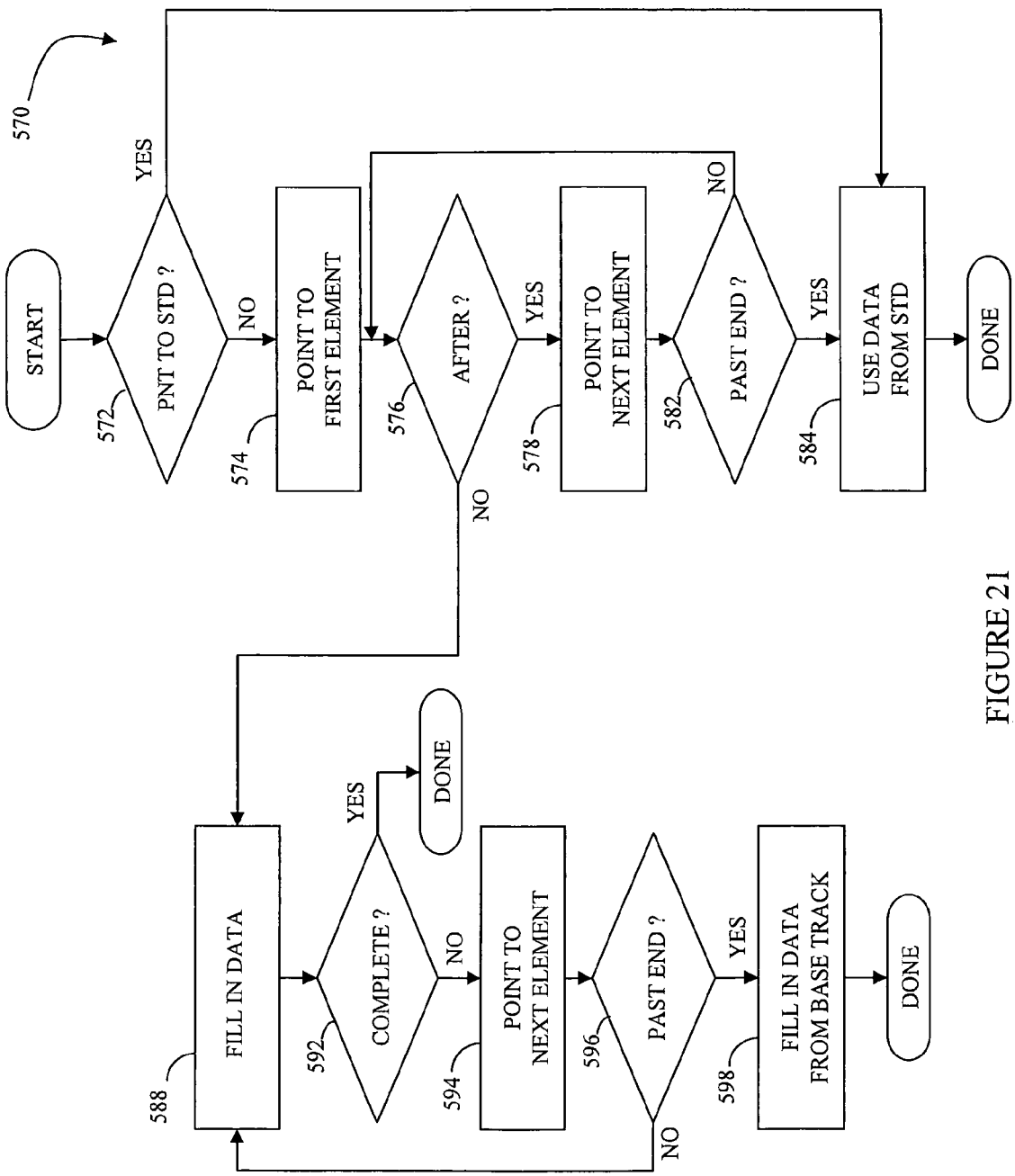
FIG. 21 is a flow chart illustrating reading data from an earlier point in time according to the system described herein.

Referring to FIG. 21, a flow chart 570 illustrates steps performed in connection with reading data from a previous state (previous time) of the storage device to obtain data as it existed at a particular time (a target time). The system described herein may provide continuous or nearly continuous backup of data such that data from any point in time (since initiation of the system) may be read. The steps illustrated by the flow chart 570 correspond to reading (recovering) data written up to a particular point in time.

Processing begins at a first test step 572 where it is determined if the track from which the data is being read has an entry in the CB virtual device 402 that points to the standard logical device 404. As discussed elsewhere herein, if an entry for a particular track points to the standard logical device 404, then the particular track has not been written to since initiation of the system. If it is determined at the test step 572 that the requested data it is not on the standard logical device 404 (i.e., the corresponding entry in the CB virtual device 402 does not point to the standard logical device 404), then control transfers from the test step 572 to a step 574 where a pointer used to iterate through elements of one of the linked lists 482-484 (i.e., an iterating pointer) is set to point at the first element of the list.

Following the step 574 is a test step 576 where it is determined if the data element being pointed to by the iterating pointer corresponds to data written after the target time. Note that either the timer field 454 or the cycle counter field 456 may be used to specify a particular time of interest and to determine if the current data is after the target time. Use of the timer and the cycle counter is discussed in more detail hereinafter.

If it is determined at the test step 576 that the data element being pointed to by the pointer used to iterate through the elements of the list corresponds to data written after the target time, then control transfers from the test step 576 to a step 578 where the iterating pointer is made to point to the next data element. Following the step 578 is a test step 582 which determines if the iterating pointer points to the end of the list. If not, then control transfers from the test step 582 back to the test step 576, discussed above.

If it is determined at the test step 582 that the iterating pointer points to the end of the list of elements (i.e., points to null), then control transfers from the test step 582 to a step 584 where the standard logical device 404 is used to provide the requested data. In such a situation, all of the write operations have occurred after the target time so that the desired data is stored on the standard logical device 404. Following the step 584, processing is complete. Note that the step 584 is also reached from the test step 572 if it is determined that the entry in the CB virtual device 402 points to the standard logical device 404, indicating that no writes have occurred to the particular track since initiation of the system.

If it is determined at the test step 576 that the iterating pointer points to data that is not after the target time, then control transfers from the test step 576 to a step 588 where the data from the element being pointed to by the iterating pointer is used to fill in a variable or data space used to accept the data being read. Note that, to read the data, it may be necessary to process the data elements in inverse chronological order, giving precedence to more recent data. However, since the elements of the linked lists 482-484 do not each necessarily contained an entire track of data, it may be necessary to traverse through multiple data elements to construct the data being requested in connection with the read operation.

Following the step 588 is a test step 592 where is determined if all of the requested data has been retrieved. If so, then processing is complete. Otherwise, control transfers from the test step 592 to a step 594 where the iterating pointer is made to point to the next element (i.e., using the foreword pointer field 464). Following the step 594 is a test step 596 where it is determined if the iterating pointer has passed the end of the list (i.e., equals null). If not, then control transfers from the test step 596 back to the step 588 to fill in any additional data, as discussed above. Otherwise, control transfers from the test step 596 to a step 598 to fill in the remaining (missing) data with data from the base track created on the first write to the standard logical device 404 after the CB virtual device 402 was created. Using data at the step 598 means that no corresponding data was written after the CB virtual device 402 was created. Following the step 598, processing is complete.

Figure 22:
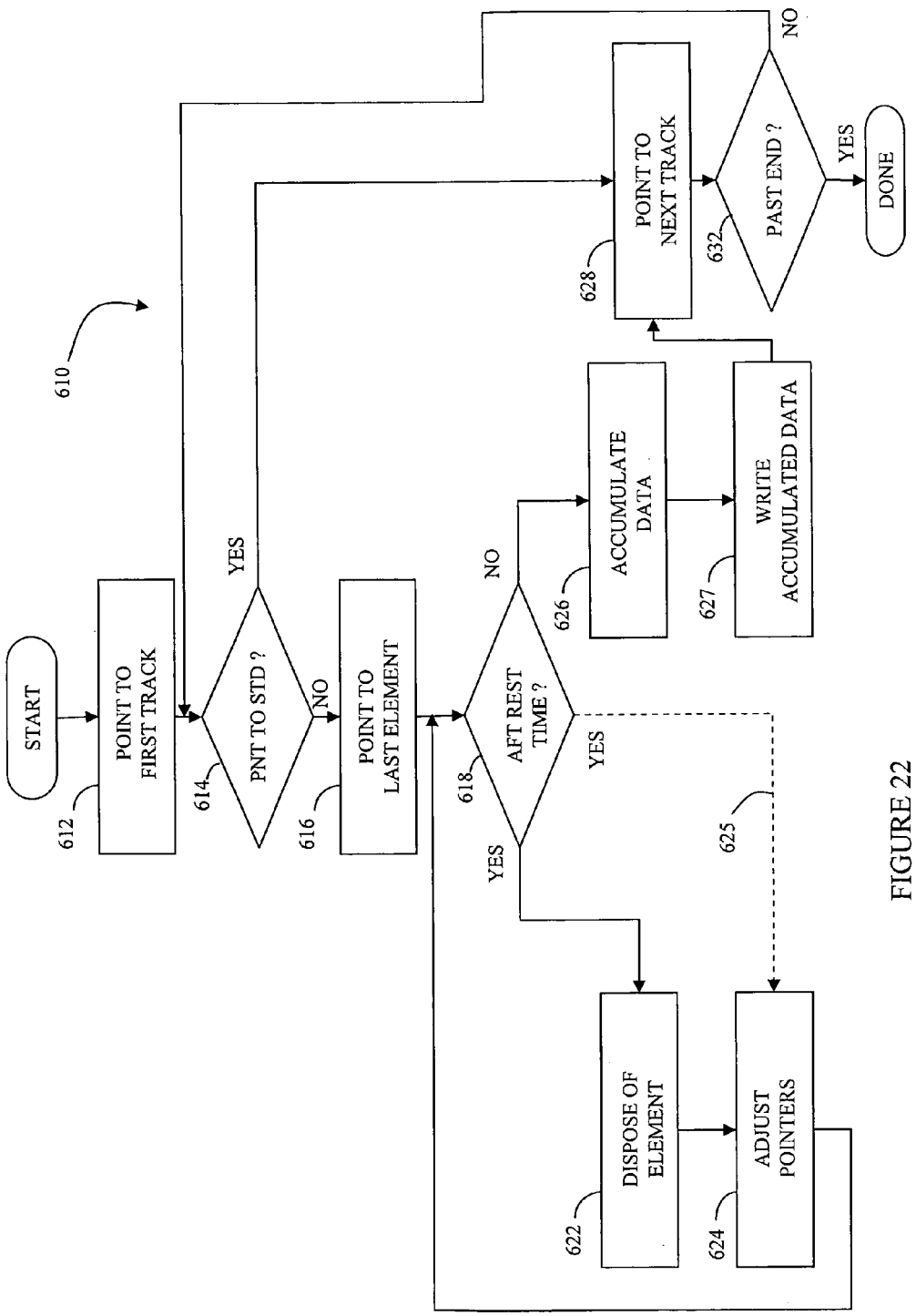
FIG. 22 is a flow chart illustrating reverting a storage device to a state from an earlier point in time according to the system described herein.

Referring to FIG. 22, a flow chart 610 illustrates steps performed in connection with reverting data to its state at a particular time of interest (target time) and possibly writing new data to the reverted data or even inserting new data as if it had been written at a previous point in time. Processing begins at a first step 612 where a pointer that is used to iterate through all of the tracks (track iterating pointer) is set to point to the first track of the CB virtual device 402. Following the step 612 is a test step 614 which determines if the corresponding entry for the CB virtual device 402 points to the standard logical device 404. If not, then control transfers from the test step 614 to a step 616 where a pointer (element iterating pointer) used to iterate through corresponding elements of the log device 406 is set to point to the last (most recent) element of the linked list corresponding to the particular track pointed to by the track iterating pointer.

Following the step 616 is a test step 618 which determines if the element iterating pointer points to an element having a time that is after the target time (desired restoration time). If so, then control transfers from the test step 618 to a step 622 where the element pointed to by the element iteration pointer is disposed (i.e., the memory used by the element is freed for use in some fashion consistent with the memory management scheme that is used). Following the step 622 is a step 624 where the appropriate pointers are adjusted. At the step 624, the element iteration pointer is made to point to the next most recent element. In addition, if data is disposed at the step 622, pointers used by the data structures for the CB Virtual device 402, the log device 406, etc. may also be adjusted. However, as discussed in more detail below, for alternative embodiments, no data may be disposed. Following the step 624, control transfer back to the step 618 for the next iteration. Note that the target time may be expressed either in terms of a particular value for the cycle counter or a particular value for the timer.

An alternative embodiment is illustrated by a path 625 from the step 618 directly to the step 624 when the element iterating pointer points to an element having a time that is after the desired restoration time. In this embodiment, data that is after the restoration time is not discarded.

If it is determined at the test step 618 that the element pointed to by the element iteration pointer has a time associated therewith that is not after the target time, then control transfers from the test step 618 to a step 626 where data is accumulated corresponding to the data that will be written back to the standard logical device 404 to cause the standard logical device 404 to revert to the state thereof at the target time. Accumulating the data at the step 626 may include starting with new data to be written (if any) and then filling in any gaps (e.g., parts of a track that are not being written with new data) using, for example, processing like that illustrated in connection with the flow chart 570 of FIG. 21. Following the step 626 is a step 627 where the data accumulated at the step 626 is written to the standard logical device 404. The write at the step 627 could be a conventional write or could be a continuous backup write. Following the step 627 is the step 628, discussed above.

Note that once the CB virtual device 402 has been restored to a particular state, it is possible to continue operation, including providing new data writes to the system. In some instances, it may be desirable to insert new data (write new data) at a particular target time or delete data from a particular target time. Note that these two operations may be used together in a way that allows a user to insert data, test the result thereof, and then subsequently delete the inserted data. For example, a user may discover a data inconsistency in a database at 5:00 p.m. and may attempt to address the inconsistency by simulating a writing of additional data (or different data) at 3:00 p.m. However, if that does not fix the problem, the user may desire to undo the simulated write and try something else. Of course, the ability to insert and delete data at different points in time may have any number of uses.

Figure 23:
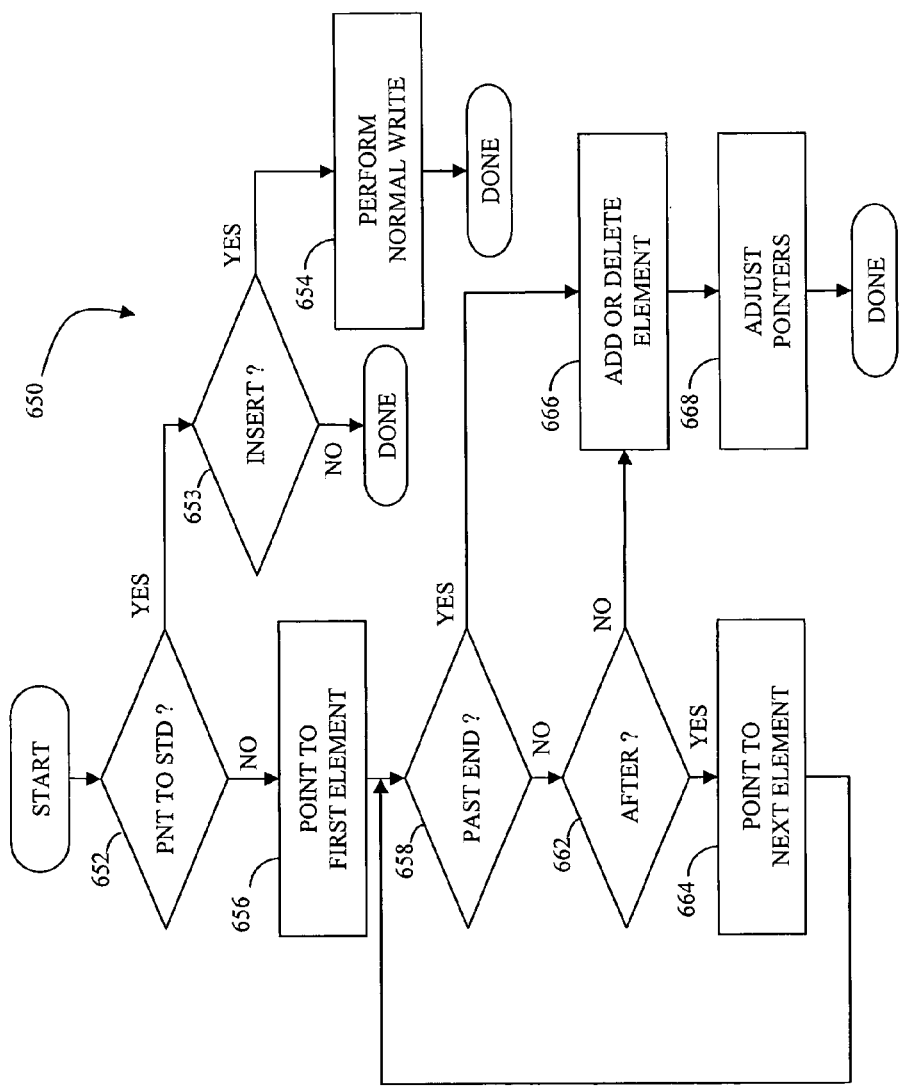
FIG. 23 is a flow chart illustrating writing data to a storage device at a state from an earlier point in time according to the system described herein.

Referring to FIG. 23, a flow chart 650 illustrates steps performed in connection with inserting new data at a particular target time (i.e., writing the data as if it occurred at a particular target time that may be prior to the current time and prior to subsequent data write operations) or deleting data from a particular target time. Processing for the flow chart 650 begins at a first test step 652 where it is determined if the entry for the track for the CB virtual device 402 points to the standard logical device 404. If so, then control transfers from the test step 652 to a test step 653 where it is determined if a data insert is being performed. If so, then control transfers from the step 653 to a step 654 where a normal write operation is performed. Note that, in the case of possibly removing data, there is no data to delete if the CB virtual device 402 points to the standard logical device 404. Following the step 654, processing is complete.

If it is determined at the test step 652 that the track for the CB virtual device 402 does not point to the standard logical device 404, then control transfers from the test step 652 to a step 656 where an element iteration pointer is made to point to the first element in the linked list of elements corresponding to the track. Following the step 656 is a test step 658 where it is determined if the element iteration pointer points past the end of the list. If not, then control transfers from the test step 658 to a test step 662 where it is determined if the element iteration pointer points to an element having a time associated therewith that is after the target time. If so, then control transfers from the test step 662 to a step 664 where the element iteration pointer is made to point to the next element. Following the step 664, control transfers back to the test step 658, discussed above.

If it is determined at the test step 658 that the element iteration pointer points past the end of the linked list, or if it is determined at the test step 662 that the element iteration pointer points to an element having a time associated therewith that is not after the target time, then control transfers to a step 666 where a new element, corresponding to the data to be inserted, is added or where the element pointed to is deleted. In other embodiments, elements to be deleted may be specially marked or tagged (e.g., at the time of insertion) or there may be any one of a number of techniques used to identify elements to be deleted.

Following the step 666 is a step 668 where pointers of the linked list are adjusted to accommodate the addition of the new element or deletion of one or more elements. Following the step 668, processing is complete.

Note that, in the case of removing data elements or adding multiple data elements, it may be possible to iteratively execute some or all of the steps of the flow chart 650 of FIG. 23. For example, to remove all instances of data having a particular characteristic or mark, the steps of the flow chart 650 may be executed for each track of interest.

Figure 24:
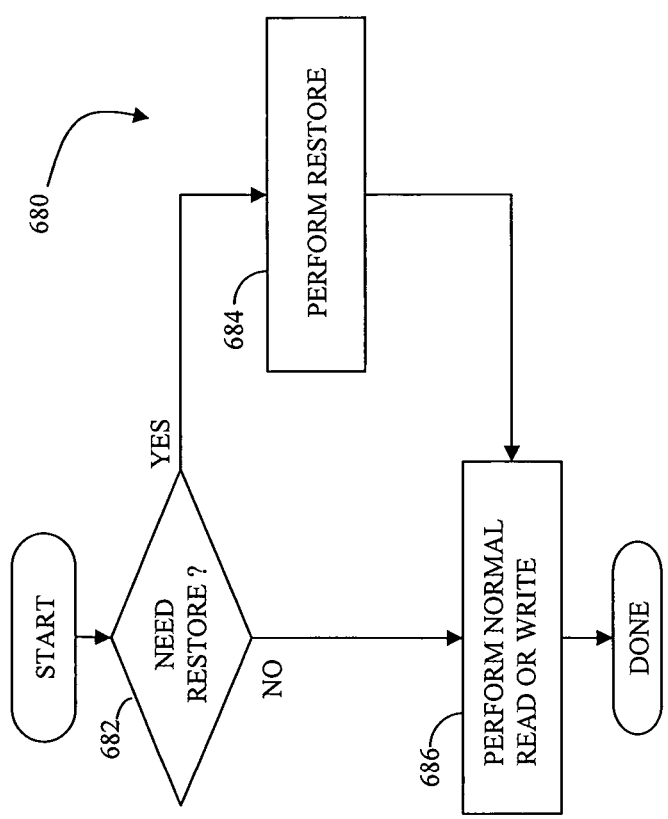
FIG. 24 is a flow chart illustrating steps performed in connection with reading or writing data from or to the standard logical device during a restoration process according to an embodiment of the system described herein.

Referring to FIG. 24, a flow chart 680 illustrates steps performed in connection with a read or write operation from or to the standard logical device 404 while the standard logical device 404 is being returned to a state corresponding to an earlier point in time. In some embodiments, it may be possible to suspend all I/O operations for the standard logical device 404 while a restore is being performed like the restore operation illustrated by the flow chart 610 of FIG. 22, described above. However, in other instances, suspending I/O operations may be unacceptable, in which case it may become necessary to allow I/O operations while the restore is being performed.

Processing for the flow chart 680 begins at a test step 682 where it is determined whether the track being accessed needs to be restored. In some cases, the track being accessed may have already been restored or may not need to be restored because the track was never modified. In any case, if it is determined at the test step 682 that the track being accessed needs to be restored (i.e., the track was modified and has not yet been restored), then control passes from the step 682 to a step 684 where the restore operation is performed for the track. The restore operation performed at the step 684 is like the restore operation described above in connection with the flow chart 610 of FIG. 22. Following the step 684, or following the step 682 if no restore is needed is a step 686 where a normal read or write operation is performed to the (now restored) track of the standard logical device. Following the step 686, processing is complete.

Figure 25:
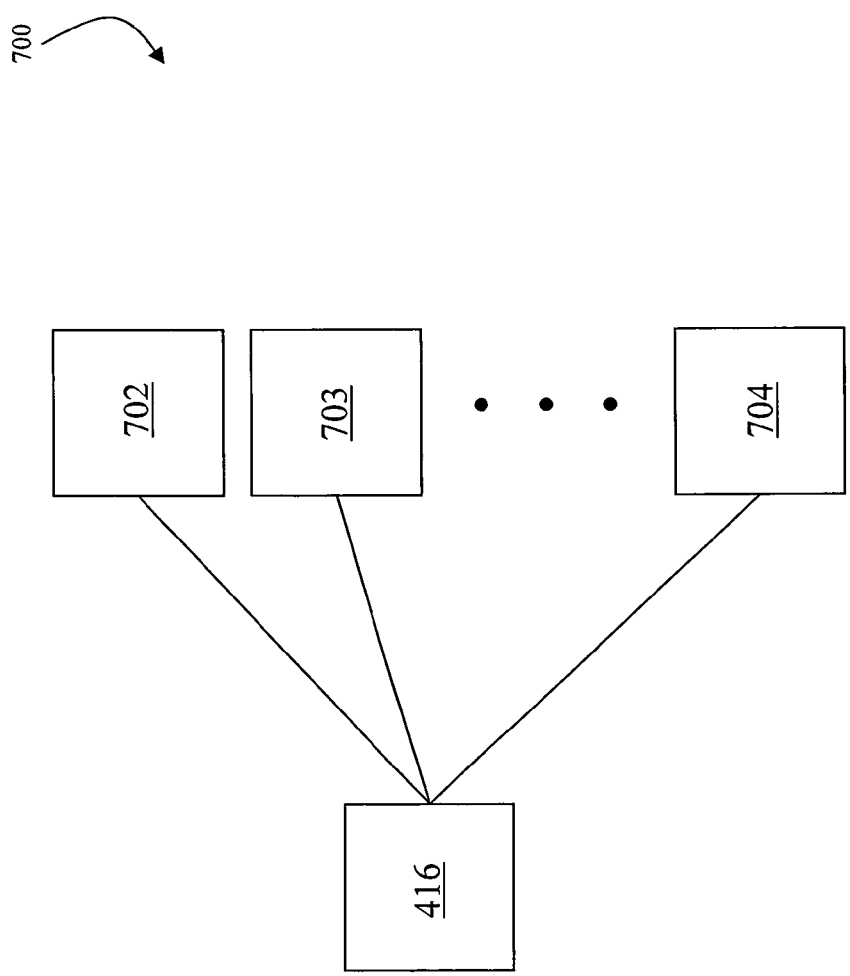
FIG. 25 is a diagram illustrating synchronizing multiple storage device for continuous data backup according to the system described herein.

Referring to FIG. 25, a diagram 700 illustrates a plurality of storage devices 702-704 coupled to the external process 416 illustrated in the diagram 400 of FIG. 16. The storage devices 702-704 may be part of a consistency group. The external process 416 may be used to synchronize the storage devices 702-704 by synchronizing the timer 414 and/or the cycle counter 412. In an embodiment herein, synchronization may be performed by temporarily suspending write operations prior to updating the timer 414 and/or the cycle counter 412. Alternatively, the external process 416 may wait for write operations for the storage devices 702-704 to become quiescent prior to updating the timer 414 and/or the cycle counter 412.

Note that initialization of the system described herein may be performed by simply creating the CB virtual device 402, setting the cycle counter 412 and the timer 414 to appropriate initial values, and beginning operation. In embodiments where the external process is used 416, the external process may also be initialized and may also be used to simultaneously begin continuous backup operations for multiple storage devices. Otherwise, in embodiments where the external process 416 (or the equivalent) is not used, then updating the cycle counter 412 and/or the timer 414 may be performed by any appropriate means, including by the process 408 that handles input and output operations.

In some cases, it may be desirable to provide continuous backup to a storage device that is different from the storage device written to by the host. The host may be coupled to a first (local) storage device and the first storage device may be coupled to a second (remote) storage device that maintains the continuous backup of data as described herein. In some embodiments, a continuous backup may be maintained on the local storage device and the remote storage device while in other embodiments the continuous backup may be maintained on the remote storage device only.

Figure 26:
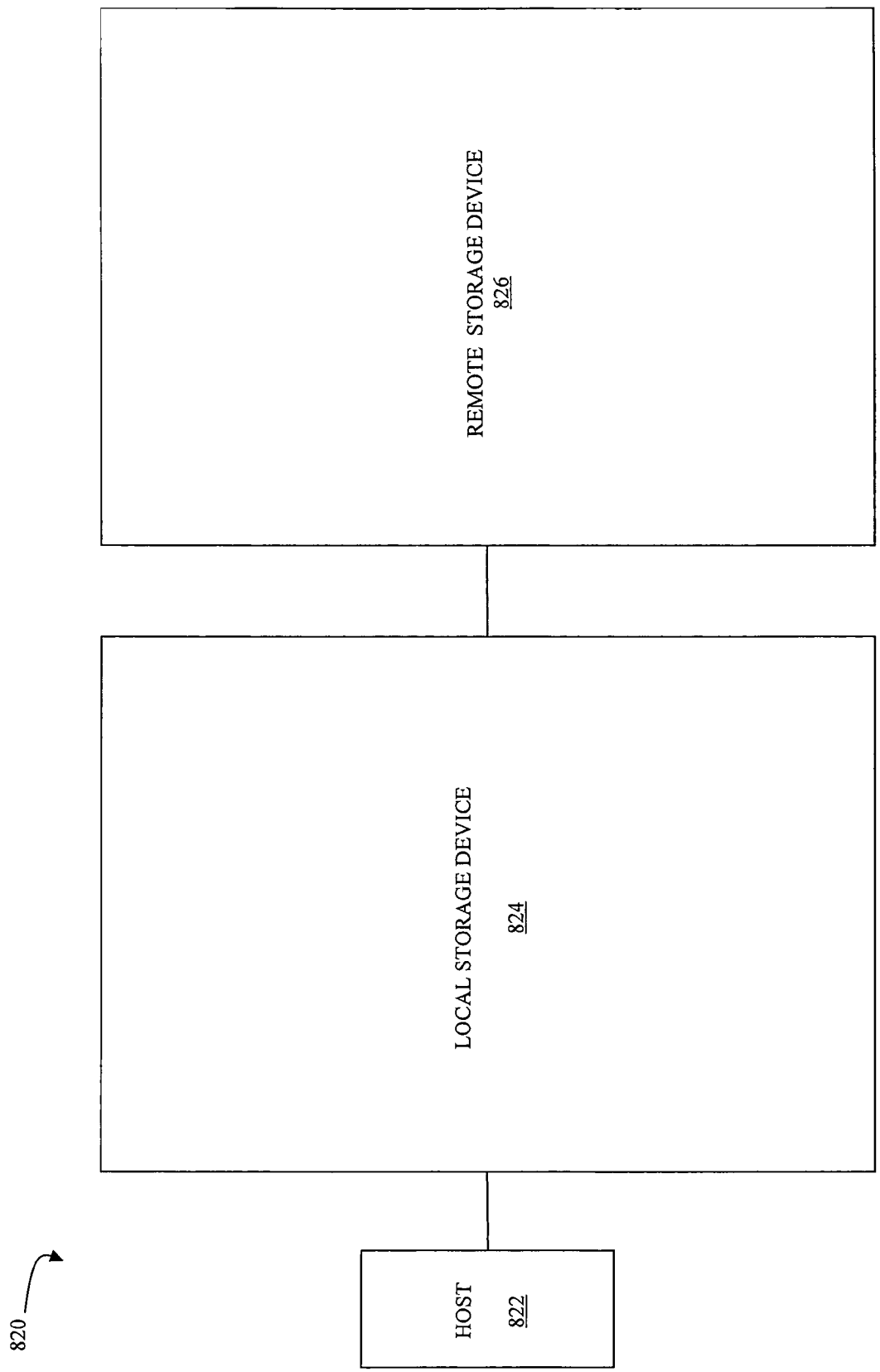
FIG. 26 is a schematic diagram showing a host, a local storage device, and a remote data storage device used in connection with the system described herein.

Referring to FIG. 26, a diagram 820 shows a relationship between a host 822, a local storage device 824 and a remote storage device 826. The storage devices 824, 826 may be like the storage device 24, discussed above. The host 822 reads and writes data from and to the local storage device 824.

Although the diagram 820 only shows one host 822, it will be appreciated by one of ordinary skill in the art that multiple hosts are possible. Data from the local storage device 824 may be transferred to the remote storage device 826 via a link therebetween. Although only the one link is shown, it is possible to have additional links between the storage devices 824, 826 and to have links between one or both of the storage devices 824, 826 and other storage devices (not shown).

In an embodiment herein, data written from the host 822 to the local storage device 824 is continuously backed up at the remote storage device 826 using processing at the remote storage device 826 like that described herein in connection with FIGS. 19-24. In some embodiments, the data may also be continuously backed up at the local storage device 824 while in other embodiments the data is only continuously backed up at the remote storage device 826. As described in more detail elsewhere herein, data written by the host 822 is associated with a particular cycle number by the local storage device 824. The cycle number assigned by the local storage device corresponds to the cycle counter field 456 described above in connection with FIG. 17. The data and the cycle number associated there with are then transmitted to the remote storage device 826, which has a standard logical device, CB virtual device, and log device for performing the continuous backup. Associating data written by the host 822 with cycle numbers and transferring the data from the local storage device 824 to the remote storage device 826 is discussed in more detail elsewhere herein.

Figure 27:
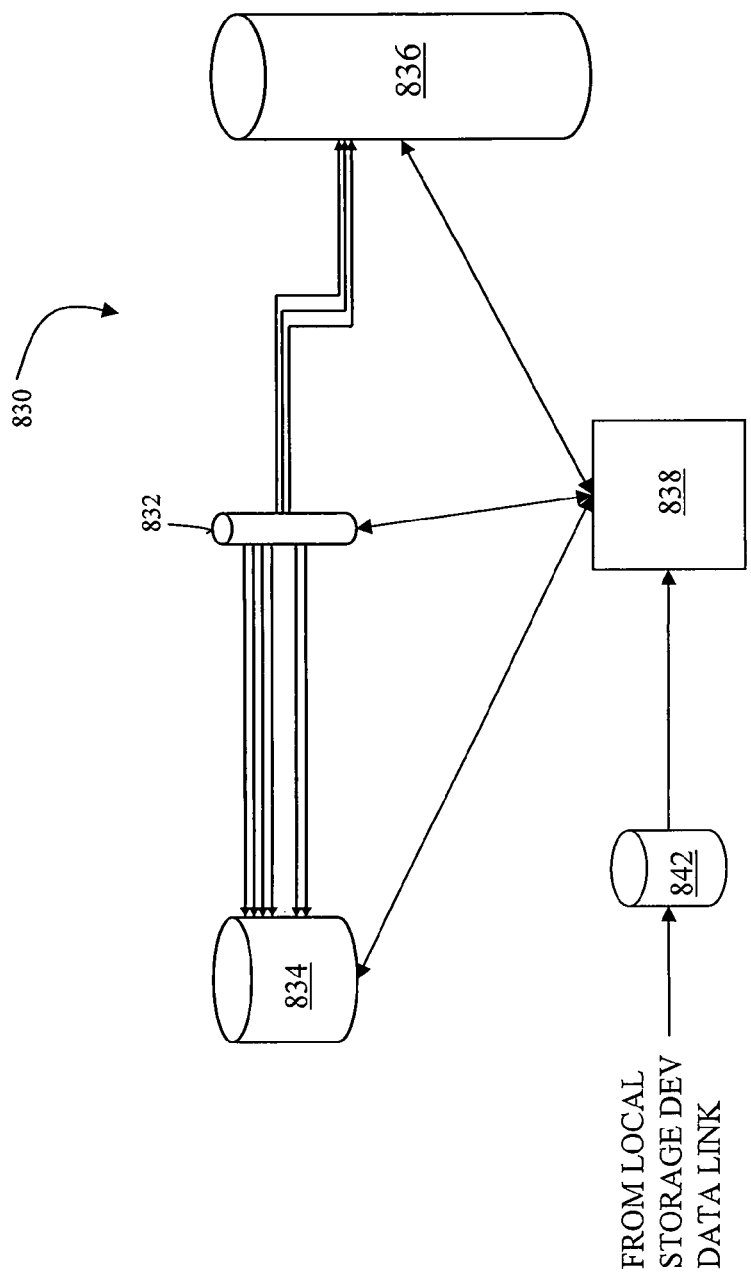
FIG. 27 is a diagram illustrating a continuous backup virtual device for backing up on a remote storage device according to the system described herein.

Referring to FIG. 27, a diagram 830 illustrates a continuous backup (CB) virtual device 832 that is like the CB virtual device 402 discussed above elsewhere herein. The CB virtual device 832 contains pointers to a standard logical device 834 for a plurality of tracks such that, for any particular track, if the CB virtual device 832 points to a corresponding track of the standard logical device 834, then the corresponding track has not changed since creation of the CB virtual device 832. The CB virtual device 832 also contains pointers to a log device 836 for a plurality of corresponding tracks. The log device 836 contains data for tracks that have changed since creation of the CB virtual device 832 and is like the log device 406 discussed above. The CB virtual device 832, the standard logical device 834, and the log device 836 may all be provided on the remote storage device 826.

The diagram 830 also shows an I/O module 838 that handles receipt and storage of data received by the remote storage device 826 for continuous backup storage. Operation of the I/O module 838 is like operation of the I/O module 408 discussed elsewhere herein. The I/O module 838 is provided with data stored in temporary storage 842 of the remote storage device 826. The temporary storage 842 may be implemented using, for example, volatile memory of the remote storage device 826 and/or dedicated disk storage space of the remote storage device 826. Data within the temporary storage 842 is provided to the remote storage device 826 from the local storage device 824 as described in more detail elsewhere herein.

The following discussion relates to providing continuous backup on the remote storage device 826 of data on the local storage device 824. Multiple embodiments are disclosed for different ways that data having an appropriate sequence number (cycle number) may be provided to the remote storage device 826 from the local storage device 824.

Figure 28:
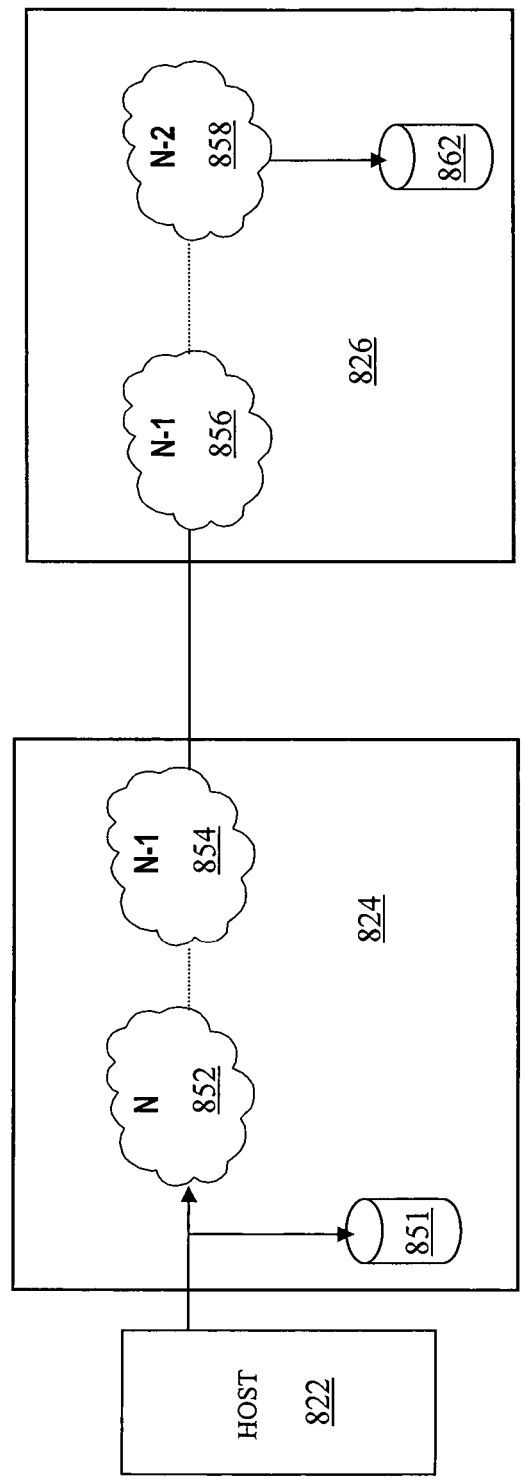
FIG. 28 is a schematic diagram showing a flow of data between a host, a local storage device, and a remote data storage device used in connection with the system described herein.

Referring to FIG. 28, a path of data is illustrated from the host 822 to the local storage device 824 and the remote storage device 826. Data written from the host 822 to the local storage device 824 may be stored locally, as illustrated by the data element 851 of the local storage device 824. Storing the data locally may include writing the data directly to a logical storage device of the local storage device 824 and/or providing the continuous backup functionality described herein at the local storage device 824. The data that is written by the host 822 to the local storage device 824 may also be maintained by the local storage device 824 in connection with being sent by the local storage device 824 to the remote storage device 826.

In the system described herein, each data write by the host 822 (of, for example a record, a plurality of records, a track, etc.) is assigned a sequence number (cycle number). The sequence number may be provided in an appropriate data field associated with the write. In FIG. 28, the writes by the host 822 are shown as being assigned sequence number N. All of the writes performed by the host 822 that are assigned sequence number N are collected in a single chunk of data 852. The chunk 852 represents a plurality of separate writes by the host 822 that occur at approximately the same time.

Generally, the local storage device 824 accumulates chunks of one sequence number while transmitting a previously accumulated chunk (having the previous sequence number) to the remote storage device 826. Thus, while the local storage device 824 is accumulating writes from the host 822 that are assigned sequence number N, the writes that occurred for the previous sequence number (N−1) are transmitted by the local storage device 824 to the remote storage device 826. A chunk 854 represents writes from the host 822 that were assigned the sequence number N−1 that have not been transmitted yet to the remote storage device 826.

The remote storage device 826 receives the data from the chunk 854 corresponding to writes assigned a sequence number N−1 and constructs a new chunk 856 of host writes having sequence number N−1. When the remote storage device 826 has received all of the data from the chunk 854, the local storage device 824 sends a commit message to the remote storage device 826 to commit all the data assigned the N−1 sequence number corresponding to the chunk 856. Generally, once a chunk corresponding to a particular sequence number is committed, that chunk may be written to the logical storage device of the remote storage device 826 and/or be used for providing continuous backup at the remote storage device 826. This is illustrated in FIG. 28 with a chunk 858 corresponding to writes assigned sequence number N−2 (i.e., two before the current sequence number being used in connection with writes by the host 822 to the local storage device 826).

In FIG. 28, the chunk 858 is shown as being written to a data element 862 representing disk storage and/or continuous backup at the remote storage device 826. Thus, the remote storage device 826 is receiving and accumulating the chunk 856 corresponding to sequence number N−1 while the chunk 858 corresponding to the previous sequence number (N−2) is being written to disk storage of the remote storage device 826 and/or being used for remote continuous backup as illustrated by the data element 862.

Thus, in operation, the host 822 writes data to the local storage device 824 that is stored locally in the data element 851, possibly continuously backed up at the local storage device 824, and accumulated in the chunk 852. Once all of the data for a particular sequence number has been accumulated (described elsewhere herein), the local storage device 824 increments the sequence number. Data from the chunk 854 corresponding to one less than the current sequence number is transferred from the local storage device 824 to the remote storage device 826. The chunk 858 corresponds to data for a sequence number that was committed by the local storage device 824 sending a message to the remote storage device 826. Data from the chunk 858 is written to disk storage of the remote storage device 826 and/or continuously backed up at the remote storage device 826.

Referring to FIG. 29, a diagram 870 illustrates items used to construct and maintain the chunks 852, 854. A standard logical device 872 provided on the local storage device 824 contains data written by the host 822 and corresponds to the data element 851 of FIG. 28. The standard logical device 872 contains data written by the host 822 to the local storage device 824.

Two linked lists of pointers 874, 876 are used in connection with the standard logical device 872. The linked list 874 contains a plurality of pointers 881-885, each of which points to a portion of data used in connection with the local storage device 824. The data may be provided in a cache memory 888 of the local storage device 824. Similarly, the linked list 876 contains a plurality of pointers 891-895, each of which points to a portion of data provided in the cache memory 888. The cache memory 888 contains a plurality of cache slots 902-904 that may be used in connection to writes to the standard logical device 872 and, at the same time, used in connection with the linked lists 874, 876.

Each of the linked lists 874, 876 may be used for one of the chunks of data 852, 854 so that, for example, the linked list 874 may correspond to the chunk of data 852 for sequence number N while the linked list 876 may correspond to the chunk of data 854 for sequence number N−1. Thus, when data is written by the host 822 to the local storage device 824, the data is provided to the cache 888 and, in some cases (described elsewhere herein), an appropriate pointer of the linked list 874 is created. Note that the data will not be removed from the cache 888 until the data is destaged to the standard logical device 872 and the data is also no longer pointed to by one of the pointers 881-885 of the linked list 874, as described elsewhere herein.

In an embodiment herein, one of the linked lists 874, 876 is deemed "active" while the other is deemed "inactive". Thus, for example, when the sequence number N is even, the linked list 874 may be active while the linked list 876 is inactive. The active one of the linked lists 874, 876 handles writes from the host 822 while the inactive one of the linked lists 874, 876 corresponds to the data that is being transmitted from the local storage device 824 to the remote storage device 826. While the data that is written by the host 822 is accumulated using the active one of the linked lists 874, 876 (for the sequence number N), the data corresponding to the inactive one of the linked lists 874, 876 (for previous sequence number N−1) is transmitted from the local storage device 824 to the remote storage device 826.

Once data corresponding to a particular one of the pointers in one of the linked lists 874, 876 has been transmitted to the remote storage device 826, the particular one of the pointers may be removed from the appropriate one of the linked lists 874, 876. In addition, the data may also be marked for removal from the cache 888 (i.e., the slot may be returned to a pool of slots for later, unrelated, use) provided that the data in the slot is not otherwise needed for another purpose (e.g., to be destaged to the standard logical device 872). A mechanism may be used to ensure that data is not removed from the cache 888 until all devices are no longer using the data.

Referring to FIG. 30, a slot 920, like one of the slots 902-904 of the cache 888, includes a header 922 and data 924. The header 922 corresponds to overhead information used by the system to manage the slot 920. The data 924 is the corresponding data that is being (temporarily) stored in the slot 920. Information in the header 922 includes pointers back to disk storage of the local storage device 824, time stamp(s), etc.

The header 922 also includes a cache stamp 926 used in connection with the system described herein. In an embodiment herein, the cache stamp 926 is eight bytes. Two of the bytes are a "password" that indicates whether the slot 920 is being used by the system described herein. In other embodiments, the password may be one byte while the following byte is used for a pad. As described elsewhere herein, the two bytes of the password (or one byte, as the case may be) being equal to a particular value indicates that the slot 920 is pointed to by at least one entry of the linked lists 874, 876. The password not being equal to the particular value indicates that the slot 920 is not pointed to by an entry of the linked lists 874, 876. Use of the password is described elsewhere herein.

The cache stamp 926 also includes a two byte field indicating the sequence number (e.g., N, N−1, N−2, etc.) of the data 924 of the slot 920. As described elsewhere herein, the sequence number field of the cache stamp 926 may be used to facilitate the processing described herein. The remaining four bytes of the cache stamp 926 may be used for a pointer, as described elsewhere herein. Of course, the two bytes of the sequence number and the four bytes of the pointer are only valid when the password equals the particular value that indicates that the slot 920 is pointed to by at least one entry in one of the lists 874, 876.

Figure 31:
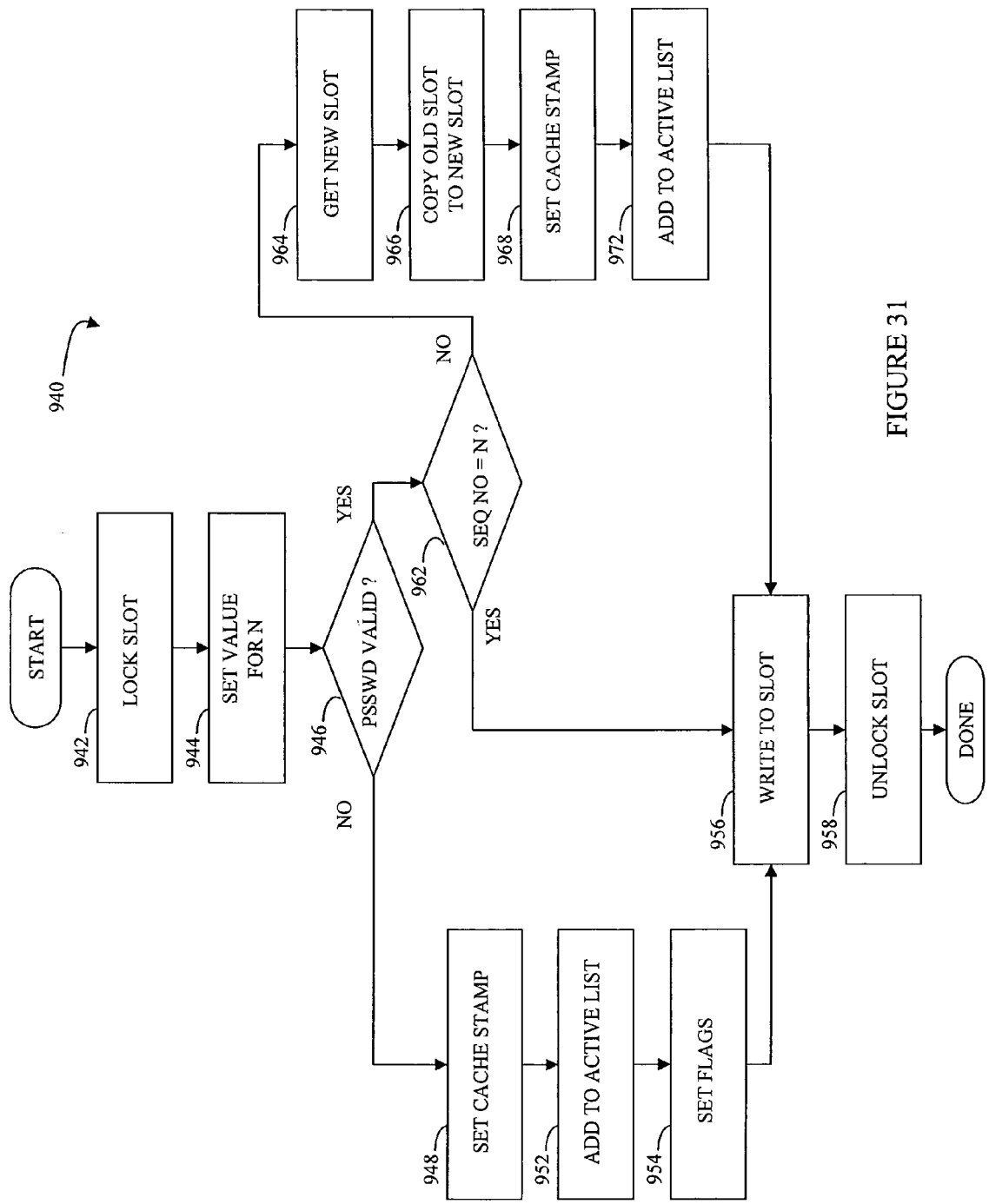
FIG. 31 is a flow chart illustrating processing performed in response to a write by a host to a local storage device according to the system described herein.

Referring to FIG. 31, a flow chart 940 illustrates steps performed by the local storage device 824 in connection with the host 822 performing a write operation. Of course, when the host 822 performs a write, processing occurs for handling the write in a normal fashion irrespective of whether the data is being continuously backed up at the remote storage device 826.

Processing begins at a first step 942 where a slot corresponding to the write is locked. In an embodiment herein, each of the slots 902-904 of the cache 888 corresponds to a track of data on the standard logical device 872. Locking the slot at the step 942 prevents additional processes from operating on the relevant slot during the processing performed by the local storage device 824 corresponding to the steps of the flow chart 940.

Following step 942 is a step 944 where a value for N, the sequence number, is set. As discussed elsewhere herein, the value for the sequence number obtained at the step 944 is maintained during the entire write operation performed by the local storage device 824 while the slot is locked. As discussed elsewhere herein, the sequence number is assigned to each write to set the one of the chunks of data 852, 854 to which the write belongs. Writes performed by the host 822 are assigned the current sequence number. It is useful that a single write operation maintain the same sequence number throughout.

Following the step 944 is a test step 946 which determines if the password field of the cache slot is valid. As discussed above, the system described herein sets the password field to a predetermined value to indicate that the cache slot is already in one of the linked lists of pointers 874, 876. If it is determined at the test step 946 that the password field is not valid (indicating that the slot is new and that no pointers from the lists 874, 876 point to the slot), then control passes from the step 946 to a step 948, where the cache stamp of the new slot is set by setting the password to the predetermined value, setting the sequence number field to N, and setting the pointer field to Null. In other embodiments, the pointer field may be set to point to the slot itself.

Following the step 948 is a step 952 where a pointer to the new slot is added to the active one of the pointer lists 874, 876. In an embodiment herein, the lists 874, 876 are circular doubly linked lists, and the new pointer is added to the circular doubly linked list in a conventional fashion. Of course, other appropriate data structures could be used to manage the lists 874, 876. Following the step 952 is a step 954 where flags are set. At the step 954, a write pending flag may set to indicate that the slot needs to be transmitted to the remote storage device 826. In addition, at the step 954, an in cache flag may be set to indicate that the slot needs to be destaged to the standard logical device 872. Following the step 954 is a step 956 where the data being written by the host 822 is written to the slot. Following the step 956 is a step 958 where the slot is unlocked. Following step 958, processing is complete.

If it is determined at the test step 946 that the password field of the slot is valid (indicating that the slot is already pointed to by at least one pointer of the lists 874, 876), then control transfers from the step 946 to a test step 962, where it is determined whether the sequence number field of the slot is equal to the current sequence number, N. Note that there are two valid possibilities for the sequence number field of a slot with a valid password. It is possible for the sequence number field to be equal to N, the current sequence number. This occurs when the slot corresponds to a previous write with sequence number N. The other possibility is for the sequence number field to equal N−1. This occurs when the slot corresponds to a previous write with sequence number N−1. Any other value for the sequence number field is invalid. Thus, for some embodiments, it may be possible to include error/validity checking in the step 962 or possibly make error/validity checking a separate step. Such an error may be handled in any appropriate fashion, which may include providing a message to a user.

If it is determined at the step 962 that the value in the sequence number field of the slot equals the current sequence number N, then no special processing is required and control transfers from the step 962 to the step 956, discussed above, where the data is written to the slot. Otherwise, if the value of the sequence number field is N−1 (the only other valid value), then control transfers from the step 962 to a step 964 where a new slot is obtained. The new slot obtained at the step 964 may be used to store the data being written.

Following the step 964 is a step 966 where the data from the old slot is copied to the new slot that was obtained at the step 964. Note that that the copied data includes the write pending flag, which should have been set at the step 954 on a previous write when the slot was first created. Following the step 966 is a step 968 where the cache stamp for the new slot is set by setting the password field to the appropriate value, setting the sequence number field to the current sequence number, N, and setting the pointer field to point to the old slot. Following the step 968 is a step 972 where a pointer to the new slot is added to the active one of the linked lists 874, 876. Following the step 972 is the step 956, discussed above, where the data is written to the slot which, in this case, is the new slot.

Figure 32:
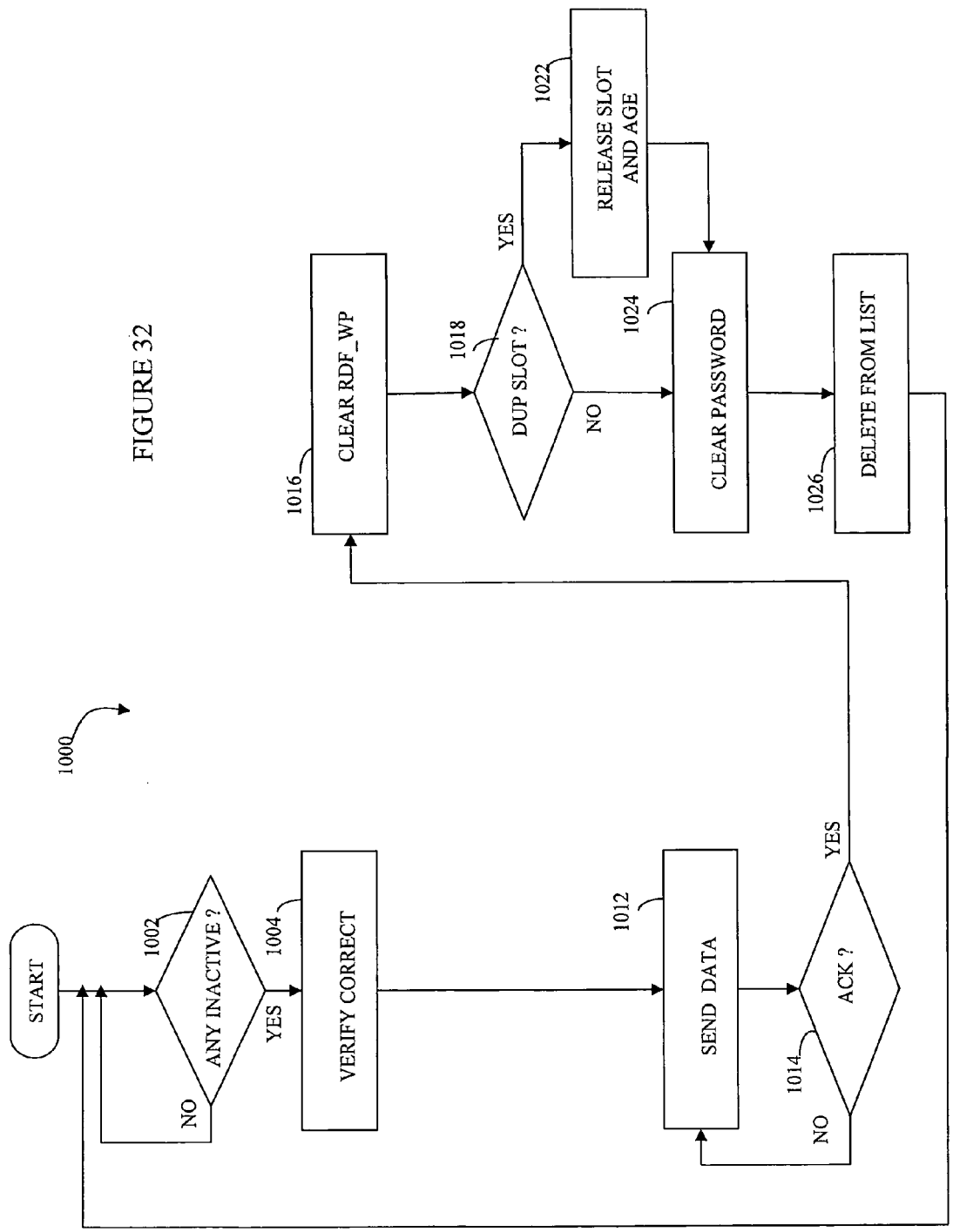
FIG. 32 is a flow chart illustrating transferring data from a local storage device to a remote storage device according to the system described herein.

Referring to FIG. 32, a flow chart 1000 illustrates steps performed in connection with the local storage device 824 scanning the inactive one of the lists 872, 874 to transmit data from the local storage device 824 to the remote storage device 826 when the data has been accumulated according to the embodiment illustrated in connection with FIG. 29. As discussed above, the inactive one of the lists 872, 874 points to slots corresponding to the N−1 cycle for the local storage device 824 when the N cycle is being written to the local storage device 824 by the host 822 using the active one of the lists 872, 874.

Processing begins at a first step 1002 where it is determined if there are any entries in the inactive one of the lists 872, 874. As data is transmitted, the corresponding entries are removed from the inactive one of the lists 872, 874. In addition, new writes are provided to the active one of the lists 872, 874 and not generally to the inactive one of the lists 72, 74. Thus, it is possible (and desirable, as described elsewhere herein) for the inactive one of the lists 872, 874 to contain no data at certain times. If it is determined at the step 1002 that there is no data to be transmitted, then the inactive one of the lists 872, 874 is continuously polled until data becomes available. Data for sending becomes available in connection with a cycle switch (discussed elsewhere herein) where the inactive one of the lists 872, 874 becomes the active one of the lists 872, 874, and vice versa.

If it is determined at the step 1002 that there is data available for sending, control transfers from the step 1002 to a step 1004, where the slot is verified as being correct. The processing performed at the step 1004 is an optional "sanity check" that may include, for example, verifying that the password field is correct and verifying that the sequence number field is correct. If there is incorrect (unexpected) data in the slot, error processing may be performed, which may include notifying a user of the error and possibly error recovery processing.

Following the step 1004 is a step 1012, where the data is sent from the local storage device 824 to the remote storage device 826 in an appropriate manner. In an embodiment herein, the entire slot is not transmitted. Rather, only records within the slot that have the appropriate mirror bits set (indicating the records have changed) are transmitted to the remote storage device 826. However, in other embodiments, it may be possible to transmit the entire slot, provided that the remote storage device 826 only writes data corresponding to records having appropriate mirror bits set and ignores other data for the track, which may or may not be valid. Following the step 1012 is a test step 1014 where it is determined if the data that was transmitted has been acknowledged by the remote storage device 826. If not, the data is resent, as indicated by the flow from the step 1014 back to the step 1012. In other embodiments, different and more involved processing may used to send data and acknowledge receipt thereof. Such processing may include error reporting and alternative processing that is performed after a certain number of attempts to send the data have failed.

Once it is determined at the test step 1014 that the data has been successfully sent, control passes from the step 1014 to a step 1016 to clear the write pending flag (since the data has been successfully sent). Following the step 1016 is a test step 1018 where it is determined if the slot is a duplicate slot created in connection with a write to a slot already having an existing entry in the inactive one of the lists 872, 874. This possibility is discussed above in connection with the steps 962, 964, 966, 968, 972. If it is determined at the step 1018 that the slot is a duplicate slot, then control passes from the step 1018 to a step 1022 where the slot is returned to the pool of available slots (to be reused). In addition, the slot may also be aged (or have some other appropriate mechanism applied thereto) to provide for immediate reuse ahead of other slots since the data provided in the slot is not valid for any other purpose. Following the step 1022 or the step 1018 if the slot is not a duplicate slot is a step 1024 where the password field of the slot header is cleared so that when the slot is reused, the test at the step 946 of FIG. 31 properly classifies the slot as a new (unused) slot.

Following the step 1024 is a step 1026 where the entry in the inactive one of the lists 872, 874 is removed. Following the step 1026, control transfers back to the step 1002, discussed above, where it is determined if there are additional entries on the inactive one of the lists 872, 874 corresponding to data needing to be transferred.

Figure 33:
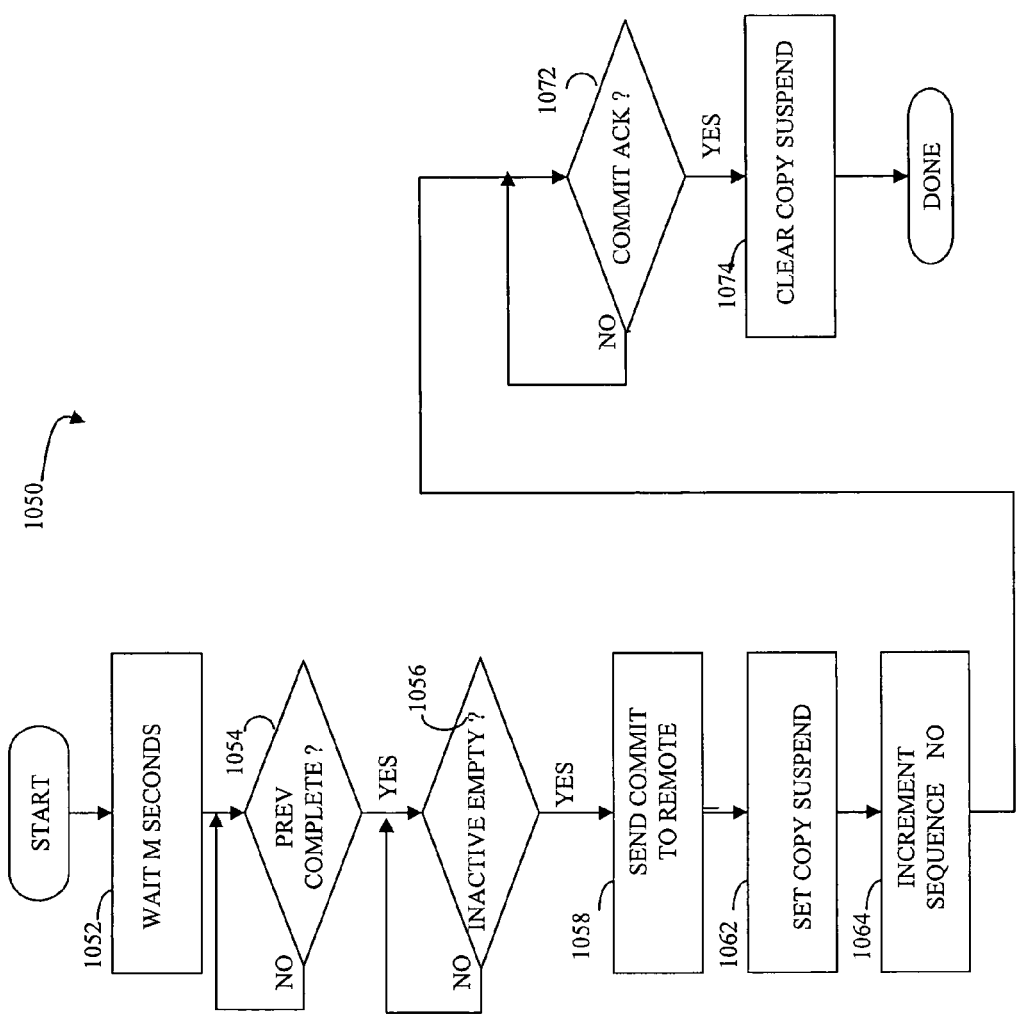
FIG. 33 is a flow chart illustrating steps performed in connection with a local storage device incrementing a sequence number according to a system described herein.

Referring to FIG. 33, a flow chart 1050 illustrates steps performed in connection with the local storage device 824 increasing the sequence number. Processing begins at a first step 1052 where the local storage device 824 waits at least M seconds prior to increasing the sequence number. In an embodiment herein, M is thirty, but of course M could be any number. Larger values for M increase the amount of data that may be lost if communication between the storage devices 824, 826 is disrupted. However, smaller values for M increase the total amount of overhead caused by incrementing the sequence number more frequently.

Following the step 1052 is a test step 1054 which determines if all write operations to the local storage device 824 associated with the previous sequence number have completed. In some instances, a single I/O may take a relatively long time and may still be in progress even after the sequence number has changed. Any appropriate mechanism may be used at the step 1054.

If it is determined at the test step 1054 that I/O's from the previous sequence number have been completed, then control transfers from the step 1054 to a test step 1056 which determines if the inactive one of the lists 874, 876 is empty. Note that a sequence number switch may not be made unless and until all of the data corresponding to the inactive one of the lists 874, 876 has been completely transmitted from the local storage device 824 to the remote storage device 826. Once the inactive one of the lists 874, 876 is determined to be empty, then control transfers from the step 1056 to a step 1058 where the commit for the previous sequence number is sent from the local storage device 824 to the remote storage device 826. The remote storage device 826 receiving a commit message for a particular sequence number will indicate to the remote storage device 826 that the data corresponding to the sequence number has all been sent.

Following the step 1058 is a step 1062 where copying of data for the inactive one of the lists 874, 876 is suspended. As discussed elsewhere herein, the inactive one of the lists is scanned to send corresponding data from the local storage device 824 to the remote storage device 826. It is useful to suspend copying data until the sequence number switch is completed.

Following step 1062 is a step 1064 where the sequence number is incremented. Following step 1064 is a test step 1072 which determines if the remote storage device 826 has acknowledged the commit message sent at the step 1058. Once it is determined that the remote storage device 826 has acknowledged the commit message sent at the step 1058, control transfers from the step 1072 to a step 1074 where the suspension of copying, which was provided at the step 1062, is cleared so that copying may resume. Following step 1074, processing is complete. Note that it is possible to go from the step 1074 back to the step 1052 to begin a new cycle to continuously increment the sequence number.

It is also possible to use tables at the local storage device 824 to collect slots associated with active data and inactive chunks of data. In that case, one table could be associated with the inactive sequence number and another table could be associated with the active sequence number. This is described below.

Figure 34:
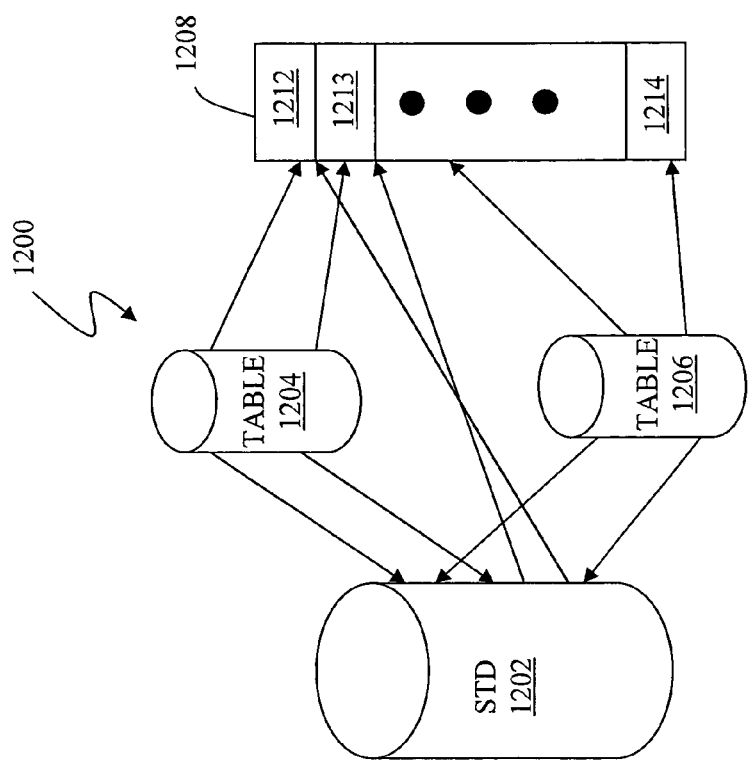
FIG. 34 is a schematic diagram illustrating items for constructing and manipulating chunks of data on a local storage device according to an alternative embodiment of the system described herein.

Referring to FIG. 34, a diagram 1200 illustrates items used to construct and maintain the chunks 852, 854. A standard logical device 1202 contains data written by the host 822 and corresponds to the data element 851, discussed above. The standard logical device 1202 contains data written by the host 822 to the local storage device 824.

Two tables 1204, 1206 are used in connection with the standard logical device 1202. The tables 404, 406 may correspond to device tables that may be stored, for example, in the memory of the local storage device 824. Each track entry of the tables 1204, 1206 point to either a track of the standard logical device 1202 or point to a slot of a cache 1208 used in connection with the local storage device 824.

The cache 1208 contains a plurality of cache slots 1212-1214 that may be used in connection to writes to the standard logical device 1202 and, at the same time, used in connection with the tables 1204, 1206. In an embodiment herein, each track table entry of the tables 1204, 1206 contains a null to indicate use of a corresponding track of the standard logical device 1202. Otherwise, an entry in the track table for each of the tables 1204, 1206 contains a pointer to one of the slots 1212-1214 in the cache 1208.

Each of the cache tables 1204, 1206 may be used for one of the chunks of data 852, 854 so that, for example, the table 1204 may correspond to the chunk of data 852 for sequence number N while the table 1206 may correspond to the chunk of data 854 for sequence number N−1. Thus, when data is written by the host 822 to the local storage device 824, the data is provided to the cache 1208 and an appropriate pointer of the table 1204 is adjusted. Note that the data will not be removed from the cache 1208 until the data is destaged to the standard logical device 1202 and the data is also released by a mechanism associated with the table 1204, as described elsewhere herein.

In an embodiment herein, one of the tables 1204, 1206 is deemed "active" while the other is deemed "inactive". Thus, for example, when the sequence number N is even, the table 1204 may be active while the table 1206 is inactive. The active one of the tables 1204, 1206 handles writes from the host 822 while the inactive one of the tables 1204, 1206 corresponds to the data that is being transmitted from the local storage device 824 to the remote storage device 826.

While the data that is written by the host 822 is accumulated using the active one of the tables 1204, 1206 (for the sequence number N), the data corresponding to the inactive one of the tables 1204, 1206 (for previous sequence number N−1) is transmitted from the local storage device 824 to the remote storage device 826.

Once the data has been transmitted to the remote storage device 826, the corresponding entry in the inactive one of the tables 1204, 1206 may be set to null. In addition, the data may also be removed from the cache 1208 (i.e., the slot returned to the pool of slots for later use) if the data in the slot is not otherwise needed for another purpose (e.g., to be destaged to the standard logical device 1202). A mechanism may be used to ensure that data is not removed from the cache 1208 until all mirrors and the tables 1204, 1206 are no longer using the data. Such a mechanism is described, for example, in U.S. Pat. No. 5,537,568 issued on Jul. 16, 1996.

Figure 35:
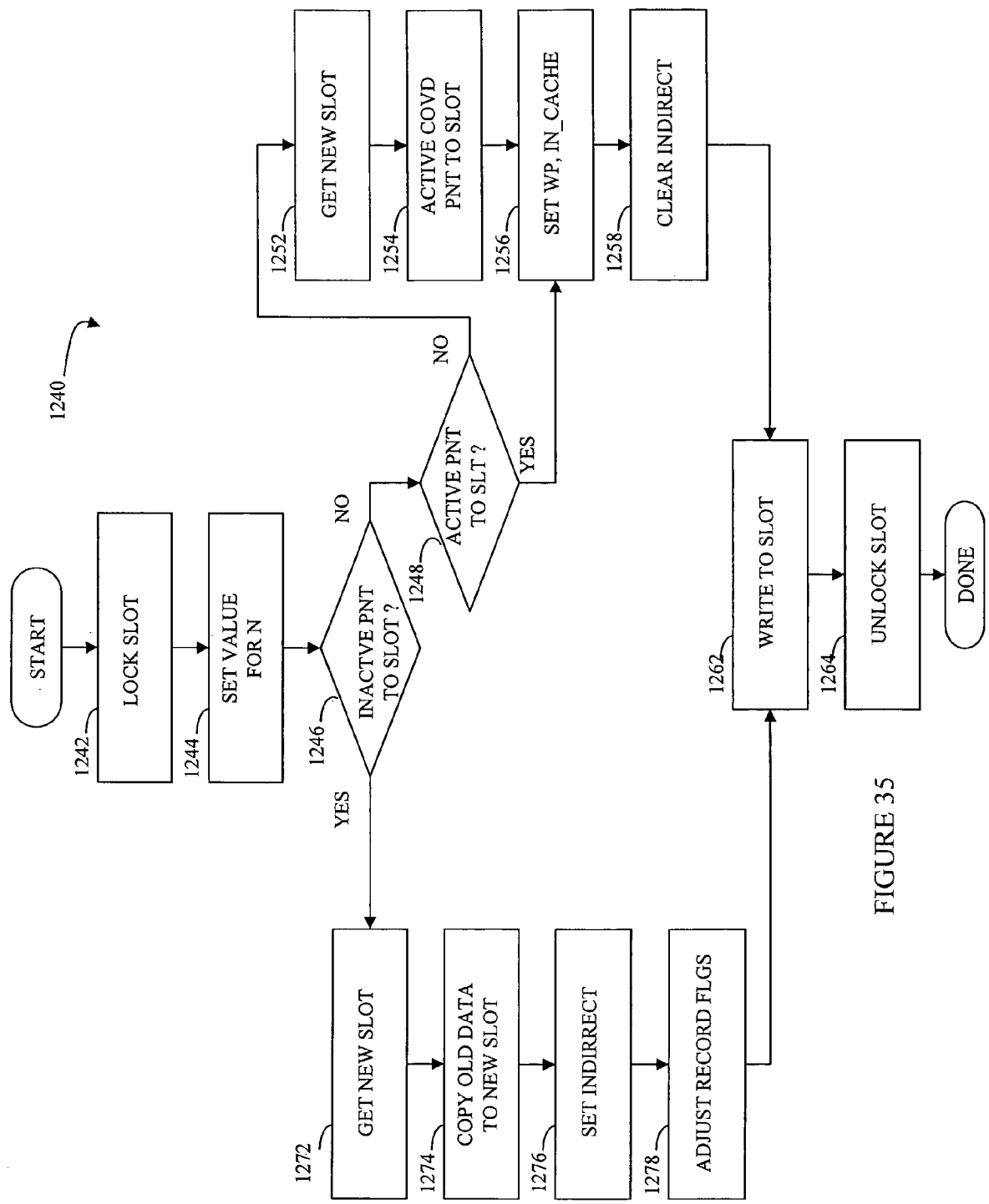
FIG. 35 is a flow chart illustrating processing performed in response to a write by a host to a local storage device according to an alternative embodiment of the system described herein.

Referring to FIG. 35, a flow chart 1240 illustrates steps performed by the local storage device 824 in connection with a host 822 performing a write operation for embodiments where two tables are used. Processing begins at a first step 1242 where a slot corresponding to the write is locked. In an embodiment herein, each of the slots 1212-1214 of the cache 1208 corresponds to a track of data on the standard logical device 1202. Locking the slot at the step 1242 prevents additional processes from operating on the relevant slot during the processing performed by the local storage device 824 corresponding to the steps of the flow chart 1240.

Following the step 1242 is a step 1244 where a value for N, the sequence number, is set. Just as with the embodiment that uses lists rather than tables, the value for the sequence number obtained at the step 1244 is maintained during the entire write operation while the slot is locked. As discussed elsewhere herein, the sequence number is assigned to each write to determine the one of the chunks of data 852, 854 to which the write belongs. Writes performed by the host 822 are assigned the current sequence number. It is useful that a single write operation maintain the same sequence number throughout.

Following the step 1244 is a test step 1246, which determines if the inactive one of the tables 1204, 1206 already points to the slot that was locked at the step 1242 (the slot being operated upon). This may occur if a write to the same slot was provided when the sequence number was one less than the current sequence number. The data corresponding to the write for the previous sequence number may not yet have been transmitted to the remote storage device 826.

If it is determined at the test step 1246 that the inactive one of the tables 1204, 1206 does not point to the slot, then control transfers from the test step 1246 to another test step 1248, where it is determined if the active one of the tables 1204, 1206 points to the slot. It is possible for the active one of the tables 1204, 1206 to point to the slot if there had been a previous write to the slot while the sequence number was the same as the current sequence number. If it is determined at the test step 1248 that the active one of the tables 1204, 1206 does not point to the slot, then control transfers from the test step 1248 to a step 1252 where a new slot is obtained for the data. Following the step 1252 is a step 1254 where the active one of the tables 1204, 1206 is made to point to the slot.

Following the step 1254, or following the step 1248 if the active one of the tables 1204, 1206 points to the slot, is a step 1256 where flags are set. At the step 1256, the write pending flag is set to indicate that the slot needs to be transmitted to the remote storage device 826. In addition, at the step 1256, an IN_CACHE flag is set to indicate that the slot needs to be destaged to the standard logical device 1202. Note that, in some instances, if the active one of the tables 1204, 1206 already points to the slot (as determined at the step 1248) it is possible that the write pending and IN_CACHE flags were already set prior to execution of the step 1256. However, setting the flags at the step 1256 ensures that the flags are set properly no matter what the previous state.

Following the step 1256 is a step 1258 where an indirect flag in the track table that points to the slot is cleared, indicating that the relevant data is provided in the slot and not in a different slot indirectly pointed to. Following the step 1258 is a step 1262 where the data being written by the host 822 is written to the slot. Following the step 1262 is a step 1264 where the slot is unlocked. Following step 1264, processing is complete.

If it is determined at the test step 1246 that the inactive one of the tables 1204, 1206 points to the slot, then control transfers from the step 1246 to a step 1272, where a new slot is obtained. The new slot obtained at the step 1272 may be used for the inactive one of the tables 1204, 1206 to effect the transfer while the old slot may be associated with the active one of the tables 1204, 1206, as described below.

Following the step 1272 is a step 1274 where the data from the old slot is copied to the new slot that was obtained at the step 1272. Following the step 1274 is a step 1276 where the indirect flag (discussed above) is set to indicate that the track table entry for the inactive one of the tables 1204, 1206 points to the old slot but that the data is in the new slot which is pointed to by the old slot. Thus, setting indirect flag at the step 1276 affects the track table of the inactive one of the tables 1204, 1206 to cause the track table entry to indicate that the data is in the new slot.

Following the step 1276 is a step 1278 where the mirror bits for the records in the new slot are adjusted. Any local mirror bits that were copied when the data was copied from the old slot to the new slot at the step 1274 are cleared since the purpose of the new slot is to simply effect the transfer for the inactive one of the tables. The old slot will be used to handle any local mirrors. Following the step 1278 is the step 1262 where the data is written to the slot. Following step 1262 is the step 1264 where the slot is unlocked. Following the step 1264, processing is complete.

Figure 36:
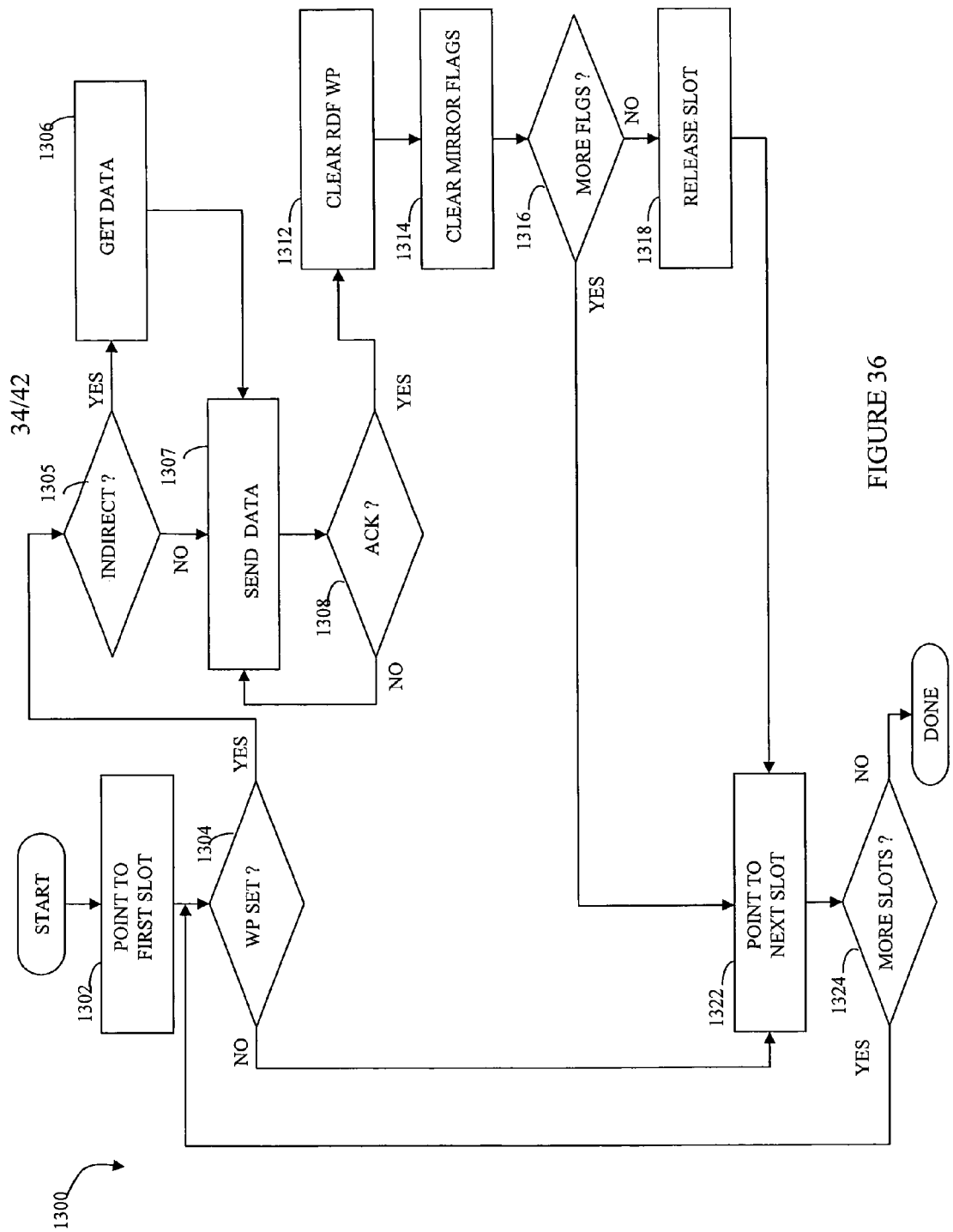
FIG. 36 is a flow chart illustrating transferring data from a local storage device to a remote storage device according to an alternative embodiment of the system described herein.

Referring to FIG. 36, a flow chart 1300 illustrates steps performed in connection with the local storage device 824 transmitting the chunk of data 854 to the remote storage device 826 when the data has been accumulated according to the embodiment illustrated in connection with FIG. 34. The transmission essentially involves scanning the inactive one of the tables 1204, 1206 for tracks that have been written thereto during a previous iteration when the inactive one of the tables 1204, 1206 was active.

Processing begins at a first step 1302 where the first track of the inactive one of the tables 1204, 1206 is pointed to in order to begin the process of iterating through all of the tracks. Following the first step 1302 is a test step 1304 where it is determined if the write pending flag is set. As discussed elsewhere herein, the write pending flag is used to indicate that a slot (track) contains data that needs to be transmitted to the remote storage device 826. The write pending flag being set indicates that at least some data for the slot (track) is to be transmitted. In an embodiment herein, the entire slot is not transmitted. Rather, only records within the slot that have the appropriate mirror bits set (indicating the records have changed) are transmitted to the remote storage device 826. However, in other embodiments, it may be possible to transmit the entire slot, provided that the remote storage device 826 only writes data corresponding to records having appropriate mirror bits set and ignores other data for the track, which may or may not be valid.

If it is determined at the test step 1304 that the cache slot being processed has the write pending flag set, then control transfers from the step 1304 to a test step 1305, where it is determined if the slot contains the data or if the slot is an indirect slot that points to another slot that contains the relevant data. In some instances, a slot may not contain the data for the portion of the disk that corresponds to the slot. Instead, the slot may be an indirect slot that points to another slot that contains the data. If it is determined at the step 1305 that the slot is an indirect slot, then control transfers from the step 1305 to a step 1306, where the data (from the slot pointed to by the indirect slot) is obtained. Thus, if the slot is a direct slot, the data being sent is stored in the slot while if the slot is an indirect slot, the data being sent is in another slot pointed to by the indirect slot.

Following the step 1306 or the step 1305 if the slot is a direct slot is a step 1307 where data being sent (directly or indirectly from the slot) is transmitted to the remote storage device 826. Following the step 1307 is a test step 1308 where it is determined if the remote storage device 826 has acknowledged receipt of the data. If not, then control transfers from the step 1308 back to the step 1307 to resend the data. In other embodiments, different and more involved processing may used to send data and acknowledge receipt thereof. Such processing may include error reporting and alternative processing that is performed after a certain number of attempts to send the data have failed.

Once it is determined at the test step 1308 that the data has been successfully sent, control passes from the step 1308 to a step 1312 to clear the write pending flag (since the data has been successfully sent). Following the step 1312 is a step 1314 where appropriate mirror flags are cleared to indicate that at least the remote storage device 826 no longer needs the data. In an embodiment herein, each record that is part of a slot (track) has individual mirror flags indicating which mirrors use the particular record. The remote storage device 826 is one of the mirrors for each of the records and it is the flags corresponding to the remote storage device 826 that are cleared at the step 1314.

Following the step 1314 is a test step 1316 which determines if any of the records of the track being processed have any other mirror flags set (for other mirror devices). If not, then control passes from the step 1316 to a step 1318 where the slot is released (i.e., no longer being used). In some embodiments, unused slots are maintained in a pool of slots available for use. Note that if additional flags are still set for some of the records of the slot, it may mean that the records need to be destaged to the standard logical device 1202 or are being used by some other mirror. Following the step 1318, or following the step 1316 if more mirror flags are present, is a step 1322 where the pointer that is used to iterate through each track entry of the inactive one of the tables 1204, 1206 is made to point to the next track. Following the step 1322 is a test step 1324 which determines if there are more tracks of the inactive one of the tables 1204, 1206 to be processed. If not, then processing is complete. Otherwise, control transfers back to the test step 1304, discussed above. Note that the step 1322 is also reached from the test step 1304 if it is determined that the write pending flag is not set for the track being processed.

Referring to FIG. 37, a diagram 1500 illustrates a host 1502 coupled to a plurality of local storage devices 1503-1505. The diagram 1500 also shows a plurality of remote storage devices 1506-1508. Although only three local storage devices 1503-1505 and three remote storage devices 1506-1508 are shown in the diagram 1500, the system described herein may be expanded to use any number of local and remote storage devices. As discussed in more detail below, the functionality associated with providing continuous backup at a single remote storage device couple to a single local storage device may be extended to operate with multiple local and remote storage devices.

Each of the local storage devices 1503-1505 is coupled to a corresponding one of the remote storage devices 1506-1508 so that, for example, the local storage device 1503 is coupled to the remote storage device 1506, the local storage device 1504 is coupled to the remote storage device 1507 and the local storage device 1505 is coupled to the remote storage device 1508. The local storage devices 1503-1505 may transfer data for remote continuous backup to the remote storage devices 1506-1508 so that, for example, the local storage device 1503 may transfer remote continuous backup data to the remote storage device 1506.

In some instances, the host 1502 may run a single application that simultaneously uses more than one of the local storage devices 1503-1505. In such a case, the application may be configured to ensure that application data is consistent (recoverable) at the local storage devices 1503-1505 if the host 1502 were to cease working at any time and/or if one of the local storage devices 1503-1505 were to fail. However, since each of the connections between the local storage devices 1503-1505 and the remote storage devices 1506-1508 may be asynchronous from the other connections, then there may be no assurance that data for the application will be consistent (and thus recoverable) at the remote storage devices 1506-1508. That is, for example, even though the data connection between the local storage device 1503 and the remote storage device 1506 (a first local/remote pair) is consistent and the data connection between the local storage device 1504 and the remote storage device 1507 (a second local/remote pair) is consistent, it is not necessarily the case that the data on the remote storage devices 1506, 1507 is always consistent if there is no synchronization between the first and second local/remote pairs.

For applications on the host 1502 that simultaneously use a plurality of local storage devices 1503-1505, it is desirable to have the data be consistent and recoverable at the remote storage devices 1506-1508. This may be provided by a mechanism whereby the host 1502 controls cycle switching at each of the local storage devices 1503-1505 so that the data from the application running on the host 1502 is consistent and recoverable at the remote storage devices 1506-1508. This functionality is provided by a special application that runs on the host 1502 that switches a plurality of the local storage devices 1503-1505 into multi-box mode, as described in more detail below.

Referring to FIG. 38, a table 1530 has a plurality of entries 1532-1534. Each of the entries 1532-1534 correspond to a single local/remote pair of storage devices so that, for example, the entry 1532 may correspond to pair of the local storage device 1503 and the remote storage device 1506, the entry 1533 may correspond to pair of the local storage device 1504 and the remote storage device 1507 and the entry 1534 may correspond to the pair of local storage device 1505 and the remote storage device 1508. Each of the entries 1532-1534 has a plurality of fields where a first field 1536*a*-1536*c* represents a serial number of the corresponding local storage device, a second field 1538*a*-1538*c* represents a session number used by the multi-box group, a third field 1542*a*-1542*c* represents the serial number of the corresponding remote storage device of the local/remote pair, and a fourth field 1544*a*-1544*c* represents the session number for the multi-box group. The table 1530 is constructed and maintained by the host 1502 in connection with operating in multi-box mode. In addition, the table 1530 is propagated to each of the local storage devices and the remote storage devices that are part of the multi-box group. The table 1530 may be used to facilitate recovery, as discussed in more detail below.

Different local/remote pairs may enter and exit multi-box mode independently in any sequence and at any time. The host 1502 manages entry and exit of local storage device/remote storage device pairs into and out of multi-box mode. This is described in more detail below.

Figure 39:
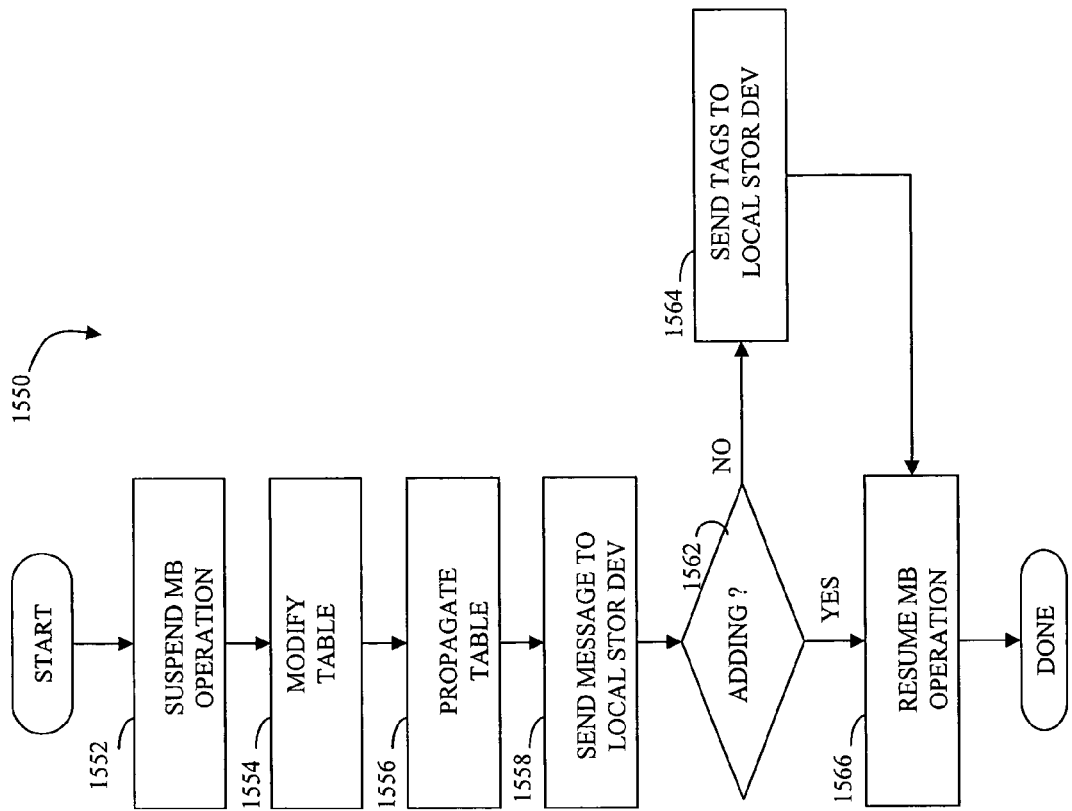
FIG. 39 is a flow chart illustrating modifying a multi-box mode table according to the system described herein.

Referring to FIG. 39, a flow chart 1550 illustrates steps performed by the host 1502 in connection with entry or exit of a local/remote pair in to or out of multi-box mode. Processing begins at a first step 1552 where multi-box mode operation is temporarily suspended. Temporarily suspending multi-box operation at the step 1552 is useful to facilitate the changes that are made in connection with entry or exit of a remote/local pair in to or out of multi-box mode. Following the step 1552, is a step 1554 where a table like the table 1530 is modified to either add or delete an entry, as appropriate. Following the step 1554 is a step 1556 where the modified table is propagated to the local storage devices and remote storage devices of the multi-box group. Propagating the table at the step 1556 facilitates recovery, as discussed in more detail elsewhere herein.

Following the step 1556 is a step 1558 where a message is sent to the affected local storage device to provide the change. The local storage device may configure itself to run in multi-box mode or not, as described in more detail elsewhere herein. As discussed in more detail below, a local storage device handling remote continuous backup operates differently depending upon whether it is operating as part of a multi-box group or not. If the local storage device is being added to a multi-box group, the message sent at the step 1558 indicates to the local storage device that it is being added to a multi-box group so that the local storage device should configure itself to run in multi-box mode. Alternatively, if a local storage device is being removed from a multi-box group, the message sent at the step 1558 indicates to the local storage device that it is being removed from the multi-box group so that the local storage device should configure itself to not run in multi-box mode.

Following step 1558 is a test step 1562 where it is determined if a local/remote pair is being added to the multi-box group (as opposed to being removed). If so, then control transfers from the test step 1562 to a step 1564 where tag values are sent to the local storage device that is being added. The tag values are provided with the data transmitted from the local storage device to the remote storage device in a manner similar to providing the sequence numbers with the data. The tag values are controlled by the host and set so that all of the local/remote pairs send data having the same tag value during the same cycle. Use of the tag values is discussed in more detail below. Following the step 1564, or following the step 1562 if a new local/remote pair is not being added, is a step 1566 where multi-box operation is resumed. Following the step 1566, processing is complete.

Figure 40:
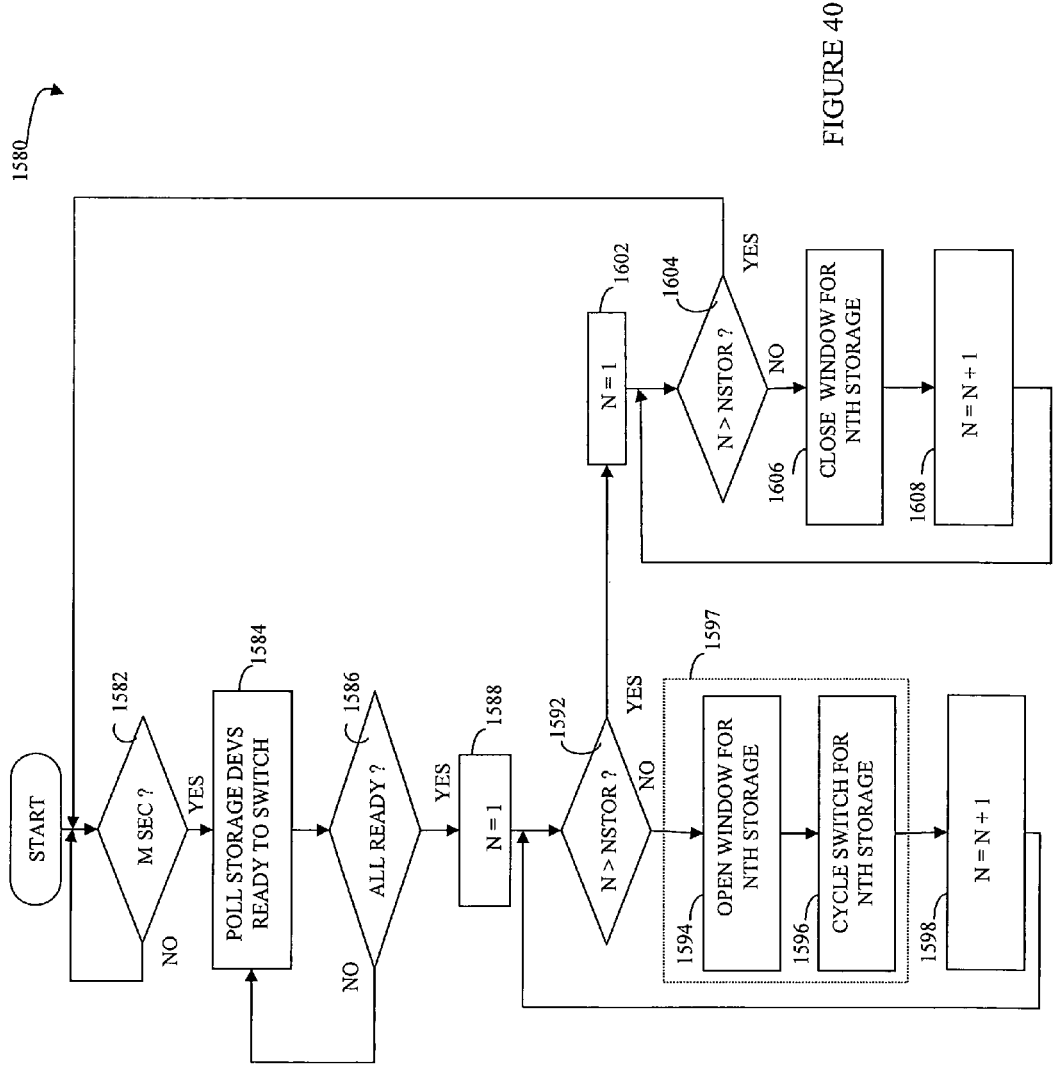
FIG. 40 is a flow chart illustrating cycle switching by the host according to the system described herein.

Referring to FIG. 40, a flow chart 1580 illustrates steps performed in connection with the host managing cycle switching for multiple local/remote pairs running as a group in multi-box mode. As discussed elsewhere herein, multi-box mode involves having the host synchronize cycle switches for more than one remote/local pair to maintain data consistency among the remote storage devices. Cycle switching is coordinated by the host rather than being generated internally by the local storage devices. This is discussed in more detail below.

Processing for the flow chart 1580 begins at a test step 1582 which determines if M seconds have passed. Just as with non-multi-box operation, cycle switches occur no sooner than every M seconds where M is a number chosen to optimize various performance parameters. As the number M is increased, the amount of overhead associated with switching decreases. However, increasing M also causes the amount of data that may be potentially lost in connection with a failure to also increase. In an embodiment herein, M is chosen to be thirty seconds, although, obviously other values for M may be used.

If it is determined at the test step 1582 that M seconds have not passed, then control transfers back to the step 1582 to continue polling until M seconds have passed. Once it is determined at the test step 1582 that M seconds have passed, control transfers from the step 1582 to a step 1584 where the host queries all of the local storage devices in the multi-box group to determine if all of the local/remote pairs are ready to switch. The local/remote pairs being ready to switch is discussed in more detail hereinafter.

Following the step 1584 is a test step 1586 which determines if all of the local/remote pairs are ready to switch. If not, control transfers back to the step 1584 to resume the query. In an embodiment herein, it is only necessary to query local/remote pairs that were previously not ready to switch since, once a local/remote pair is ready to switch, the pair remains so until the switch occurs.

Once it is determined at the test step 1586 that all of the local/remote pairs in the multi-box group are ready to switch, control transfers from the step 1586 to a step 1588 where an index variable, N, is set equal to one. The index variable N is used to iterate through all the local/remote pairs (i.e., all of the entries 1532-1534 of the table 1530). Following the step 1588 is a test step 1592 which determines if the index variable, N, is greater than the number of local/remote pairs in the multi-box group. If not, then control transfers from the step 1592 to a step 1594 where an open window is performed for the Nth local storage device of the Nth pair by the host sending a command (e.g., an appropriate system command) to the Nth local storage device. Opening the window for the Nth local storage device at the step 1594 causes the Nth local storage device to suspend writes so that any write by a host that is not begun prior to opening the window at the step 1594 will not be completed until the window is closed (described below). Not completing a write operation prevents a second dependant write from occurring prior to completion of the cycle switch. Any writes in progress that were begun before opening the window may complete prior to the window being closed.

Following the step 1594 is a step 1596 where a cycle switch is performed for the Nth local storage device. Performing the cycle switch at the step 1596 involves sending a command from the host 1502 to the Nth local storage device. Processing the command from the host by the Nth local storage device is discussed in more detail below. Part of the processing performed at the step 1596 may include having the host provide new values for the tags that are assigned to the data. The tags are discussed in more detail elsewhere herein. In an alternative embodiment, the operations performed at the steps 1594, 1596 may be performed as a single integrated step 1597, which is illustrated by the box drawn around the steps 1594, 1596.

Following the step 1596 is a step 1598 where the index variable, N, is incremented. Following step 1598, control transfers back to the test step 1592 to determine if the index variable, N, is greater than the number of local/remote pairs.

If it is determined at the test step 1592 that the index variable, N, is greater than the number of local/remote pairs, then control transfers from the test step 1592 to a step 1602 where the index variable, N, is set equal to one. Following the step 1602 is a test step 1604 which determines if the index variable, N, is greater than the number of local/remote pairs. If not, then control transfers from the step 1604 to a step 1606 where the window for the Nth local storage device is closed. Closing the window of the step 1606 is performed by the host sending a command to the Nth local storage device to cause the Nth local storage device to resume write operations. Thus, any writes in process that were suspended by opening the window at the step 1594 may now be completed after execution of the step 1606. Following the step 1606, control transfers to a step 1608 where the index variable, N, is incremented. Following the step 1608, control transfers back to the test step 1604 to determine if the index variable, N, is greater than the number of local/remote pairs. If so, then control transfers from the test step 1604 back to the step 1582 to begin processing for the next cycle switch.

Figure 41:
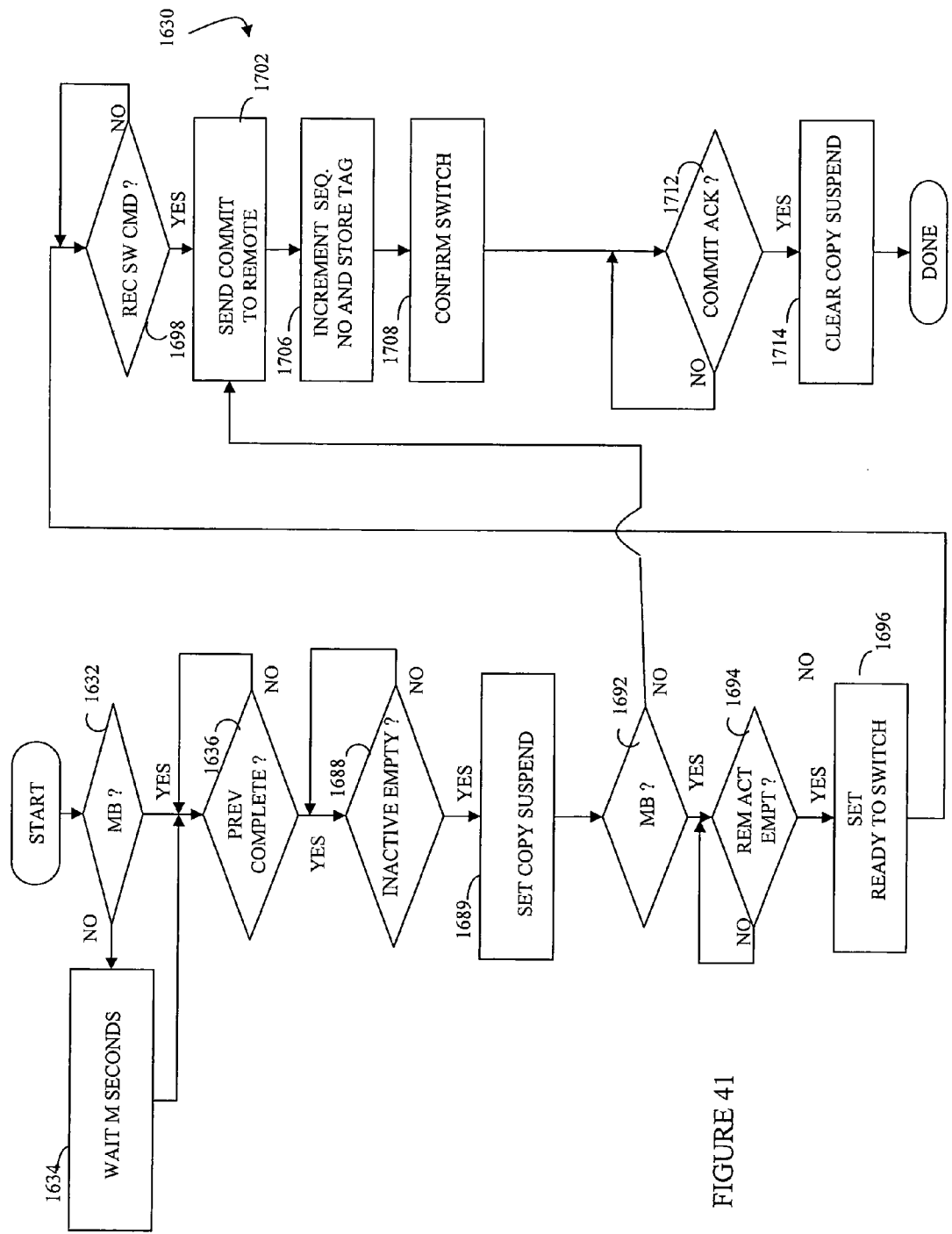
FIG. 41 is a flow chart illustrating steps performed in connection with a local storage device incrementing a sequence number according to a system described herein.

Referring to FIG. 41, a flow chart 1630 illustrates steps performed by a local storage device in connection with cycle switching. The flow chart 1630 of FIG. 41 replaces the flow chart 1050 of FIG. 33 in instances where the local storage device supports both multi-box mode and non-multi-box mode. That is, the flow chart 1630 shows steps performed like those of the flow chart 1050 of FIG. 33 to support non-multi-box mode and, in addition, includes steps for supporting multi-box mode.

Processing begins at a first test step 1632 which determines if the local storage device is operating in multi-box mode. Note that the flow chart 1550 of FIG. 39 shows the step 1558 where the host sends a message to the local storage device. The message sent at the step 1558 indicates to the local storage device whether the local storage device is in multi-box mode or not. Upon receipt of the message sent by the host at the step 1558, the local storage device sets an internal variable to indicate whether the local storage device is operating in multi-box mode or not. The internal variable may be examined at the test step 1632.

If it is determined at the test step 1632 that the local storage device is not in multi-box mode, then control transfers from the test step 1632 to a step 1634 to wait M seconds for the cycle switch. If the local storage device is not operating in multi-box mode, then the local storage device controls its own cycle switching and thus executes the step 1634 to wait M seconds before initiating the next cycle switch.

Following the step 1634, or following the step 1632 if the local storage device is in multi-box mode, is a test step 1636 which determines if all I/O's for a previous sequence number have completed. Once it is determined at the test step 1636 that all I/O's for a previous cycle number have completed, control transfers from the test step 1636 to a step 1688 which determines if the inactive chunk for the local storage device is empty. Once it is determined at the test step 1688 that the inactive chunk is empty, control transfers from the step 1688 to a step 1689, where copying of data from the local storage device to the remote storage device is suspended. It is useful to suspend copying data until the sequence number switch is complete.

Following the step 1689 is a test step 1692 to determine if the local storage device is in multi-box mode. If it is determined at the test step 1692 that the local storage device is in multi-box mode, then control transfers from the test step 1692 to a test step 1694 to determine if the active chunk of the corresponding remote storage device is empty. The remote storage device sends a message to the local storage device once it has emptied its active chunk. In response to the message, the local storage device sets an internal variable that is examined at the test step 1694.

Once it is determined at the test step 1694 that the active chunk of the remote storage device is empty, control transfers from the test step 1694 to a step 1696 where an internal variable is set on a local storage device indicating that the local storage device is ready to switch cycles. As discussed above in connection with the flow chart 1580, the host queries each of the local storage devices to determine if each of the local storage devices are ready to switch. In response to the query provided by the host, the local storage device examines the internal variable set at the step 1696 and returns the result to the host.

Following step 1696 is a test step 1698 where the local storage device waits to receive the command from the host to perform the cycle switch. As discussed above in connection with the flow chart 1580, the host provides a command to switch cycles to the local storage device when the local storage device is operating in multi-box mode. Thus, the local storage device waits for the command at the step 1698, which is only reached when the local storage device is operating in multi-box mode.

Once the local storage device has received the switch command from the host, control transfers from the step 1698 to a step 1702 to send a commit message to the remote storage device. Note that the step 1702 is also reached from the test step 1692 if it is determined at the step test 1692 that the local storage device is not in multi-box mode. At the step 1702, the local storage device sends a commit message to the remote storage device. In response to receiving a commit message for a particular sequence number, the remote storage device will begin storing the data according to the continuous backup functionality discussed herein.

Following the step 1702 is a step 1706 where the sequence number is incremented and a new value for the tag (from the host) is stored. The sequence number is as discussed above. The tag is the tag provided to the local storage device at the step 1564 and at the step 1596, as discussed above. The tag is used to facilitate data recovery, as discussed elsewhere herein.

Following the step 1706 is a step 1708 where completion of the cycle switch is confirmed from the local storage device to the host by sending a message from the local storage device to the host. In some embodiments, it is possible to condition performing the step 1708 on whether the local storage device is in multi-box mode or not, since, if the local storage device is not in multi-box mode, the host is not necessarily interested in when cycle switches occur.

Following the step 1708 is a test step 1712 which determines if the remote storage device has acknowledged the commit message. Note that if the local/remote pair is operating in multi-box mode and the remote storage device active chunk was determined to be empty at the step 1694, then the remote storage device should acknowledge the commit message nearly immediately since the remote storage device will be ready for the cycle switch immediately because the active chunk thereof is already empty.

Once it is determined at the test step 1712 that the commit message has been acknowledged by the remote storage device, control transfers from the step 1712 to a step 1714 where the suspension of copying, which was provided at the step 1689, is cleared so that copying from the local storage device to the remote storage device may resume. Following the step 1714, processing is complete.

Figure 42:
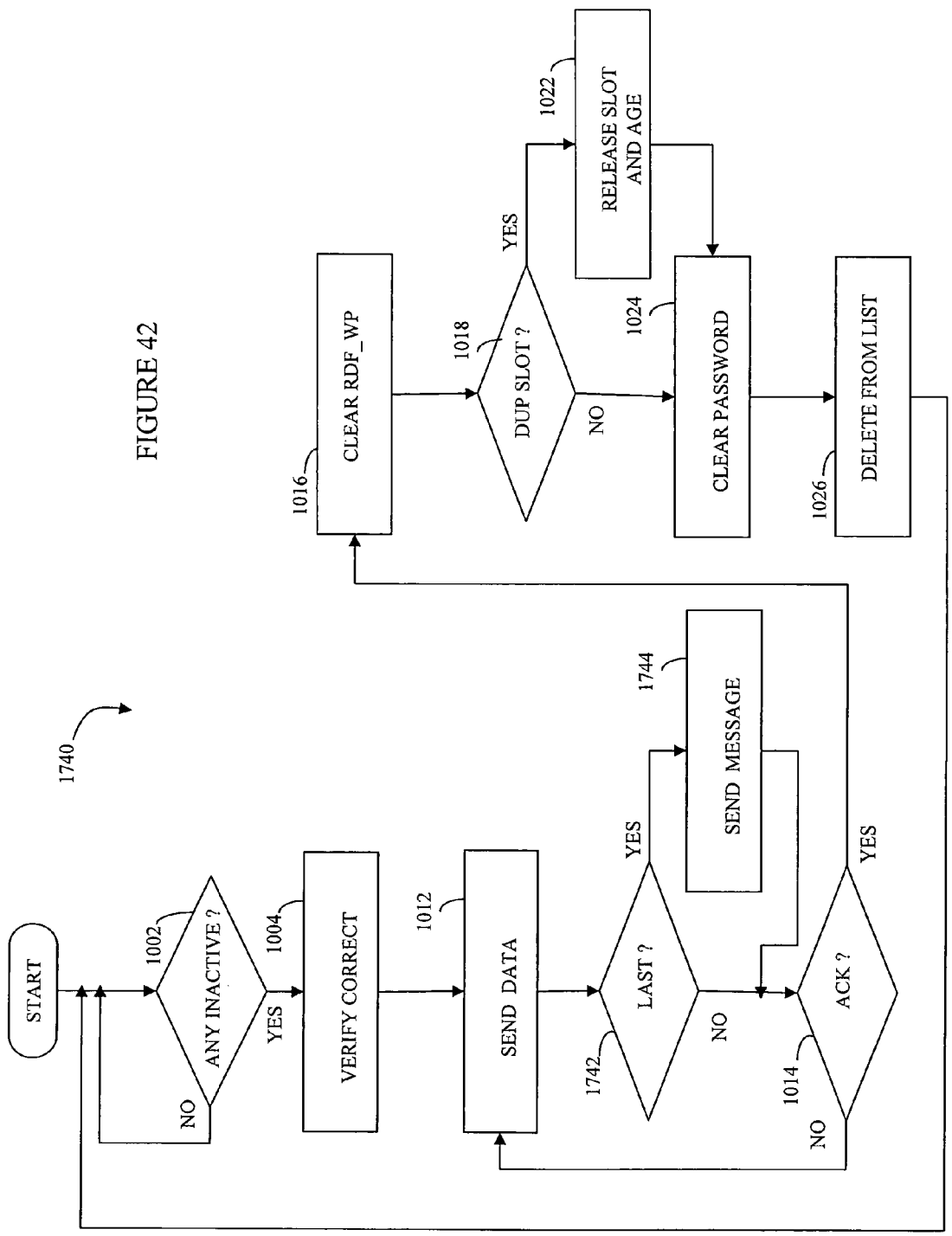
FIG. 42 is a flow chart illustrating transferring data from a local storage device to a remote storage device according to the system described herein.

Referring to FIG. 42, a flow chart 1740 illustrates steps performed in connection with scanning the inactive buffers of the local storage device 824 to transmit data from the local storage device 824 to the remote storage device 826 when the data has been accumulated according to the embodiment illustrated in connection with FIG. 29. The flow chart 1740 is similar to the flow chart 1000 of FIG. 32 and similar steps are given the same reference number. However, the flow chart 1740 includes two additional steps 1742, 1744 which are not found in the flow chart 1000 of FIG. 32. The additional steps 1742, 1744 are used to facilitate multi-box processing. After data has been sent at the step 1012, control transfers from the step 1012 to a test step 1742 which determines if the data being sent is the last data in the inactive chunk of the local storage device. If not, then control transfers from the step 1742 to the step 1014 and processing continues as discussed above in connection with the flow chart 1000 of FIG. 32. Otherwise, if it is determined at the test step 1742 that the data being sent is the last data of the chunk, then control transfers from the step 1742 to the step 1744 to send a special message from the local storage device 824 to the remote storage device 826 indicating that the last data has been sent. Following the step 1744, control transfers to the step 1014 and processing continues as discussed above in connection with the flow chart 1000 of FIG. 32. In some embodiments, the steps 1742, 1744 may be performed by a separate process (and/or separate hardware device) that is different from the process and/or hardware device that transfers the data.

Figure 43:
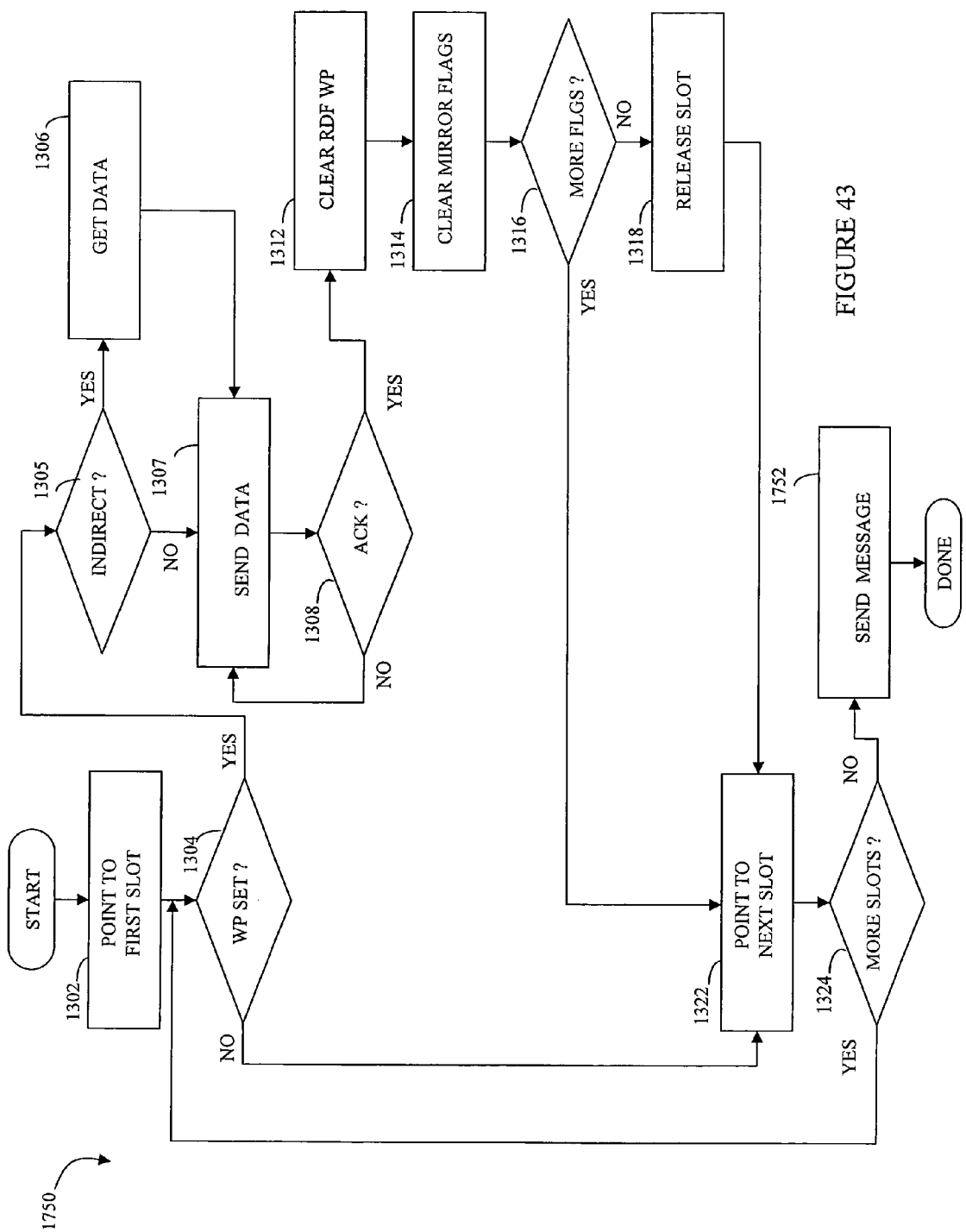
FIG. 43 is a flow chart illustrating transferring data from a local storage device to a remote storage device according to an alternative embodiment of the system described herein.

Referring to FIG. 43, a flow chart 1750 illustrates steps performed in connection with the local storage device 824 scanning the inactive buffers to transmit data from the local storage device 824 to the remote storage device 826 when the data has been accumulated according to the embodiment illustrated in connection with FIG. 34. The flow chart 1750 of FIG. 43 is similar to the flow chart 1300 of FIG. 36 and similar steps are given the same reference number. However, the flow chart 1750 includes an additional step 1752, which is not found in the flow chart 1300 of FIG. 36. The additional steps 1752 is used to facilitate multi-box processing and is like the additional step 1744 of the flow chart 1740 of FIG. 42. After it is determined at the test step 1324 that no more slots remain to be sent from the local storage device to the remote storage device, control transfers from the step 1324 to the step 1752 to send a special message from the local storage device 824 to the remote storage device 826 indicating that the last data for the chunk has been sent. Following the step 1752, processing is complete.

As mentioned elsewhere herein, continuous backup may be provided at the remote storage device 826 for data from the local storage device 824 by having the remote storage device 826 store data provided thereto using techniques described herein in connection with providing continuous backup at the same storage device that generates the data (e.g., the flow-chart 500 of FIG. 19). However, having the local storage device 824 and the remote storage device 826 presents additional possibilities both for continuous backup storage, access, and restoration.

Note that it is possible to restore data to a particular point in time at the remote storage device 826 by rolling back all the data, reading particular data from the point in time, etc. using the techniques described above. However, since the host 822 is coupled to the local storage device 824, then providing the host 822 with access to the point in time data requires either having the host 822 access the data from the remote storage device 826 or transferring the rolled back data from the remote storage device 826 to the local storage device 824.

Figure 44:
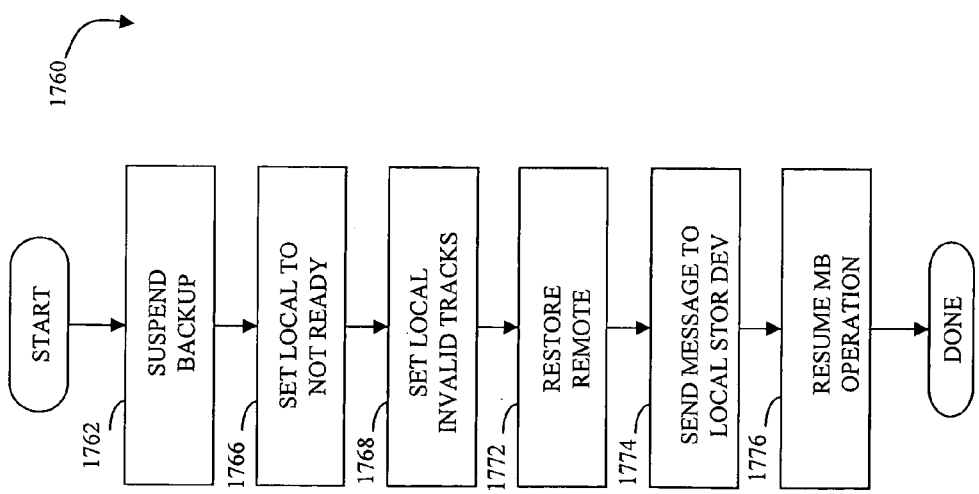
FIG. 44 is a flow chart illustrating restoring data to a particular point in time using a local storage device and a remote storage device.

Referring to FIG. 44, a flow chart 1760 illustrates steps performed in connection with restoring data to a particular point in time (target time) using the local storage device 824 and the remote storage device 826. Processing begins at a first step 1762 where continuous backup processing is stopped. Following the step 1762 is a step 1766 where the local storage device 824 is made not ready for access by the host 822 (or any other device). Following the step 1766 is a step 1768 where tracks on the local storage device 824 are set to invalid in instances where a corresponding track of the CB Virtual device used on the remote storage device 826 points to a log device. Setting particular tracks to invalid at the step 1768 causes reads by the host 822 (or any other device reading data at the local storage device 824) to obtain the data for those tracks from the remote storage device 826.

Following the step 1768 is a step 1772 where the data is restored to the target time at the remote storage device 826. Processing performed at the step 1772 may include any of the techniques described elsewhere herein. Following the step 1772 is a step 1774 where the local storage device 824 is made ready for access by the host 822 (or other similar devices). Following the step 1774 is a step 1776 where the continuous backup process is restarted. Following the step 1776, processing is complete.

Figure 45:
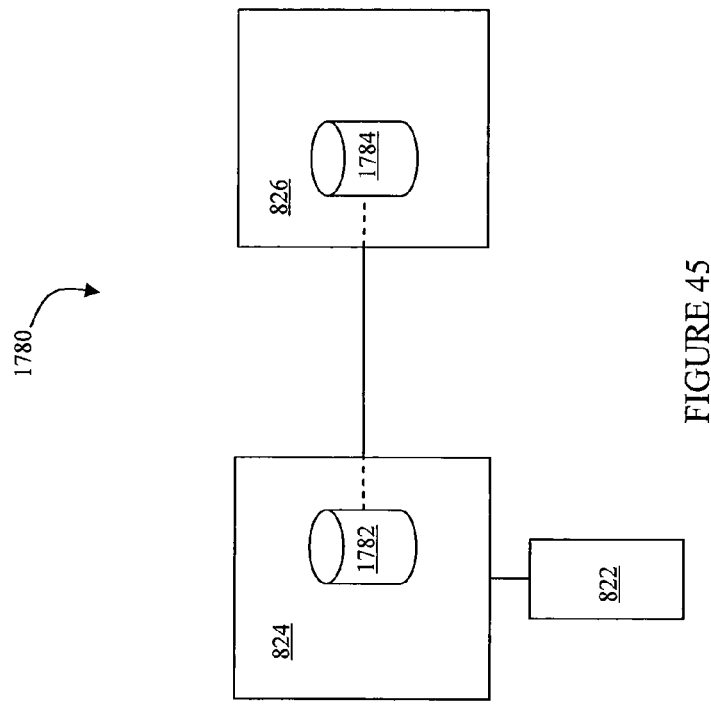
FIG. 45 is a diagram that illustrates a virtual device provided at a local storage device providing access to a CB virtual device at a remote storage device.

Referring to FIG. 45, a diagram 1780 illustrates an embodiment where a virtual device 1782 is provided at the local storage device 824 to provide access to a CB virtual device 1784 at the remote storage device 826. In the embodiment illustrated by the diagram 1780, the host 822 may access the CB virtual device 1784 by locally accessing the virtual device 1782. Reads and writes from and to the virtual device 1782 cause corresponding reads and writes from and to the CB virtual device 1784 via the data link between the local storage device 824 and the remote storage device 826. Thus, it is possible to use the virtual device 1782 to perform the processing illustrated elsewhere herein, such as reading data from a particular point in time illustrated by the flow chart 570 of FIG. 21. Coupling the devices 1782, 1784 may be by any appropriate technique, including conventional mirroring techniques.

Figure 46:
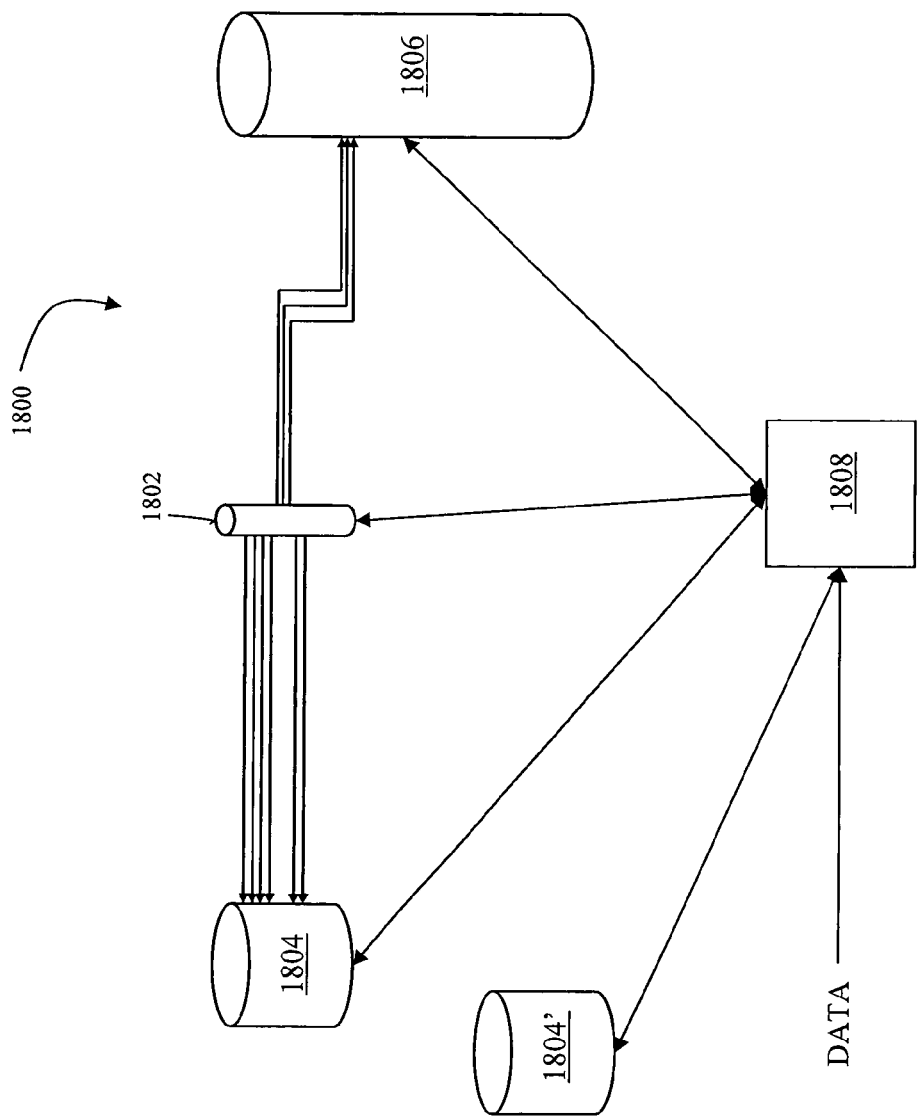
FIG. 46 is a diagram illustrating a continuous backup virtual device and a local mirror storage device for backing up on a remote storage device according to the system described herein.

Referring to FIG. 46, a diagram 1800 illustrates an alternative embodiment having a CB virtual device 1802, a standard logical device 1804, a log device 1806 and an I/O module 1808, all of which operate generally as described above in connection with providing continuous backup at the same storage device to which the host is providing direct I/O operations (FIG. 16) or providing I/O operations at a different device than the device to which the host is providing direct I/O operations (FIG. 27). The diagram 1800 also shows a mirror logical device 1804' which provides a local mirror of the standard logical device 1804. The mirror logical device 1804' may be implemented in a conventional fashion and may have the capability to be split from the standard logical device 1804 so that mirror functionality ceases and the mirror logical device 1804' may be accessed for I/O operations separate from the standard logical device 1804 after the split.

The mirror logical device 1804' may be used for a number of purposes. For example, the mirror logical device 1804' may eliminate the need to allocate space for an entire track and copy an entire track on a first write by splitting the mirror logical device 1804' at the initiation of the continuous backup. Thus, for example, the steps 502, 524, 526 of the flow chart 500 of FIG. 19 may be eliminated and all of the other processes that would otherwise obtain data from the base track of the log device 1806 would instead obtain that data from the mirror logical device 1804'. This avoids some of the overhead associated with the first write to a track. Alternatively, the embodiments described above in connection with FIG. 16 and FIG. 27 may be implemented as described, except that the initial first write the entire track to be copied to the log device may be done as a background task by copying data the entire track from the mirror logical device 1804' instead of the standard logical device 1804.

Although the system described herein uses tracks as a unit of data for certain purposes, it should be understood that other units of data (including, possibly, variable length units of data) may be used. This also applies to other data structures and data units. In addition, in some instances, the order of steps in the flow charts may be modified, where appropriate.

In an embodiment herein, the timer it may be used to keep track of the actual passage of time (e.g., wall time). For example, the timer may represent the number of seconds (or milliseconds, minutes, hours, etc.) since the system was initialized. Alternatively, the timer it may represent the actual time of day in combination with the date. In contrast, the counter may be used to increment through states that are differentiated without necessarily any correlation to actual time. For example, the counter may be incremented on every write to the system, every N write, or according to some other metric. In some embodiments, the counter may be a function (at least partially) of the value of the timer.

In some embodiments, it may be possible to provide a mechanism to consolidate data changes in a way that decreases the storage requirements while decreasing the granularity. Data may be combined by merging data from consecutive (in time) elements stored on one or more log devices for a particular track or data segment. For instance, in may be possible to combine all of the changes corresponding to a single day into one element even though the original granularity used when the data was collected was less than a day (e.g., a granularity of one minute). The trade off is that combining multiple consecutive elements into a single element saves storage space, but reduces recovery granularity. However, a reduction in granularity may be acceptable in certain instances, such as after some time has passed. For example, it may be useful to initially provide continuous backup for a particular day with an initial fine granularity (e.g., one second), but then, after a first amount of time has passed (e.g., one day) reducing the granularity (and storage requirements) to provide a mid level granularity (e.g., one minute). After a second amount of time has passed (e.g., another day), the granularity (and storage requirements) may be reduced further (e.g., one hour), and so on.

While the invention has been disclosed in connection with various embodiments, modifications thereon will be readily apparent to those skilled in the art. Accordingly, the spirit and scope of the invention is set forth in the following claims.

What is claimed is:

1. A method of providing continuous backup of a local storage device, comprising:
   subdividing the local storage device into subsections;
   providing a time indicator that is modified periodically;
   in response to a first request to write a first set of new data to a particular subsection of the local storage device at a first particular value indicated by the time indicator, copying data from a corresponding subsection of the local storage device to a first portion of an other storage area different from the local storage device; and
   in response to a second request to write a second set of new data to the particular subsection of the local storage device at a second particular value indicated by the time indicator that is different from the first particular value, writing the second set of new data to a second portion of the other storage area separate from the first portion to preserve the first set of new data.

2. A method, according to claim 1, wherein the subsections are tracks.

3. A method, according to claim 1, wherein maintaining the data being overwritten includes constructing a linked list of portions of data for each of the subsections.

4. A method, according to claim 3, wherein the portions of data have variable sizes.

5. A method, according to claim 1, wherein in response to a third request to write a third set of data to the particular subsection at the second particular value of the indicator, the third set of data is combined with the second set of data if the third set of data is a subset of the second set of data.

6. A method, according to claim 1, further comprising:
   restoring the local storage device to a state thereof at a particular point in time by transferring data from the other storage area to the local storage device.

7. A method, according to claim 6, wherein prior to transferring the data, subsections of the data are constructed by combining separate portions corresponding to the same subsection.

8. A method, according to claim 1, further comprising:
   inserting data for a particular subsection at a particular point in time by traversing data corresponding to the particular subsection to obtain an appropriate insertion point.

9. A method, according to claim 1, further comprising:
   providing a virtual storage device at the local storage device, wherein the virtual storage device provides access to data maintained at the other storage area; and
   reading data for a particular subsection at a particular point in time by traversing data at the other storage area corresponding to the particular subsection and reading from the group consisting of: data from the local storage device, maintained data, and a combination of maintained data and data from the local storage device, wherein the maintained data is accessed through the virtual storage device.

10. A method, according to claim 1, further comprising:
    compressing data by combining consecutive portions for a subsection.

11. A method, according to claim 1, wherein the other storage area is provided on one of: a remote storage device and a mirror device of the local storage device that contains a copy of data that is on the local storage device when the continuous backup is initiated.

12. A non-transitory computer-readable storage medium containing software that provides continuous backup of a local storage device, the software comprising:
    executable code that, when executed, obtains a value of a time indicator that is modified periodically;
    executable code that, when executed, copies data from a corresponding subsection of the local storage device to a first portion of an other storage area different from the local storage device in response to a first request to write a first set of new data to a particular subsection of the local storage device at a first particular value indicated by the time indicator; and
    executable code that, when executed, writes the second set of new data to a second portion of the other storage area separate from the first portion to preserve the first set of new data in response to a second request to write a second set of new data to the particular subsection of the local storage device at a second particular value indicated by the time indicator that is different from the first particular value.

13. A non-transitory computer-readable storage medium, according to claim 12, wherein the subsections are tracks.

14. A non-transitory computer-readable storage medium, according to claim 12, wherein executable code that maintains the data being overwritten constructs a linked list of portions of data for each of the subsections.

15. A non-transitory computer-readable storage medium, according to claim 14, wherein the portions of data have variable sizes.

16. A non-transitory computer-readable storage medium, according to claim 12, wherein in response to a third request to write a third set of data to the particular subsection at the second particular value of the indicator, the third set of data is combined with the second set of data if the third set of data is a subset of the second set of data.

17. A non-transitory computer-readable storage medium, according to claim 12, wherein the software further comprises executable code that, when executed, restores the local storage device to a state thereof at a particular point in time by transferring data from the other storage area to the local storage device.

18. A non-transitory computer-readable storage medium, according to claim 17, further comprising:
    executable code that constructs subsections of the data by combining separate portions corresponding to the same subsection prior to transferring the data.

19. A non-transitory computer-readable storage medium, according to claim 12, wherein the software further comprises executable code that, when executed, inserts data for a particular subsection at a particular point in time by traversing data corresponding to the particular subsection to obtain an appropriate insertion point.

20. A non-transitory computer-readable storage medium, according to claim 12, wherein the software further comprises executable code that, when executed, reads data for a particular subsection at a particular point in time by traversing data at the other storage area corresponding to the particular subsection and reading from the group consisting of: data from the local storage device, maintained data, and a combination of maintained data and data from the local storage device, wherein the maintained data is accessed through a virtual storage device provided at the local storage device to access to data maintained at the other storage area.

21. A non-transitory computer-readable storage medium, according to claim 12, wherein the software further comprises executable code that compresses data by combining consecutive portions for a subsection.

22. A non-transitory computer-readable storage medium, according to claim 12, wherein the other storage area is provided on one of: a remote storage device and a mirror device of the local storage device that contains a copy of data that is on the local storage device when the continuous backup is initiated.

* * * * *